United States Patent
Erami et al.

(10) Patent No.: US 6,385,200 B1
(45) Date of Patent: May 7, 2002

(54) BROADCAST CONTROL SYSTEM, NETWORK ELEMENT, AND SWITCHING NODE APPARATUS WITH BROADCAST CELL ROUTING CAPABILITIES IN ASYNCHRONOUS TRANSMISSION MODE NETWORK

(75) Inventors: Akihisa Erami; Shinichi Ishigaki, both of Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/012,503

(22) Filed: Jan. 23, 1998

(30) Foreign Application Priority Data

Aug. 8, 1997 (JP) .............................. 9-214689

(51) Int. Cl.$^7$ ............................................ H04L 12/28
(52) U.S. Cl. ....................................... 370/395; 370/254
(58) Field of Search ................................ 370/254, 255, 370/248, 252, 389, 390, 394, 392, 395, 399, 397, 400, 409; 709/224, 223, 220, 228, 236

(56) References Cited

U.S. PATENT DOCUMENTS

| | | | | |
|---|---|---|---|---|
| 5,345,558 A | * | 9/1994 | Opher et al. ................. | 709/236 |
| 5,394,397 A | * | 2/1995 | Yanagi et al. ................ | 370/390 |
| 5,654,965 A | * | 8/1997 | Takahashi et al. ............ | 370/390 |
| 5,729,685 A | * | 3/1998 | Chatwani et al. ............ | 709/224 |
| 5,884,036 A | * | 3/1999 | Haley ......................... | 709/224 |

* cited by examiner

*Primary Examiner*—Wellington Chin
*Assistant Examiner*—Steven Nguyen
(74) *Attorney, Agent, or Firm*—Rosenman & Colin LLP

(57) ABSTRACT

A broadcast control system and its components capable of determining unique routes to deliver broadcast cells to every destination in an ATM network, which is designed to avoid network congestion and subsequent degradation in quality of service, as well as to reduce the workloads imposed on network equipment. The ATM network is organized by a plurality of network elements and at least one service provider terminal connected to a source network element. A broadcast routing controller disposed in the source network element distributes a broadcast routing control cell over the ATM network. Each network element on the network receives this broadcast routing control cell as well as its replicas delivered through different paths, and on the basis of information contained in those control cells, it establishes its own routing data in the local storage. This routing data indicates a particular link that is connected to the shortest path between the source network element and the present network element. When relaying broadcast cells, each network element selectively accepts broadcast cells coming through a particular link registered in the routing data and redistributes them to adjacent network elements.

13 Claims, 39 Drawing Sheets

FUG. 10

BROADCAST CONTROL SYSTEM, NETWORK ELEMENT, AND SWITCHING NODE APPARATUS WITH BROADCAST CELL ROUTING CAPABILITIES IN ASYNCHRONOUS TRANSMISSION MODE NETWORK

BACKGROUND OF THE INVENTION

1. Field of the Invention

The present invention generally relates to broadcast control systems, network elements, and switching node apparatus for Asynchronous Transfer Mode (ATM) networks. More particularly, the present invention relates to a broadcast control system for determining unique routes to deliver broadcast cells to every destination in an ATM network that provides broadcast connections between a service provider terminal and a plurality of client terminals. The present invention also relates to network elements and switching node apparatus where the above broadcast control system is implemented.

2. Description of the Related Art

In recent years, the ATM network technologies are of great interest as one of the most promising backbones that provide high-speed, flexible communications services suitable for handling various kinds of multimedia traffic, such as voice, data, image, and video, in an integrated way. In such an ATM-based multimedia network, a service provider terminal delivers requested data to a plurality of client terminals in fixed-length packets, or cells. In addition to user data, the network exchanges some control data between the provider and client terminals for network management purposes, and some researchers propose the use of broadcast cells to achieve this function.

While the ATM User-Network Interface (UNI) Specification V3.0, a protocol specification formulated by the ATM Forum, has reserved some specific values of virtual path and virtual channel identifiers (VPIs/VCIs) for broadcast signaling cells, it does not provide any explicit specifications about how to route them in the network. The latest version of the ATM UNI Specification is V3.1 at present (December, 1996), in which no revision has been made as to the usage of broadcast signaling cells since v3.0. That is, the present ATM Forum specifications require some predefined VPI/VCI values to be used to deliver broadcast cells, implying that every piece of equipment in the network, or network element, will transmit and receive broadcast signaling cells through some common virtual channels.

FIG. 39 shows an example of a conventional ATM network which provides broadcast services. This network is organized by five ATM network elements 101 to 105 and a service provider terminal 106 connected to the ATM network element 101. Besides controlling delivery of cells over ATM transmission media, each of the ATM network elements 101 to 105 operates as a control system that manages its own client terminals (not shown in FIG. 39) that are directly connected thereto as ATM endpoint equipment. The service provider terminal 106 is a terminal that delivers various broadcast services via the ATM network to those client terminals, which services include news, weather forecasts, and other information necessary in daily life.

Suppose here that the service provider terminal 106 has sent broadcast cells to such an ATM network. Upon receipt of each broadcast cell, the ATM network elements 101 to 105 each terminate the received cell and deliver it to their respective local client terminals. Further, they relay the received cell to the next ATM network elements by repeating it toward all links except the one through which the cell was received, via a common ATM virtual channel (VPI/VCI). This repeating operation causes many same broadcast cells to be transmitted over the ATM network as indicated by arrows in FIG. 39.

The resultant unnecessary broadcast cells will fill the ATM network, which possibly causes network congestion accompanied by severe degradation in quality of services. Another problem with the conventional network is that a heavy workload will be imposed on the ATM network elements since they may receive the same broadcast cells many times.

SUMMARY OF THE INVENTION

Taking the above into consideration, an object of the present invention is to provide a broadcast control system and its component devices for determining unique routes to deliver broadcast cells to every destination in an ATM network so as to prevent it from network congestion and degradation in quality of service, as well as to reduce the amount of workload imposed on the network equipment.

To accomplish the above object, according to the present invention, there is provided a broadcast control system for controlling broadcast message distribution in an ATM network which is organized by a plurality of network elements and at least one service provider terminal connected to a source network element among the plurality of network elements. Here, each network element has a plurality of links that extend to other network elements, and the service provider terminal serves as a source of a broadcast cell.

This broadcast control system comprises the following elements:

(a) broadcast routing control cell transmitter, disposed in the source network element, for distributing a broadcast routing control cell containing reception link decision data to the plurality of network elements;

(b) control cell relaying unit, disposed in each of the plurality of network elements and activated when the broadcast routing control cell is received via one of the plurality of links, for modifying the reception link decision data contained in the received broadcast routing control cell, and transmitting the broadcast routing control cell with the modified reception link decision data through the plurality of links except for the one of the plurality of links used to receive the broadcast routing control cell;

(c) link selection & storage unit, disposed in each of the plurality of network elements and activated when a plurality of broadcast routing control cells have been received via different routes, for selecting a particular link from among the plurality of links, based on the reception link decision data contained in each broadcast routing control cell received, and storing a record of a combination of the particular link and the source network element which distributed the plurality of broadcast routing control cells; and (d) broadcast cell relaying unit, disposed in each of the plurality of network elements, for receiving the broadcast cell through one of the plurality of links, identifying a network element that has distributed the broadcast cell, and transmitting the broadcast cell through the rest of the plurality of links if the link selection & storage unit has a record that matches with a combination of the network element identified as the sender of the broadcast cell and the one of the plurality of links that was used to receive the broadcast cell.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Several embodiments of the present invention will be described below with reference to the accompanying drawings.

Figure 1:
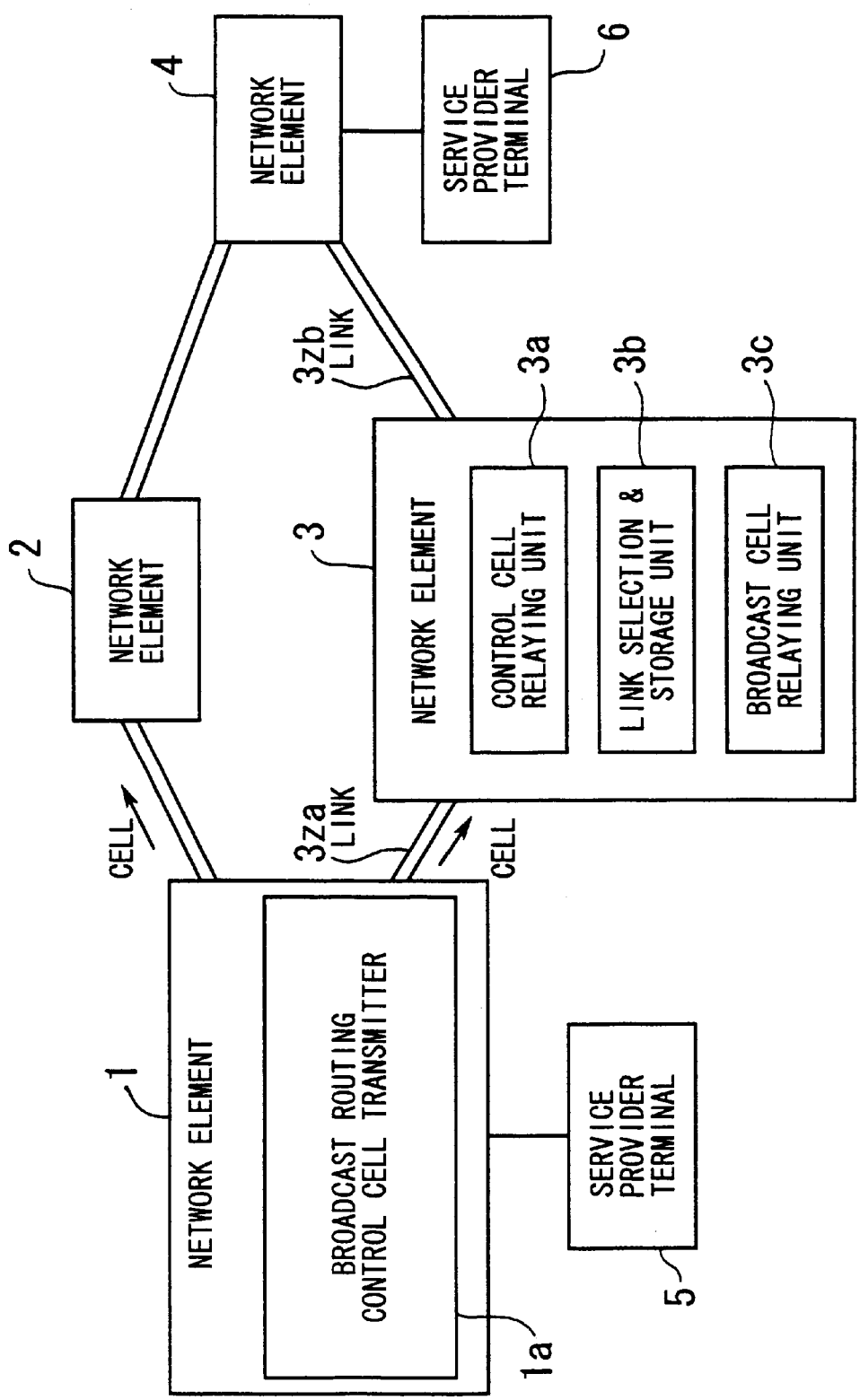
FIG. 1 is a conceptual view of the present invention.

Referring first to FIG. 1, the following paragraphs will present the concept of a first embodiment of the present invention. FIG. 1 illustrates a broadcast control system according to the first embodiment, which controls broadcast message distribution in an ATM network. This network is organized by four network elements 1 to 4 and two service provider terminals 5 and 6 connected to the network elements 1 and 4, respectively. Such network elements 1 and 4 having a direct connection to at least one service provider terminal are referred to as "source network elements" since they broadcast messages to the network. Every network element has a plurality of "links" extending to other network elements. For instance, the network element 3 has two links 3za and 3zb to reach the adjacent network elements 1 and 4, respectively.

The broadcast control system of the first embodiment comprises the following functional elements. A broadcast routing control cell transmitter 1a is disposed in the source network element 1 for distributing a broadcast routing control cell containing reception link decision data to the other network elements 2 to 4. While it is not illustrated in FIG. 1, the network element 4 also has its own broadcast routing control cell transmitter for the same purpose.

In the network element 3, there are provided a control cell relaying unit 3a, a link selection & storage unit 3b, and a broadcast cell relay unit 3c. The other network elements 1, 2, and 4 also has those components, although they are not illustrated in FIG. 1. The control cell relaying unit 3a is designed to modify the reception link decision data contained in a broadcast routing control cell, when it is received via one of the plurality of links of the network element 3, and transmit the broadcast routing control cell with the modified reception link decision data through the links except for the one used to receive the broadcast routing control cell. The link selection & storage unit 3b is activated when a plurality of broadcast routing control cells have been received from the same network element 1, for example, via different delivery routes in the ATM network. Based on the reception link decision data contained in each broadcast routing control cell received, the link selection & storage unit 3b selects a particular link from among the plurality of links, and stores a record of the selected link in combination with the source network element which originally distributed the broadcast routing control cells. The broadcast cell relaying unit 3c is configured to receive a broadcast cell through one of the plurality of links, identify which network element has distributed the broadcast cell, and transmit the received broadcast cell through the rest of the plurality of links, if the link selection & storage unit 3b has a relevant record that matches with a combination of the network element identified as the sender of the broadcast cell and the one of the plurality of links that was used to receive the broadcast cell.

Suppose that, in the above-described structural arrangement, the service provider terminal 5 is now attempting to send broadcast cells to the client terminals (not shown) over the network. Before beginning the broadcast cell transmission, the broadcast routing control cell transmitter 1a as part of the network element 1, which serves for the service provider terminal 5, sends a broadcast routing control cell to the other network elements 2 to 4. The broadcast routing control cell, which should be newly defined as one of the Operation Administration and Maintenance (OAM) cells, contains some data to determine which link to use for broadcast cell reception. This "reception link decision data" contains a counter value that indicates how many network elements a broadcast routing control cell has passed through before reaching the present network element, which will be referred to as a "network element counter" or a "PASSED NE COUNTER" in later sections.

Similarly, the network element 4 transmits a broadcast routing control cell with respect to another service provider terminal 6. As FIG. 1 shows, it has to be allowed that a plurality of service providers 5 and 6 coexist in a single ATM network, and to this end, the broadcast routing control cells must have different identifiers to indicate their origins.

Now, the broadcast routing control cell has reached the network element 3, for example. Inside the network element 3, the control cell relaying unit 3a increments the aforementioned network element counter as part of the received cell, and after that, it forwards the modified cell to other network elements by using all of its links except for the reception link of the broadcast routing control cell being processed. Here, the term "link" collectively represents input and output ports that extend to another network element immediately adjacent to the present network element. Also, a certain ATM cell's "reception link" refers to a link through which the ATM cell of interest has been received.

In the present example, the network element 3 has two links: a first link 3za to reach the network element 1 and a second link 3zb to reach the network element 4. Both links 3za and 3zb can be a reception link because there are two routes for a broadcast routing control cell to reach the network element 3. That is, a first broadcast routing control cell travels through two network elements 2 and 4 and arrives at the link 3zb of the network element 3, while a second broadcast routing control cell directly reaches the link 3za.

Each time the broadcast routing control cell is relayed by a network element, the network element counter in the cell is increased by one. That is, the network element counter indicates how many network elements the broadcast routing control cell has passed through, before reaching the present network element. In the present case of FIG. 1, the first broadcast routing control cell coming through two network elements 2 and 4 has a value of 3 with its network element counter. Upon receipt of the first control cell, the control cell relaying unit 3a recognizes the value of the network element counter, increases it from "3" to "4," and sends the cell with the new counter value "4" to the network element 1 through the link 3za. Likewise, the control cell relaying unit 3a receives the second broadcast routing control cell with a network element counter value of "1" and forwards it to the network element 4 through the link 3zb after increasing the counter value from "1" to "2".

As such, when a plurality of broadcast routing control cells has arrived from the same network element 1 via different routes, the link selection & storage unit 3b compares the received cells with one another in terms of the network element counter values, thereby selecting one broadcast routing control cell exhibiting the smallest count value. The link selection & storage unit 3b keeps a record of which link was used to receive the selected broadcast routing control cell and which network element was the sender of the cell. In the present example, the two broadcast routing control cells issued by the same sender, the network element 1, indicate different counter values "3" and "1." Since "1" is smaller than "3," the link selection & storage unit 3b selects the first broadcast routing control cell which has reached the network element 3 directly from the network element 1. The reception link concerning the first broadcast routing control cell, the link 3za extending to the network element 1, is registered into the link selection & storage unit 3b, along with the source network element 1. In this way, the link selection & storage unit 3b collects records that show the most appropriate link for each source network element having direct connections to service provider terminals.

Upon completion of the above-described preparatory process with a broadcast routing control cell, the network element 1 distributes the broadcast cell sent from the service provider terminal 5. This broadcast cell is received by the broadcast cell relay unit 3c of the network element 3, for instance. The broadcast cell relay unit 3c retrieves a record about the network element 1 from the link selection & storage unit 3b to find which link corresponds to the network element 1, the sender of the received broadcast cell. If the link found in the retrieved record is the exact reception link through which the broadcast cell has been received, the broadcast cell relay unit 3c terminates the broadcast cell and retransmits it to other network elements through all the links except for the reception link. If, in turn, the link found in the record does not match with the actual reception link, the broadcast cell relay unit 3c discards the received broadcast cell.

More specifically, suppose that a broadcast cell distributed by the network element 1 has reached the network element 3 through its link 3za. The broadcast cell relay unit 3c retrieves a record pertaining to the source network element 1 out of the link selection & storage unit 3b. The record indicates, in the present example, that the link 3za is the right link to accept broadcast cells originated at the network element 1. Now that it is understood that the broadcast cell has reached the network element 3 via the shortest path among those in the network, the broadcast cell relay unit 3c terminates the broadcast cell and delivers it to the local client terminals (not shown in FIG. 1), as well as sending it to the next network element 4 through the remaining link 3zb. As opposed to the above, regarding broadcast cells coming from the other side (i.e., via the network element 2 and 4), their reception link 3zb does not match with the one indicated by the link selection & storage unit 3b, and thus the broadcast cell relay unit 3c discards the received broadcast cells without terminating or relaying them.

In the way described above, the broadcast control system according to the present invention determines unique routes for delivering broadcast cells to all network elements involved in the ATM network, to provide their local client terminals with various services including message broadcasting, automated network configuration management, and address resolution services to locate destinations. The system proposed in the present invention allows those services to be delivered without causing network congestion or consequent degradation in quality of service.

Furthermore, the broadcast control system proposed in the present invention greatly contributes to the efficient and expanded use of ATM broadcast channel resources, since it reduces the workloads imposed on an ATM network and makes it easy and flexible to send broadcast messages in multimedia services and to transfer, reconfigure, and set up the client terminals. The next section provides further details of the first embodiment of the present invention.

Figure 2:
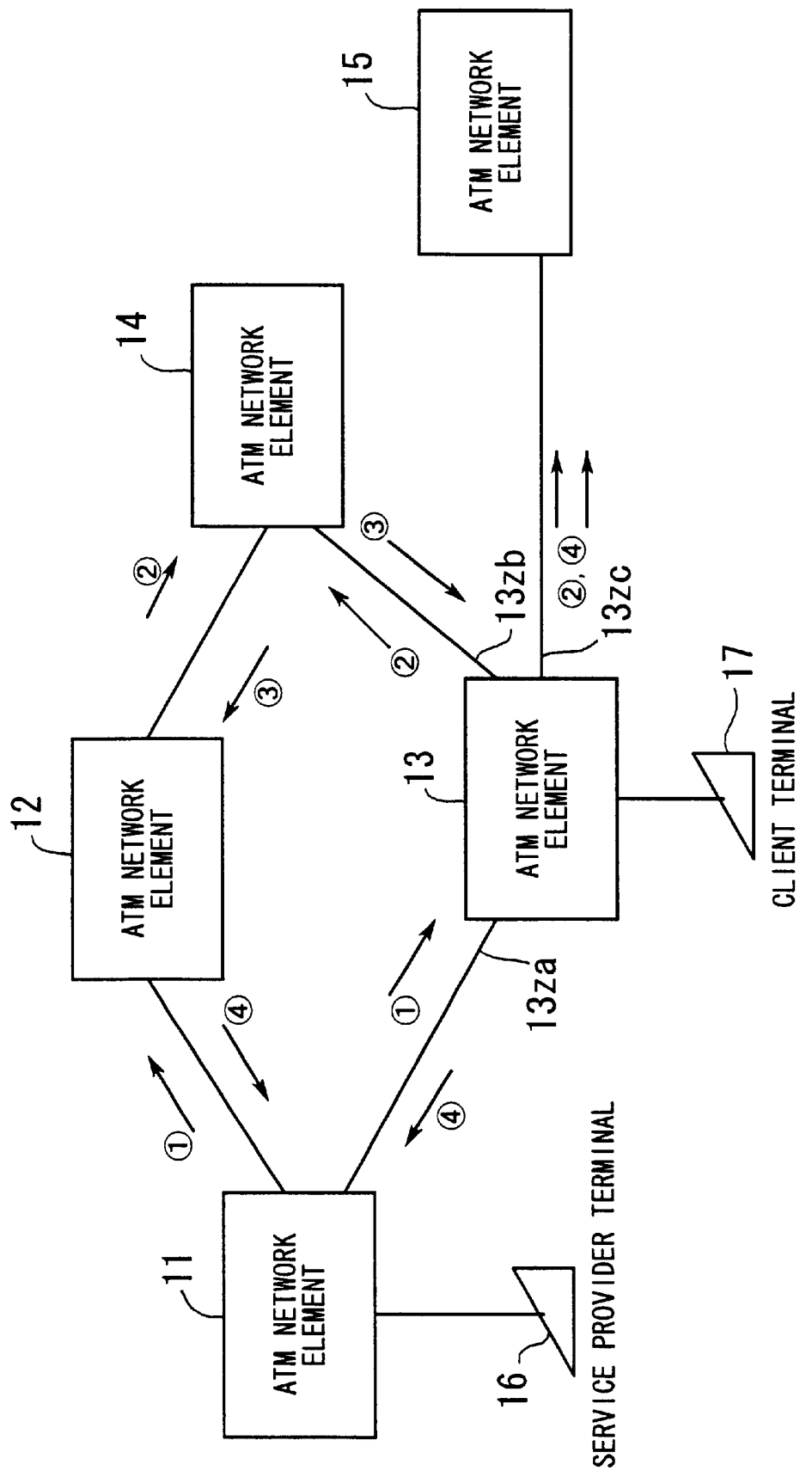
FIG. 2 is a diagram which shows an ATM network and its constituents in a first embodiment of the present invention.

FIG. 2 illustrates an ATM network that interconnects five network elements according to the first embodiment. In this ATM network, a service provider terminal 16 supplies network elements 11 to 15 and their local client terminals 17 and the like with online news, weather forecast, and other information necessary for daily lives. Although more service provider terminals can exist in the same ATM network, FIG. 2 only shows one service provider terminal 16 for simplicity. Likewise, there can be a plurality of client terminals under the control of each network element 11 to 15, but FIG. 2 illustrates only one client terminal 17 under the ATM network element 13.

The arrows running between the network elements 11 to 15 represent the flow of broadcast routing control cells that have been originally generated by the service provider terminal 16 and distributed by the source ATM network element 11. Numerals ①  to ④ affixed to those arrows indicate the values of network element counters carried by the broadcast routing control cells, which will be described later in detail.

Figure 3:
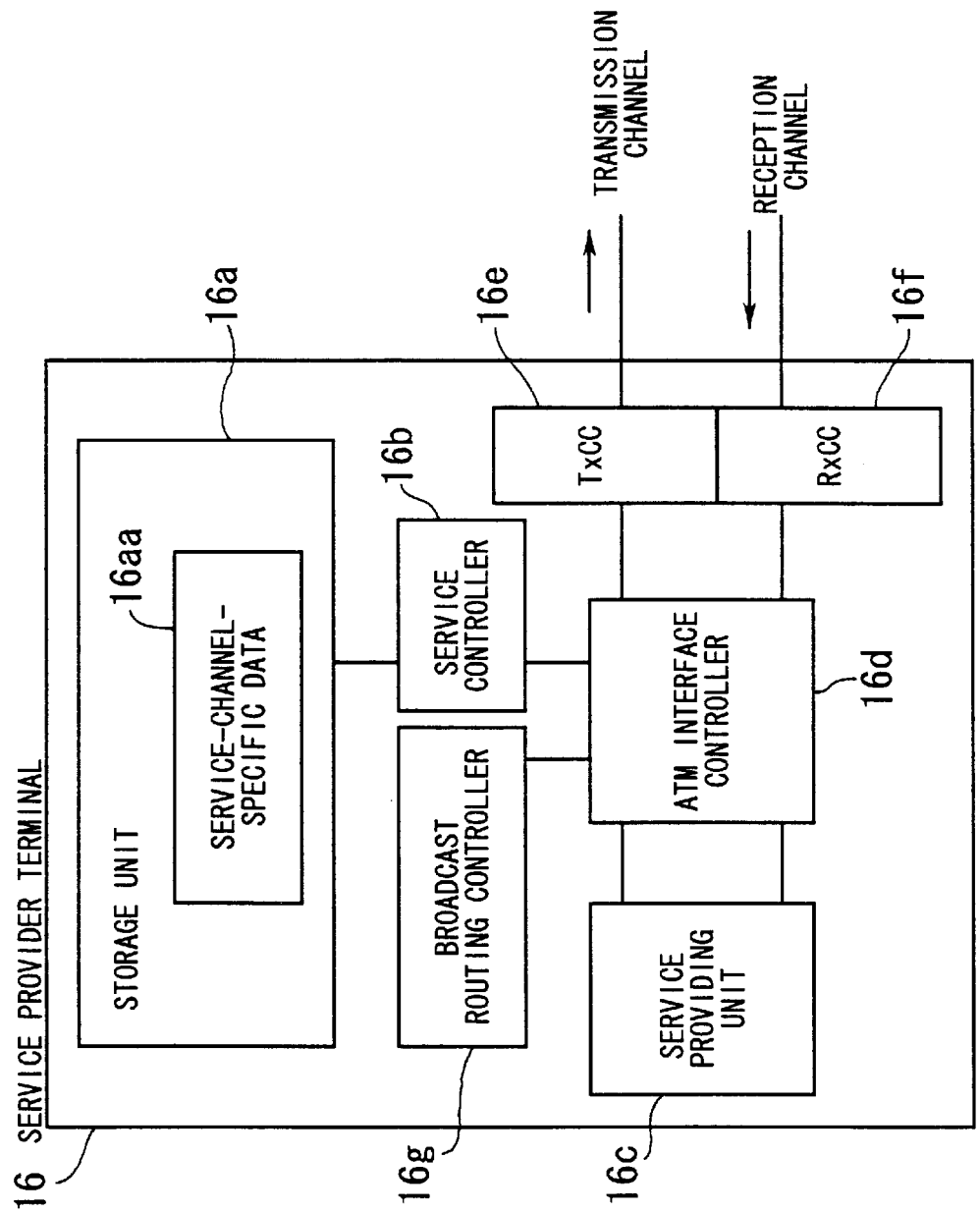
FIG. 3 is a block diagram which shows the internal structure of a service provider terminal.

FIG. 3 is a block diagram which shows the internal structure of the service provider terminal 16. Various data handled in the service provider terminal 16 is held in a storage unit 16a, A service-channel-specific data area 16aa is a part of the storage unit 16a, where various data specific to individual service channels is registered. A service controller 16b undertakes administrative tasks to offer services to the client terminals, while a service providing unit 16c supplies actual picture, voice, and data signals for each service program. Upon receipt of those signals from the service providing unit 16c, an ATM interface controller 16d converts them into ATM cells and transmits them, as well as executing a channel multiplexing process to allow different signals to be transmitted over a single transmission path. In turn, when receiving cells, the ATM interface controller 16d demultiplexes channel signals and reassembles original massages from the received ATM cells. A transmission channel controller (TXCC) 16e maps the ATM cells assembled by the ATM interface controller 16d onto the transmission medium to transport them over the ATM network. A reception channel controller (RXCC) 16f extracts ATM cells out of the transmission signals received from the ATM network, and supplies them to the ATM interface controller 16d.

The service provider terminal 16 employs a broadcast routing controller 16g as a new element introduced by the present invention so as to produce a broadcast routing control cell that has a special field defined for counting the number of passed NEs while it explores along a path in the network. Here, the term "NE" is an acronym that stands for a network element, which will be used throughout the description when appropriate.

Figure 4:
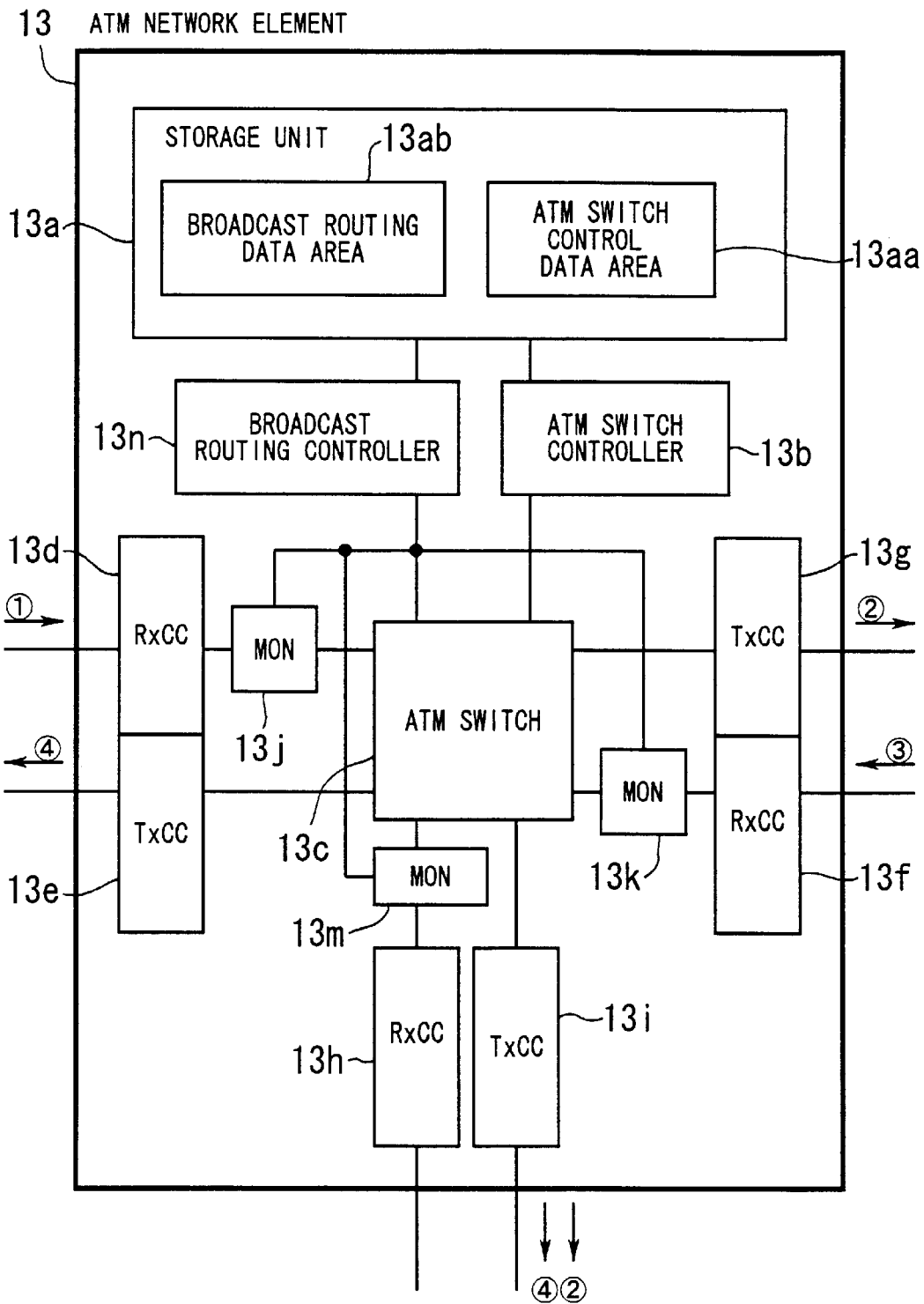
FIG. 4 is a block diagram which shows the internal structure of an ATM network element.

FIG. 4 is a block diagram which shows the internal structure of the ATM network element 13. Other ATM network elements 11, 12, 14, and 15 have basically the same configuration as this. In FIG. 4, a storage unit 13a stores various data dealt with by the ATM network element 13. There is an ATM switch control data area 13aa, as part of the storage unit 13a, which stores data about ATM node connections for use in an ATM switch 13c. With this ATM connection data, an ATM switch controller 13b controls the ATM switch 13c. ATM cells coming from different directions are received by reception channel controllers (RxCC) 13d, 13f, and 13h and concentrated into an ATM switch 13c via monitoring units (MON) 13j, 13k, and 13m. To deliver those incoming ATM cells to their respective destinations, the ATM switch 13c switches the channel connections and outputs the ATM cells to appropriate transmission channel controllers (TXCC) 13e, 13g, and 13i. The reception channel controllers 13d, 13f, and 13h extract ATM cells from transmission signals received from other ATM network elements 11, 14, and 15 (and also from the local client terminal 17). The extracted ATM cells are then supplied to monitoring units 13j, 13k and 13m, respectively. The transmission channel controllers 13e, 13g, and 13i map the ATM cells supplied from the ATM switch 13c onto the transmission medium being used to transport them to other ATM network elements 11, 14, and 15.

The present invention reserves a memory area 13ab named "broadcast routing data area" in the storage unit 13a to keep some information necessary for the routing of broadcast cells. While a plurality of broadcast cells having the same contents may be received through different links, this "routing data" assigns a particular link to some particular source network elements so that the assigned link will selectively accept the broadcast cells sent from the particular source network elements. The broadcast cells discriminated as such will then be terminated and relayed to the next network elements. To this end, the routing data contains identifiers of source network elements and valid links assigned to them. Further details of the routing data will be clarified later on, with reference to FIG. 5.

The ATM network element 13 is equipped with a broadcast routing controller 13n as another distinctive feature of the present invention, which finds a broadcast routing control cell that has arrived from a certain source network element, being relayed by a minimum number of network elements. When such a broadcast routing control cell is found, it registers the link used to receive the broadcast routing control cell to the broadcast routing data area 13ab. Another function of the broadcast routing controller 13n is to increment the value of a "PASSED NE COUNTER" field disposed as part of a broadcast routing control cell before forwarding the cell to other ATM network elements. Further details of the broadcast routing controller 13n will be separately described later with reference to FIG. 11.

The monitoring units 13j, 13k, and 13m also provide distinct feature of the present invention, which extract OAM cells from among the ATM cells received by the reception channel controllers 13d, 13f, and 13h and supply them to the broadcast routing controller 13n. The received ATM cells other than OAM cells are sent to the ATM switch 13c for routing.

In FIG. 4, the arrows represent the flow of broadcast routing control cells that have been originally generated by the service provider terminal 16 and distributed by the ATM network element 11. The numerals ① to ④ attached to the arrows indicate the aforementioned "PASSED NE COUNTER" values as part of the broadcast routing control cells (described later).

Figure 5:
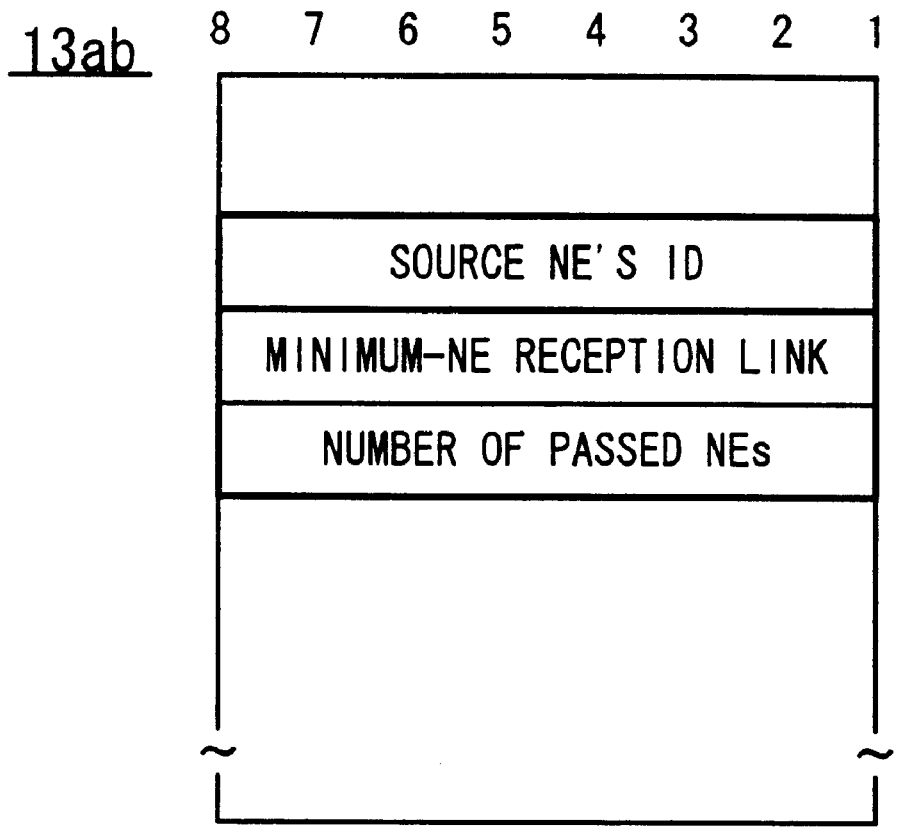
FIG. 5 is a diagram which shows broadcast routing data stored in a broadcast routing data area shown in FIG. 4.

FIG. 5 illustrates broadcast routing data stored in the broadcast routing data area 13ab shown in FIG. 4. When a broadcast routing control cell received from a certain source network element exhibits a minimum number of passed network elements, a record about this source network element is formulated and registered into the broadcast routing data area 13ab, including the identifier (ID) of the source network element, the link used, and the number of passed network elements. Although FIG. 5 only shows a record for one source network element, the broadcast routing data area 13ab stores such a record separately for each individual source network element.

More specifically, each record stored in the broadcast routing data area 13ab consists of three data fields named "SOURCE NE'S ID," "MINIMUM-NE RECEPTION LINK," and "NUMBER OF PASSED NEs." The "SOURCE NE'S ID" field stores the identifier of the ATM network element that manages some service provider terminals and has distributed the broadcast routing control cell initiated by one of the service provider terminals. The next "MINIMUM-NE RECEPTION LINK" field stores a name, code, or whatever representing the link that extends to what is determined as the shortest path from the source network element to the present network element 13. The "NUMBER OF PASSED NEs" field stores the number of network elements that the broadcast routing control cell has passed through during the travel along the shortest path from the source network element to the present network element 13.

Figure 6:
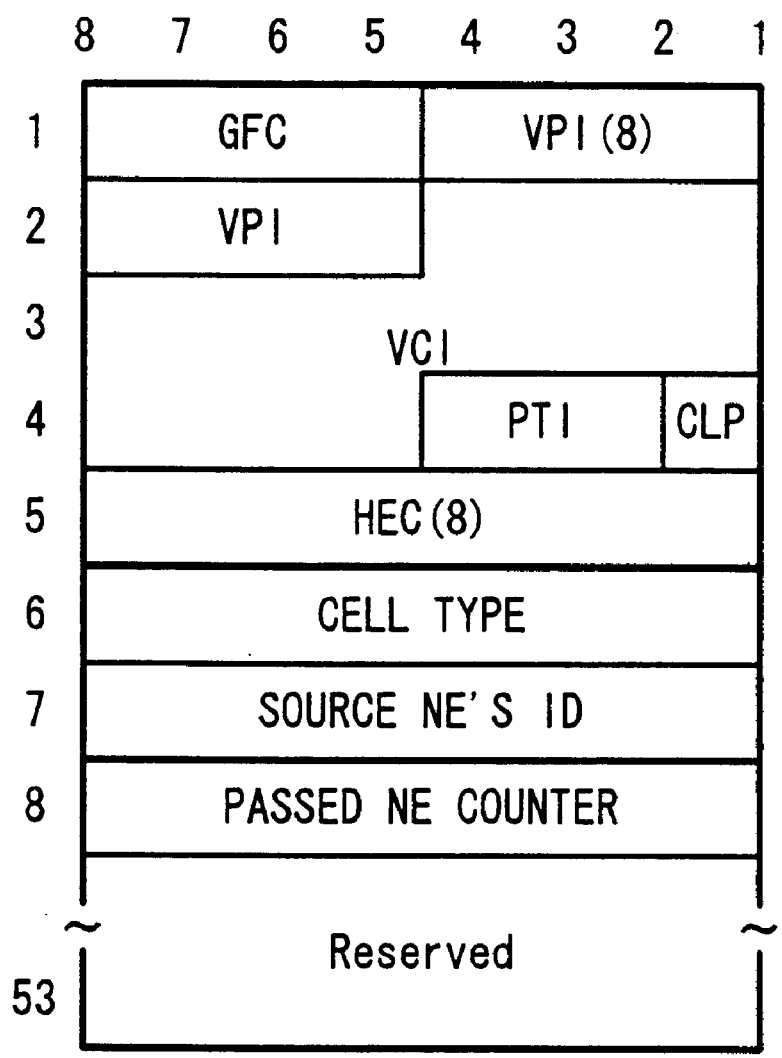
FIG. 6 is a diagram which shows a format of broadcast routing control cells generated by a broadcast routing controller shown in FIG. 3.

FIG. 6 is a diagram which shows a format of broadcast routing control cells generated by the broadcast routing controller 16g shown in FIG. 3. The illustrated cell consists of a header section, the first to fifth octets, and a payload section, the sixth to fifty-third octets. In this format, the payload section conveys a "CELL TYPE" field, a "SOURCE NE's ID" field, and a "PASSED NE COUNTER" field. More specifically, the "CELL TYPE" field stores the identifier indicative of its identity as a broadcast routing control cell. The "SOURCE NE's ID" field stores the identifier of the source ATM network element that has transmitted this broadcast routing control cell. The "PASSED NE COUNTER" field is used to record the number of ATM network elements that this broadcast routing control cell has passed while being relayed from node to node.

Figure 7:
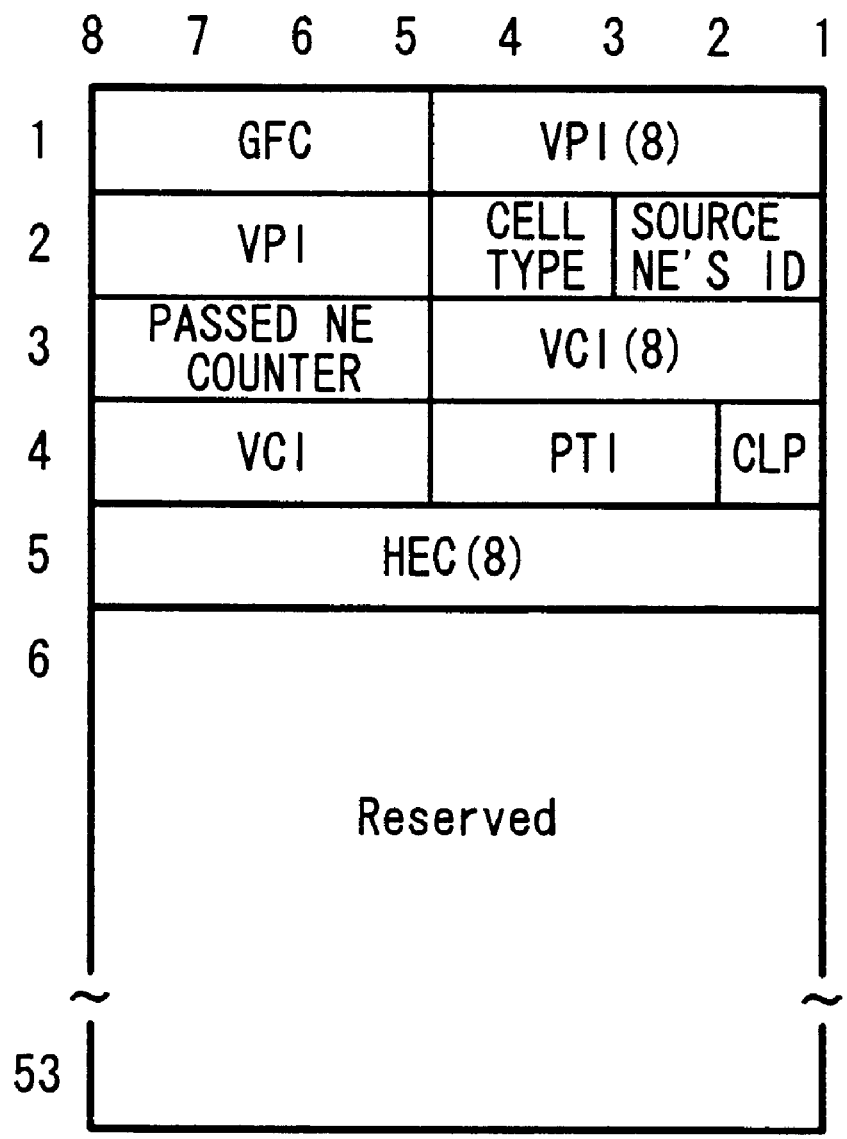
FIG. 7 is a diagram which shows another format of broadcast routing control cells, which is proposed as an alternative to that of FIG. 6.

In an alternative implementation of broadcast routing control cells, the "CELL TYPE," "SOURCE NE's ID," and "PASSED NE COUNTER" fields can be embedded into the cell header by contracting the existing VCI field from sixteen bits to eight bits as shown in FIG. 7. This alternative format allows the whole payload section to be reserved for other usage.

Figure 8:
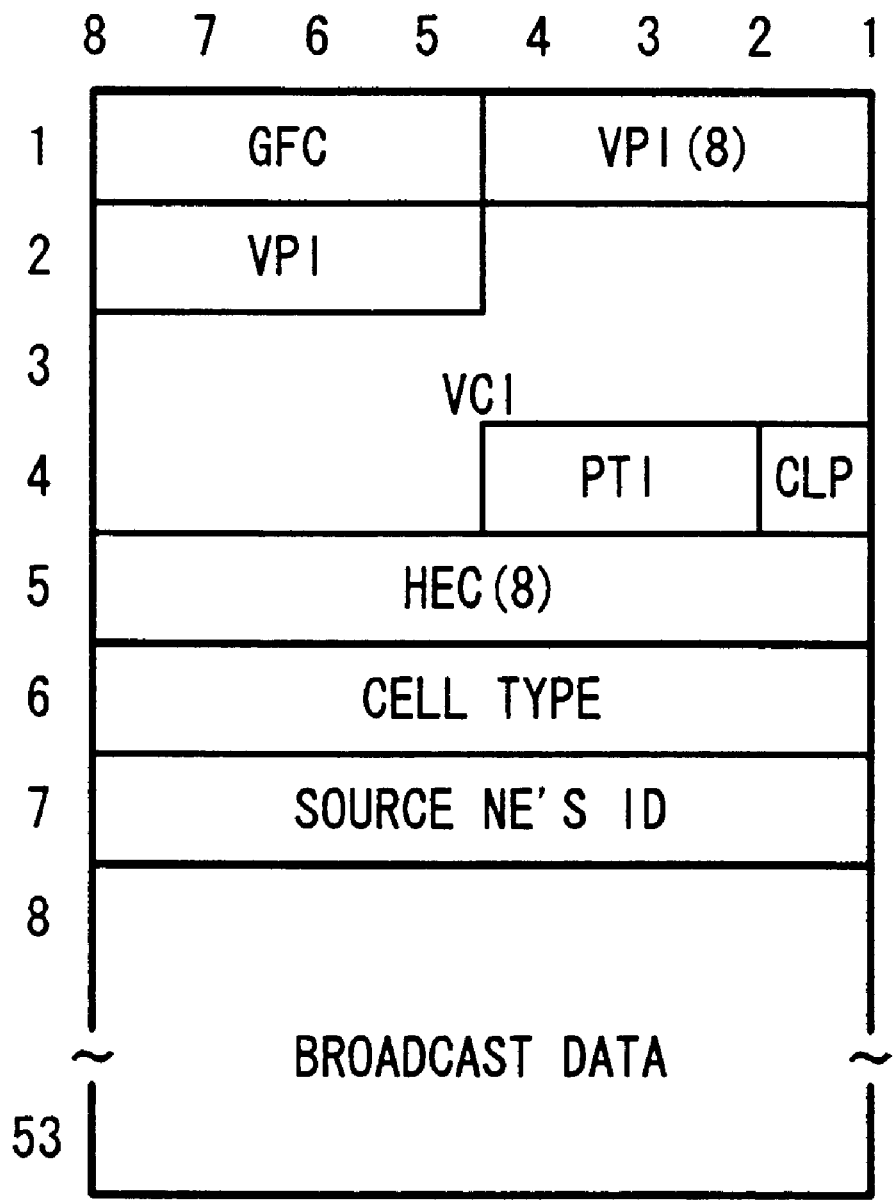
FIG. 8 is a diagram which shows a format of broadcast cells generated by a service controller and an ATM controller.

FIG. 8 shows a format of broadcast cells generated by the service controller 16b and ATM interface controller 16d. The broadcast cell, which term actually means a "broadcast data cell" as opposed to broadcast routing control cells, consists of a header section, the first to fifth octets, and a payload section, the sixth to fifty-third octets. In this format, a part of the payload section is defined as "CELL TYPE" and "SOURCE NE's ID" fields, while the rest is used to convey broadcast data. More specifically, the "CELL TYPE" field stores the identifier to indicate that the cell is a broadcast cell, while the "SOURCE NE's ID" field stores the identifier of the source ATM network element that has originally distributed this broadcast cell upon request from a service provider terminal.

Figure 9:
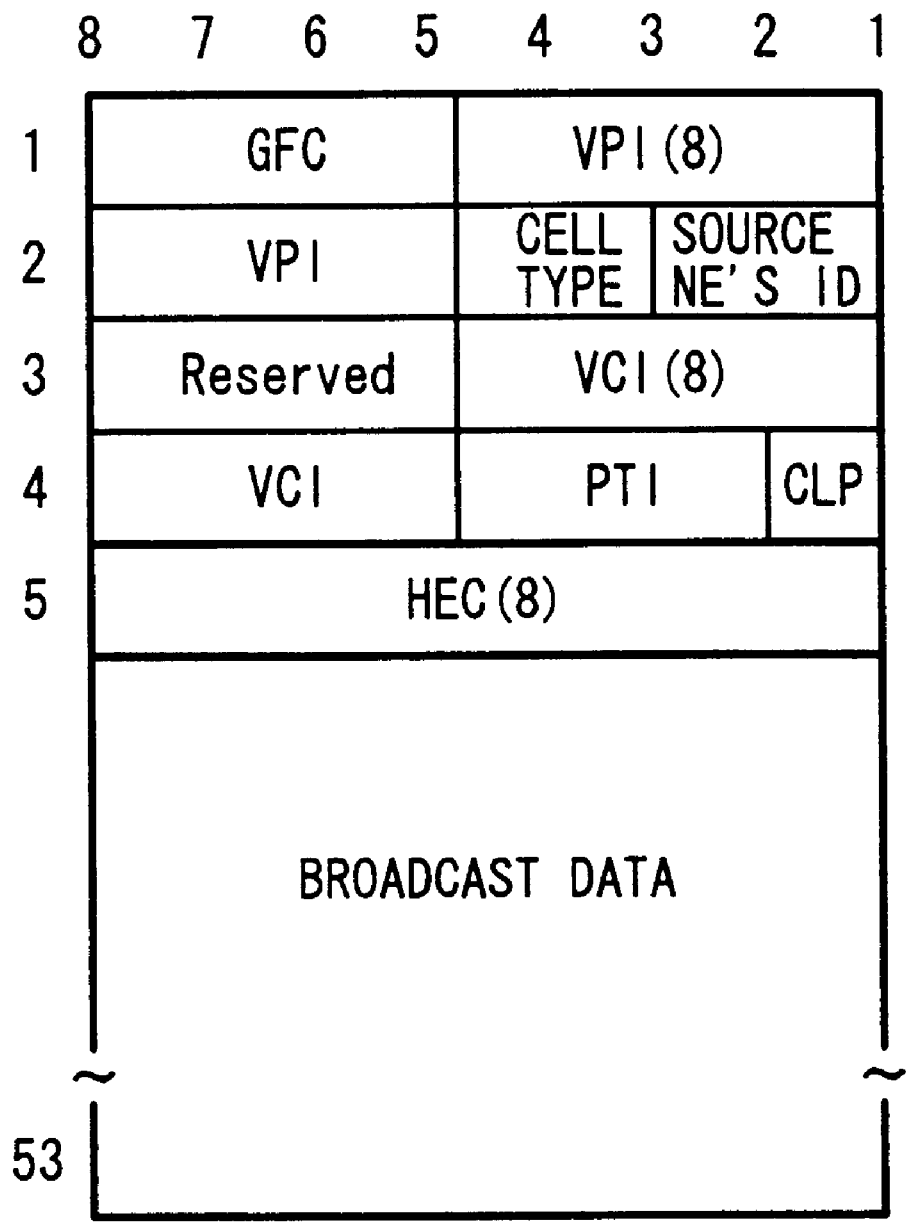
FIG. 9 is a diagram which shows another format of broadcast cells, which is proposed as an alternative to that of FIG. 8.

As an alternative implementation of broadcast cells, the "CELL TYPE" and "SOURCE NE's ID" fields can be embedded into the cell header section, while contracting the existing VCI field from sixteen bits to eight bits as shown in FIG. 9. This alternative format allows the present invention to be implemented in broadcast service applications without affecting the payload section, thus meeting a demand that the whole payload section be used to transport user data. Another advantage of this format is the compatibility with the existing systems. Any broadcast cells are accepted without problem, even if they are from conventional ATM network elements that do not support the routing method of the present invention. This option also allows two different communities to coexist in the same ATM network; one community supports the new routing method, while the other does not. Of course, every broadcast cell is subjected to the routing method of the present invention within the former community.

Figure 10:
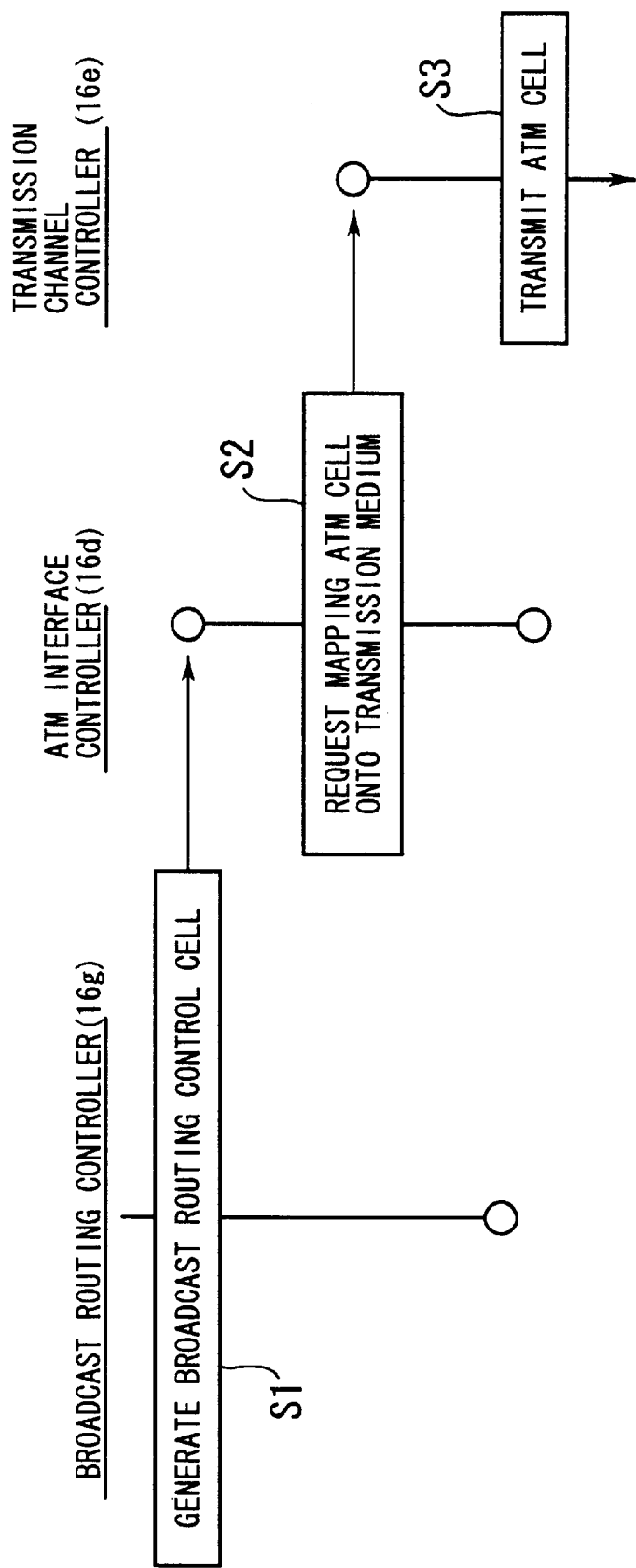
FIG. 10 is a flowchart which shows a transmission process executed by a service provider terminal to send a broadcast routing control cell.

FIG. 10 is a flowchart which shows a cell transmission process executed by the service provider terminal 16 to send a broadcast routing control cell. The next explanation will follow the steps shown in FIG. 10.

[S1] Triggered by a command from an external source or upon completion of the system's start-up procedure, the broadcast routing controller 16g generates broadcast routing control cell.

[S2] The ATM interface controller 16d requests the transmission channel controller 16e to map the broadcast routing control cell generated by the broadcast routing controller 16g onto the transmission medium being used.

[S3] The transmission channel controller (TxCC) 16e sends out the broadcast routing control cell to the ATM network element 11 by mapping it onto the transmission medium.

As an alternative to the above, the ATM network element 11 can be configured to generate and transmit a broadcast routing control cell upon request from the service provider terminal 16. The ATM network element 11 can also be configured, as another alternative implementation, to transmit a broadcast routing control cell automatically when the system starts up.

Figure 11:
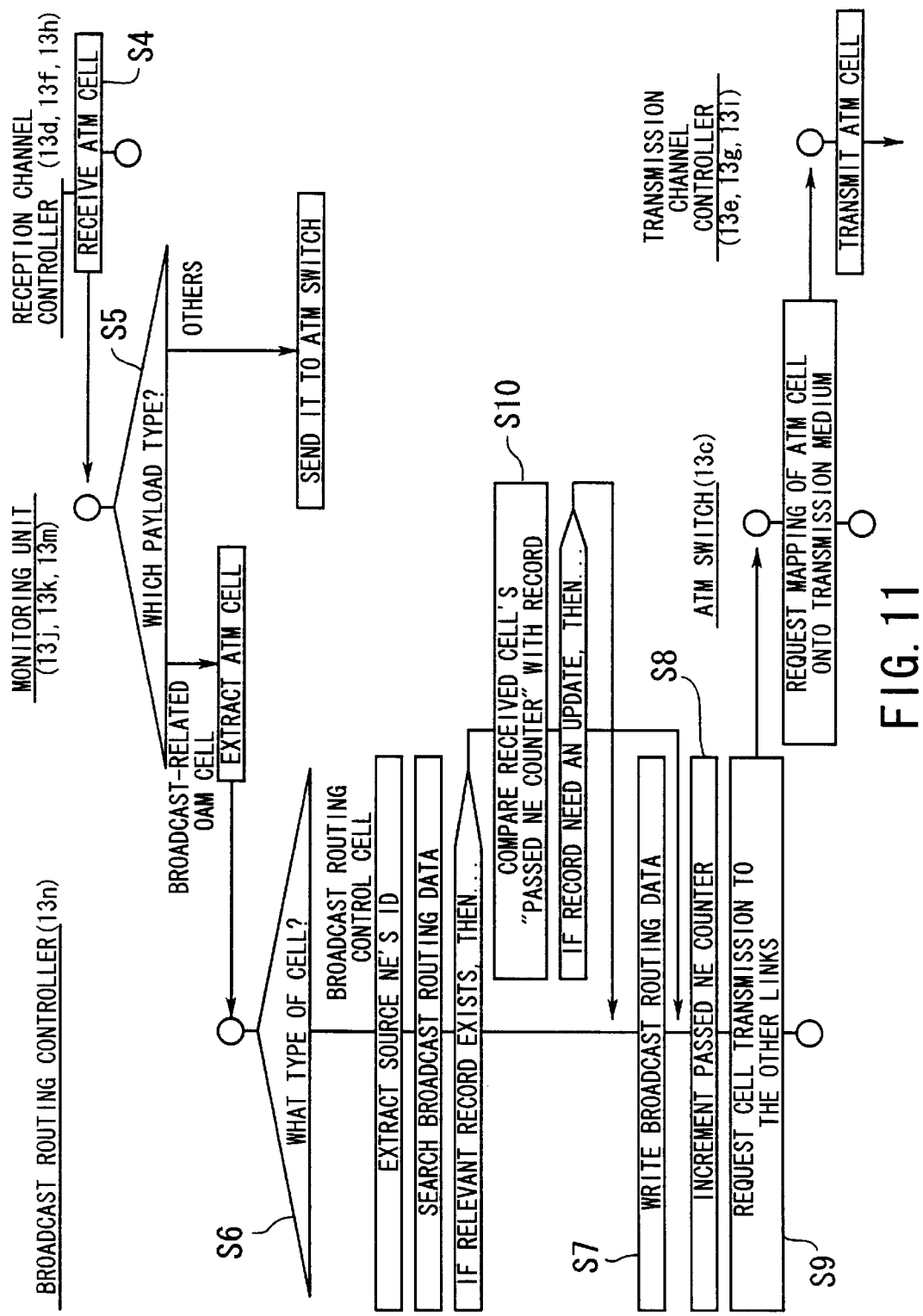
FIG. 11 is a flowchart which shows a process executed by each ATM network element to receive and relay a broadcast routing control cell.

FIG. 11 is a flowchart showing a process executed by the ATM network element 13 to receive and relay the broadcast routing control cells. This flowchart assumes that the ATM network element 13 has received two broadcast routing control cells from the service provider terminal 16; one is through the ATM network elements 11, 12, and 14, and the other directly from the ATM network element 11. Note that this sequence is not restricted to the ATM network element 13, but also applicable to other ATM network elements 11, 12, 14, and 15, basically. The next explanation will follow the steps shown in FIG. 11.

[S4] The reception channel controller 13f receives a first broadcast routing control cell and sends it to the monitoring unit 13k. This first broadcast routing control cell carries the identifier of the ATM network element 11 in its "SOURCE NE's ID" field and a count value of "3" in its "PASSED NE COUNTER" field. In parallel to this, the reception channel controller 13d receives a second broadcast routing control cell and supplies it to the monitoring unit 13j, which contains the identifier of the ATM network element 11 in its "SOURCE NE's ID" field and a count value of "1" in its "PASSED NE COUNTER" field.

[S5] The monitoring units 13j, 13k, and 13m examine the payload type of each ATM cell sent from the reception channel controller 13d, 13f, and 13h, respectively. If the received cell is a broadcast-related OAM cell, they subject it to the broadcast routing controller 13n, and if not, they forward it to the ATM switch 13c. In the present context, the monitoring unit 13k extracts the first broadcast routing control cell, which is a broadcast-related OAM cell, and passes it to the broadcast routing controller 13n. Likewise, the monitoring unit 13j extracts the second broadcast routing control cell and passes it to the broadcast routing controller 13n.

Figure 13:
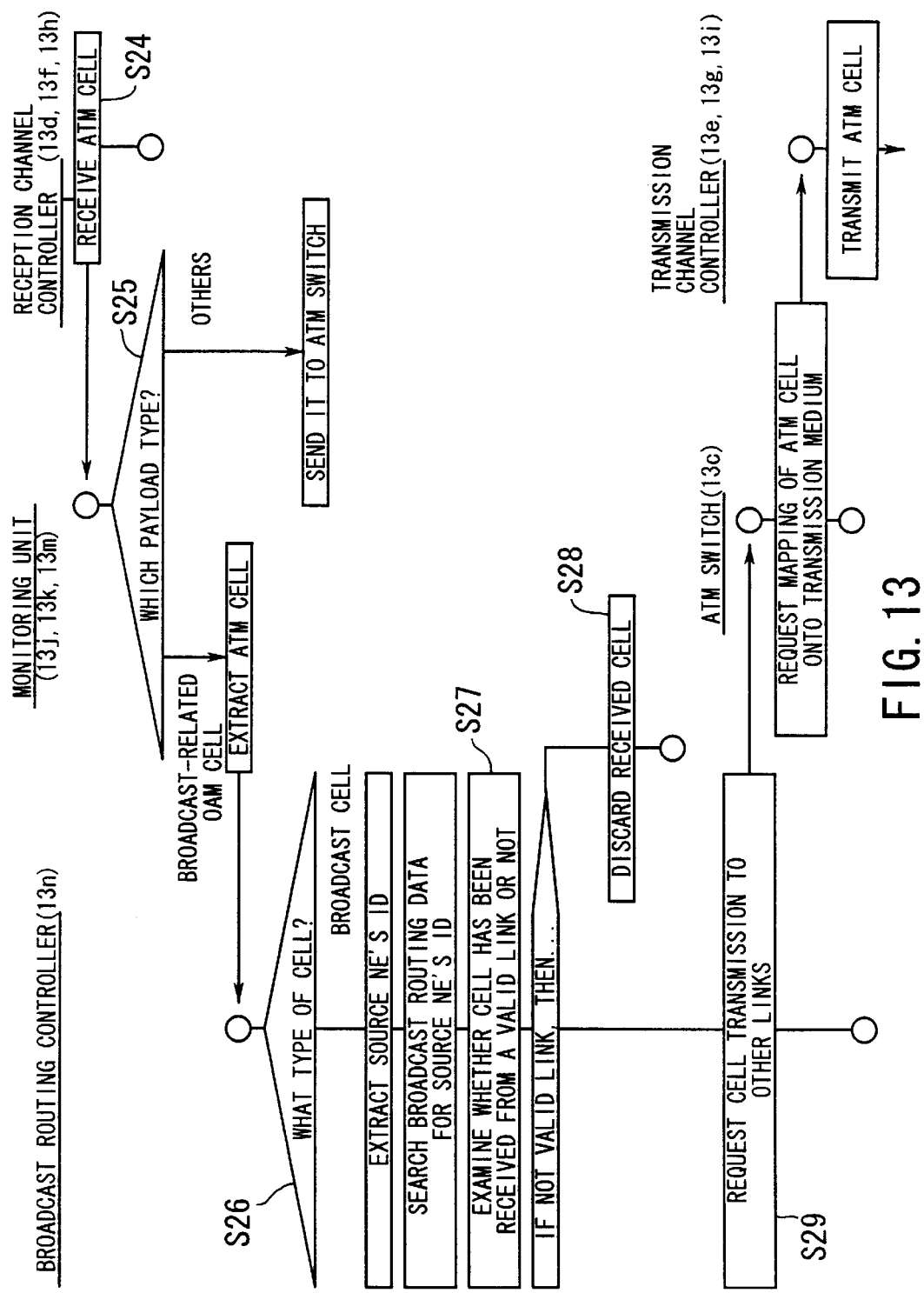
FIG. 13 is a flowchart which shows a process executed by each ATM network element to receive and relay a broadcast cell.

[S6] Upon receipt of a broadcast-related OAM cell, the broadcast routing controller 13n checks its cell type to perform the following process in the case of a broadcast routing control cell. (Here, FIG. 11 only shows the case that the received OAM cell is a broadcast routing control cell and is not appropriate for broadcast cells. FIG. 13 separately explains a process to handle them.)

More specifically, the broadcast routing controller 13n extracts the identifier of the source ATM network element described in the "SOURCE NE's ID" field of the received broadcast routing control cell, and searches the broadcast routing data area 13ab for that identifier. If a record containing the identifier in question is found, the process advances to step S10 for further evaluation of the record. Otherwise, the process goes to step S7 for registration of a new record.

In the present context, that the aforementioned first broadcast routing control cell has arrived first among others, and the process advances to step S7, because the identifier of the source ATM network element 11 cannot be found in any "SOURCE NE's ID" fields stored in the broadcast routing data area 13ab.

[S7] A new record regarding the broadcast routing control cell in process is entered to the broadcast routing data area 13ab. In the present example, the new record concerning the first broadcast routing control cell has to contain the following values in its three data fields: the ATM network element 11's identifier ("SOURCE NE's ID" field), the name of the ATM network element 13's link extending to ATM network element 14 ("MINIMUM-NE RECEPTION LINK" field), and a value of "3" ("NUMBER OF PASSED NEs" field).

[S8] The broadcast routing controller 13n increments the "PASSED NE COUNTER" field by one, concerning the broadcast routing control cell in process. In the present context, the value of the "PASSED NE COUNTER" field of the first broadcast routing control cell is changed from "3" to "4."

[S9] The broadcast routing controller 13n sends some predetermined commands to the ATM switch 13c as well as to the transmission channel controllers 13e, 13g, and 13i so that the broadcast routing control cell be transferred to other network elements through all links except for the one used to receive the cell. In the present example, the first broadcast routing control cell is redistributed from the ATM network element 13 to the ATM network elements 11 and 15 via the transmission channel controllers 13e and 13i, respectively.

[S10] The broadcast routing controller 13n searches the broadcast routing data area 13ab for a record that contains the identifier of the source ATM network element as described in the "SOURCE NE's ID" field of the broadcast routing control cell being processed. If such a record is found, the broadcast routing controller 13n reads out the value stored in the "NUMBER OF PASSED NEs" field of the record, and compares it with the value of the "PASSED NE COUNTER" field of the broadcast routing control cell being processed. When this comparison indicates that the "PASSED NE COUNTER" is smaller than the "NUMBER OF PASSED NEs," it is time for the broadcast routing controller 13n to update the record in the broadcast routing data area 13ab, and if this is the case, the present process branches to step S7. In turn, the process proceeds to step S8, if the "PASSED NE COUNTER" field value is equal to or greater than the "NUMBER OF PASSED NEs" field value.

In the present example, the second broadcast routing control cell coming after the first broadcast routing control cell will be subjected to the process of step S10. The second broadcast routing control cell exhibits a value of "1" in its "PASSED NE COUNTER" field, which is smaller than the recorded value "3" of "NUMBER OF PASSED NEs" that has been given by the first broadcast routing control cell formerly. According to this result of comparison, the process proceeds to step S7, where the broadcast routing controller 13n updates the current value "3" in the "NUMBER OF PASSED NEs" field corresponding to the ATM network element 11 to a new value "1," as well as writing the name of the link 13za extending to the source ATM network element 11 into the "MINIMUM-NE RECEPTION LINK" field of the record. The broadcast routing controller 13n then changes the "PASSED NE COUNTER" field of the broadcast routing control cell from "1" to "2" (step S8), and transmits it from the ATM network element 13 to the ATM network elements 14 and 15 (step S9).

In the way described above, a record corresponding to the identifier of the ATM network element 11 is retrieved from the broadcast routing data area 13ab, and its "NUMBER OF PASSED NEs" field is updated with the number of network elements on the shortest path among those that connect the ATM network element 11 to the ATM network element 13. Further, the name of the link 13za where the shortest path ends is entered to the "MINIMUM-NE RECEPTION LINK" field of the record.

Incidentally, there are two different paths between the ATM network elements 11 and 14 as shown in FIG. 2; one passes through the ATM network element 12 and the other the ATM network element 13. Broadcast routing control cells that have traveled along these two paths will exhibit the same value of "2" in their respective "PASSED NE COUNTER" fields. The routing data in this case is determined by giving priority to the broadcast routing control cell that has come first.

The next section explains a routing process for broadcast cells on the basis of the routing data formulated in the broadcast routing data area 13ab for each source ATM network element having a local service provider terminal.

Figure 12:
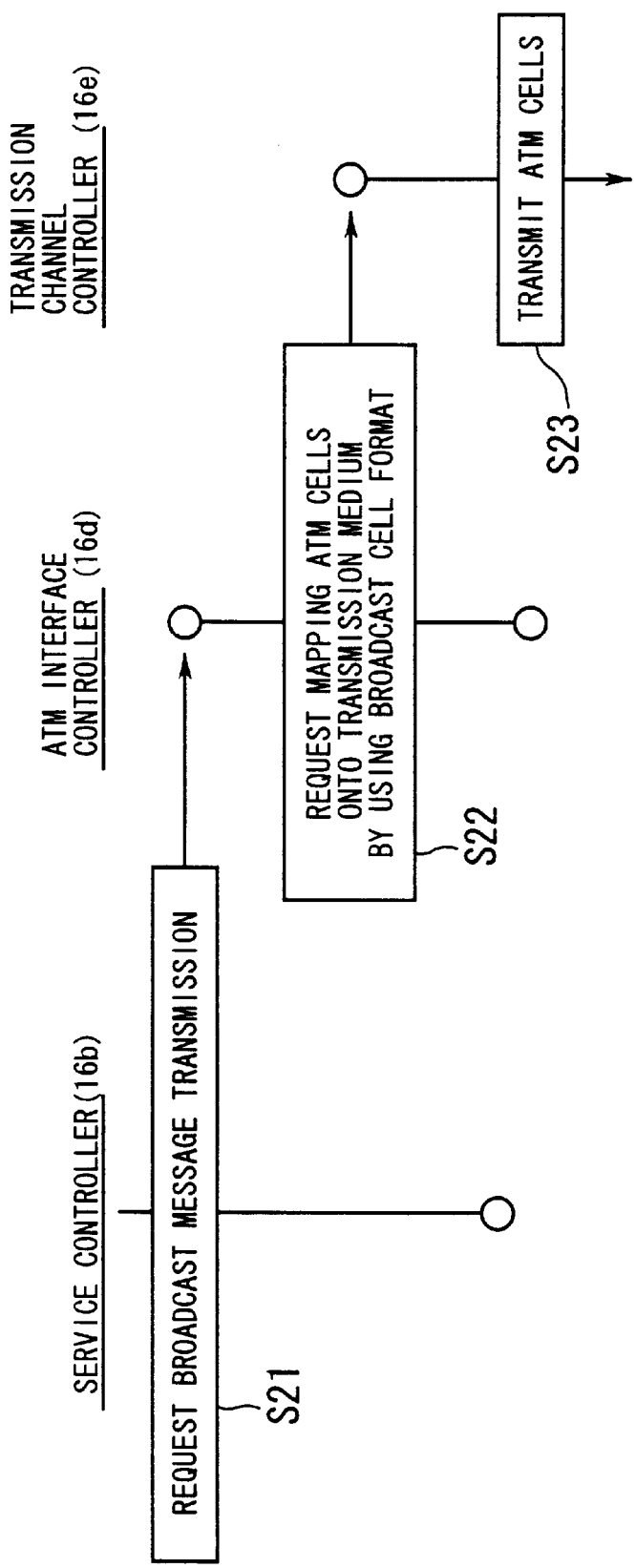
FIG. 12 is a flowchart which shows a transmission process executed by a service provider terminal to send a broadcast cell.

FIG. 12 is a flowchart which shows a cell transmission process executed by the service provider terminal 16 to send broadcast cells over the ATM network. The explanation will follow the steps shown in FIG. 12.

[S21] When it becomes necessary to broadcast some administrative information, or when a scheduled time has come to deliver regular news programs to all client terminals, the service controller 16b obtains relevant transmission data from the service providing unit 16c, and then requests the ATM interface controller 16d to broadcast the data.

[S22] The ATM interface controller 16d assembles the transmission data supplied from the service controller 16b into small packets, or the broadcast cells. It then requests the transmission channel controller 16e to perform the mapping of these broadcast cells onto a transmission medium being used.

[S23] The transmission channel controller 16e sends out the broadcast cells to the ATM network element 11 by mapping them onto the transmission medium.

FIG. 13 is a flowchart which shows a process executed by the ATM network element 13 to receive and relay the broadcast cells. This flowchart assumes that the ATM network element 13 has received two broadcast cells originated at the service provider terminal 16; one is received through the ATM network elements 11, 12, and 14, and the other directly from the ATM network element 11. Note that this sequence is also applicable to any other ATM network elements 11, 12, 14, and 15, basically. The next explanation will follow the steps shown in FIG. 13.

[S24] The reception channel controller 13d receives a first broadcast cell and forwards it to the monitoring unit 13j. This first broadcast routing control cell carries the identifier of the source ATM network element 11 in its "SOURCE NE's ID" field. In parallel to this, the reception channel controller 13f receives a second broadcast cell and supplies it to the monitoring unit 13k, which also contains the same identifier of the ATM network element 11 in its "SOURCE NE's ID" field.

[S25] The monitoring units 13j, 13k, and 13m are designed to examine the payload type of each ATM cell sent from the reception channel controllers 13d, 13f, and 13h, respectively. If the received cell is a broadcast-related OAM cell, they subject it to the broadcast routing controller 13n, and if not, they forward it to the ATM switch 13c. More specifically, the monitoring unit 13j extracts the first broadcast cell, which falls into the category of broadcast-related OAM cells, and passes it to the broadcast routing controller 13n. Likewise, the monitoring unit 13k extracts the second broadcast cell and passes it to the broadcast routing controller 13n.

[S26] Upon receipt of a broadcast-related OAM cell, the broadcast routing controller 13n checks its cell type field and executes the following process when the cell is found to be a broadcast cell.

That is, the broadcast routing controller 13n searches the broadcast routing data area 13ab to find a record that contains the identifier of the source ATM network element described in the "SOURCE NE's ID" field of the broadcast cell being processed. If such a record is found, the broadcast routing controller 13n reads out a value stored in the "MINIMUM-NE RECEPTION LINK" field of the record, which indicates the name of a valid reception link of the ATM network element 13. In the present example, both of the first and second broadcast cells contain the same identifier of the ATM network element 11 in their respective "SOURCE NE's ID" fields. On the other hand, the following record (or routing data) is now available in the broadcast routing data area 13ab as a result of the process explained in FIG. 11.

SOURCE NE's ID=(ATM network element 11's ID)
NUMBER OF PASSED NEs=1
MINIMUM-NE RECEPTION LINK=(Link 13za)

The broadcast routing controller 13n finds this record in step S26 and learns from this record that the link 13za of the ATM network element 13 is the right link to use. In other words, the link 13za is the valid reception link when receiving broadcast cells from the source ATM network element 11.

[S27] The broadcast routing controller 13n then examines whether or not the received broadcast cell is from the valid reception link indicated by a relevant record in the broadcast routing data area 13ab. If it is, the cell is qualified as a broadcast cell that has reached there through the shortest path, and accordingly, the process advances to step S29. Otherwise, the process proceeds to step S28, while regarding the received broadcast cell as an unwanted duplication.

[S28] Unwanted broadcast cells must be discarded in this step S28. In the present example, the broadcast routing controller 13n discards the second broadcast cell delivered from the ATM network element 14 to the ATM network element 13 through the link 13zb.

[S29] The broadcast routing controller 13n terminates the received broadcast cell to deliver the cell to its subordinate client terminals. At the same time, the broadcast routing controller 13n sends some predetermined commands to the ATM switch 13c and transmission channel controller 13e, 13g, and 13i in order to transfer the broadcast cell through all links except for the reception link where the cell was received. In the present example, the first broadcast cell is redistributed from the ATM network element 13 to the ATM network elements 14 and 15.

Figure 14:
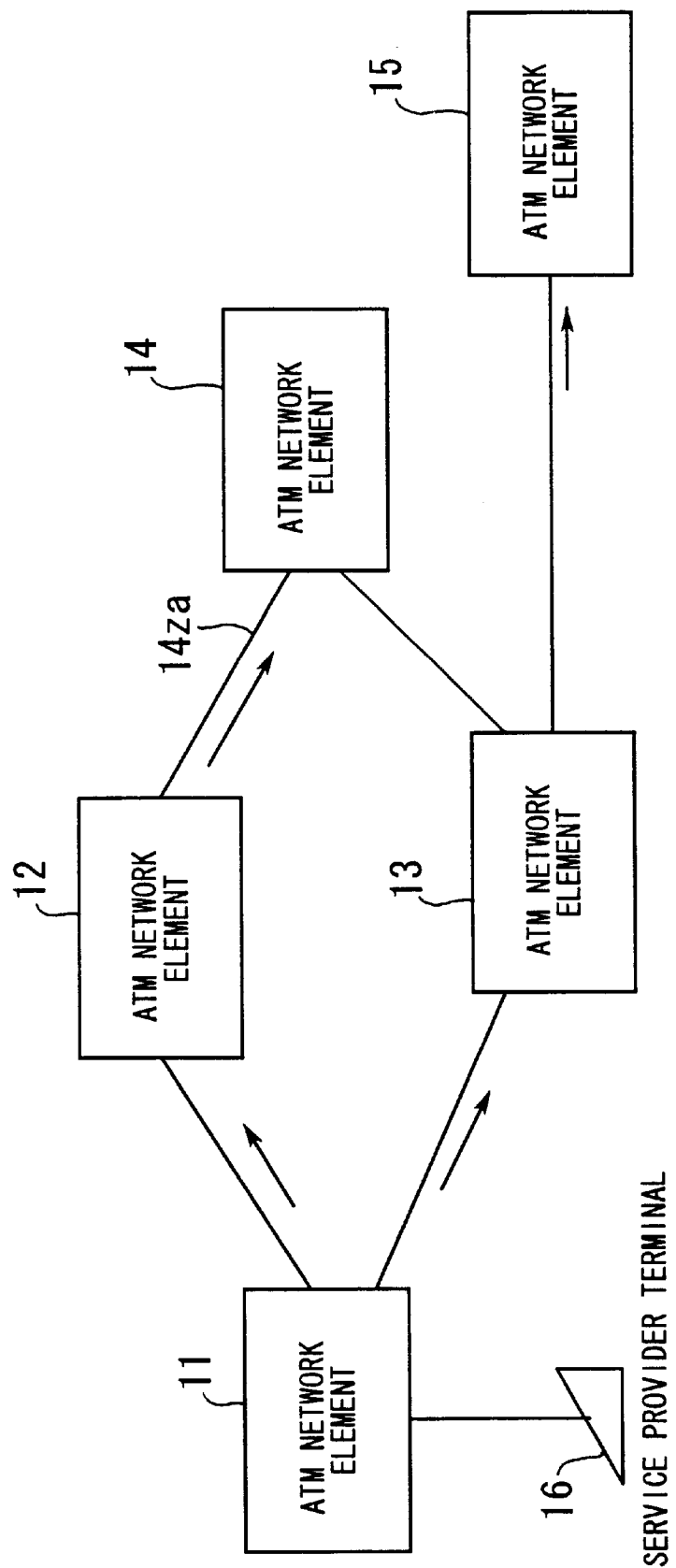
FIG. 14 is a diagram which shows transmission paths for broadcast cells to reach to every ATM network element.

In this way, each ATM network element retrieves routing data relevant to the source ATM network element out of its broadcast routing data area. On the basis of this routing data, the broadcast cells received from a particular link are selectively terminated, as well as being passed to the next network elements. As opposed to this, broadcast cells received through other links are simply discarded without applying any further process. FIG. 14 depicts how the broadcast cell originated at the service provider terminal 16 is relayed in the above-described process to reach every ATM network element in the network. As such, the broadcast control system according to the present invention has successfully determined unique distribution routes for the broadcast cells.

The ATM cell flows illustrated in FIG. 14 imply that the ATM network element 14 has given priority to a broadcast routing control cell sent from the ATM network element 12 over that from the ATM network element 13, and thus it has chosen the link 14*za* reaching the ATM network element 12 as its valid reception link.

In the first embodiment explained above, the increment of "PASSED NE COUNTER" is a constant value of "1." That is, every ATM network element is designed to increase the "PASSED NE COUNTER" field of a broadcast routing control cell by the same increment value "1" in step S8 of FIG. 11. As opposed to this "fixed increment" policy, the ATM network elements can also take a "weighted increment" policy, in which some particular network elements give an increment of "2" or more to the "PASSED NE COUNTER." This option is effective when those network elements have only a limited switching performance compared to others', since it will reduce the cell traffic and thus relieve the workload imposed on them in relaying ATM cells.

Figure 15:
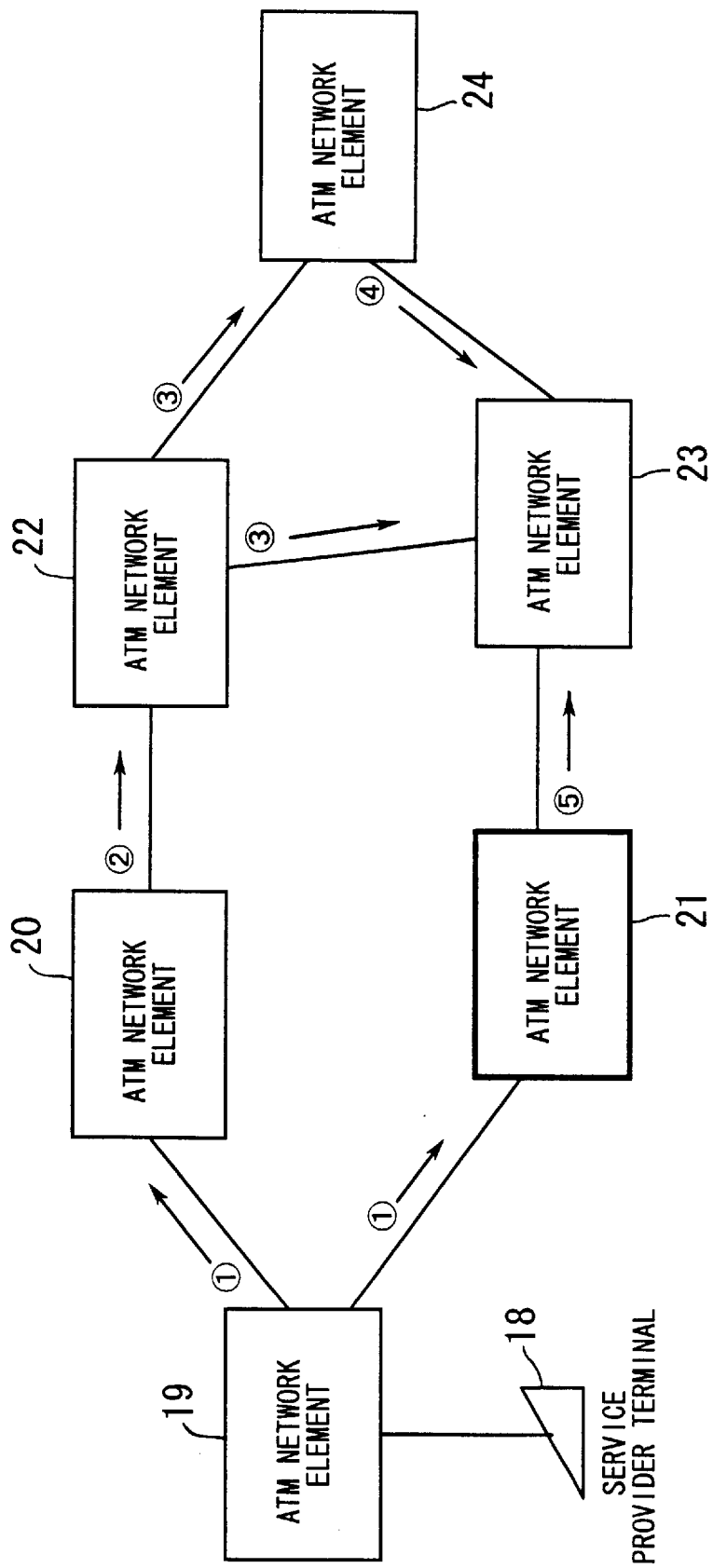
FIG. 15 is a diagram which shows an ATM network where a broadcast routing control cell is given an increment of two or more to update its "PASSED NE COUNTER" field when passing through a particular network element.

Referring now to FIG. 15, the following few paragraphs will explain a variant of the first embodiment based on the weighted increment policy. Suppose that a plurality of ATM network elements 19 to 24 are connected with each other, and the ATM network element 19 has a link to a service provider terminal 18. It is also assumed that the ATM network element 21 is inferior to others in terms of cell switching capability. When a broadcast routing control cell is received, the ATM network element 21 forwards it to other network elements after giving an increment of "4" to the "PASSED NE COUNTER" field of the received cell, while the other ATM network elements increment it by "1" as usual.

The resultant traffic of broadcast routing control cells is illustrated in FIG. 15, where the arrows indicate the flow of broadcast routing control cells sent from the service provider terminal 18 via the ATM network element 19. The numerals ① to ⑤ affixed to the arrows represent the "PASSED NE COUNTER" field values of broadcast routing control cells being transferred.

In such a situation, the ATM network element 23 receives three broadcast routing control cells in all, but chooses a route from the service provider terminal 18 via the ATM network elements 19, 20, and 22 as substantially the shortest path for transporting broadcast cells. With the fixed increment policy, the ATM network element 23 would select a route from the service provider terminal 18 via the ATM network element 21. In contrast to this, the weighted increment policy allows the ATM network element 21 to escape from handling of the cell traffic toward the ATM network element 23.

Now, the next section presents a second embodiment of the present invention with reference to FIGS. 16 to 25.

Figure 16:
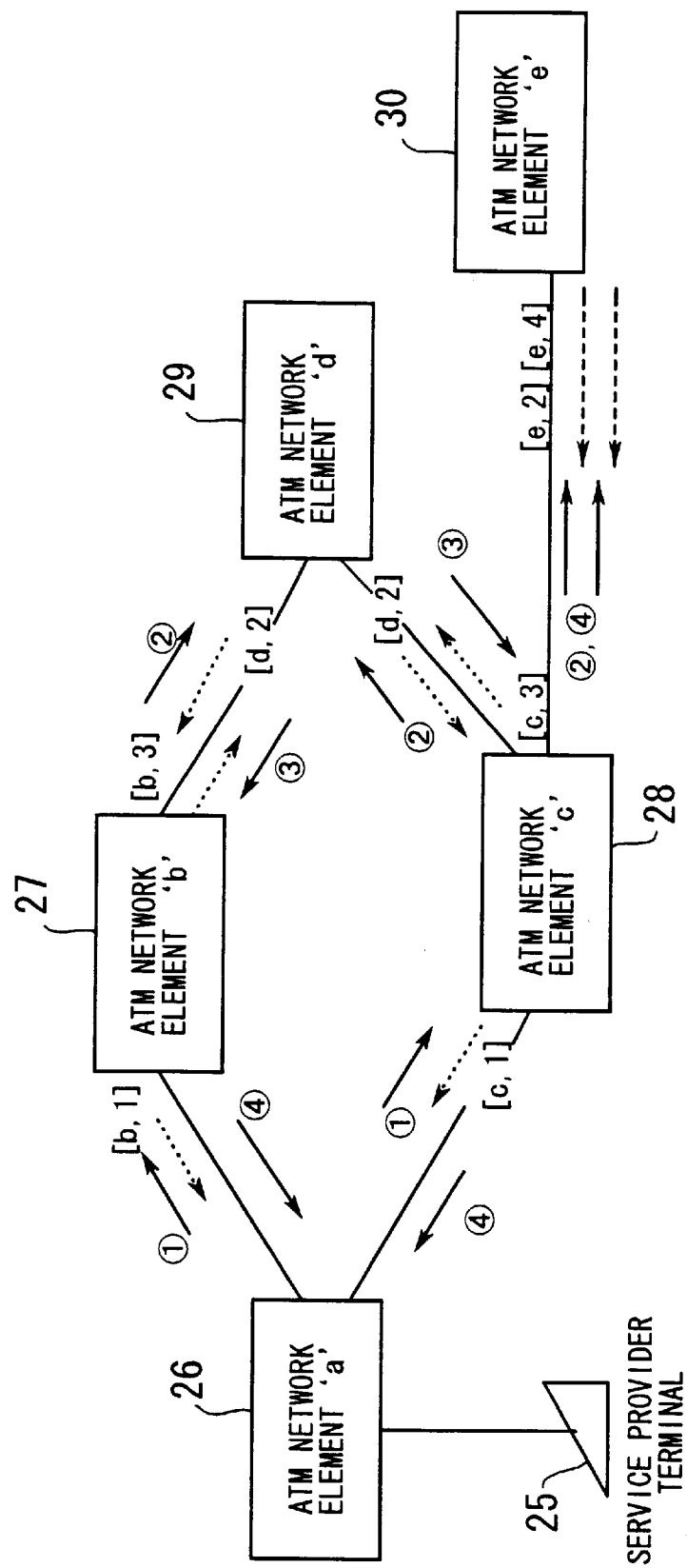
FIG. 16 is a diagram which shows an ATM network and its constituents in a second embodiment of the present invention.

FIG. 16 shows an ATM network and its constituents in the second embodiment of the present invention, which relates to an application of broadcast cells in an ATM-based local area network (ATM-LAN). More particularly, FIG. 16 illustrates how to find a destination ATM address or destination IP address.

Here, a broadcast cell is transmitted from a service provider terminal 25 to all ATM network elements 26 to 30 in the ATM network, as well as to their subordinate client terminals (not shown). Although more service provider terminals can exist in the same ATM network, FIG. 16 only shows one service provider terminal 25 for simplicity.

In this FIG. 16, solid arrows show the flow of broadcast routing control cells that have originated at the service provider terminal 25 and distributed via the ATM network element 26. The numerals ① to ④, which are circled in FIG. 16, are affixed to each solid arrow to indicate the values of their "PASSED NE COUNTER" fields. In contrast to the solid arrows, dotted arrows in FIG. 16 represent the flow of broadcast routing control response cells ("response cell" for short), which will be described later on. Notes in brackets (e.g., [c,1]) accompanying the dotted arrows are each composed of two parameters. The first parameter, an alphabetical character, represents a response source ID, or the identifier of an ATM network element that has sent a response cell. More specifically, the ATM network elements 26 to 30 have their respective identifiers "a" to "e." The second parameter, a numeral, shows the "PASSED NE COUNTER" value of a broadcast routing control cell that caused that response cell.

Figure 17:
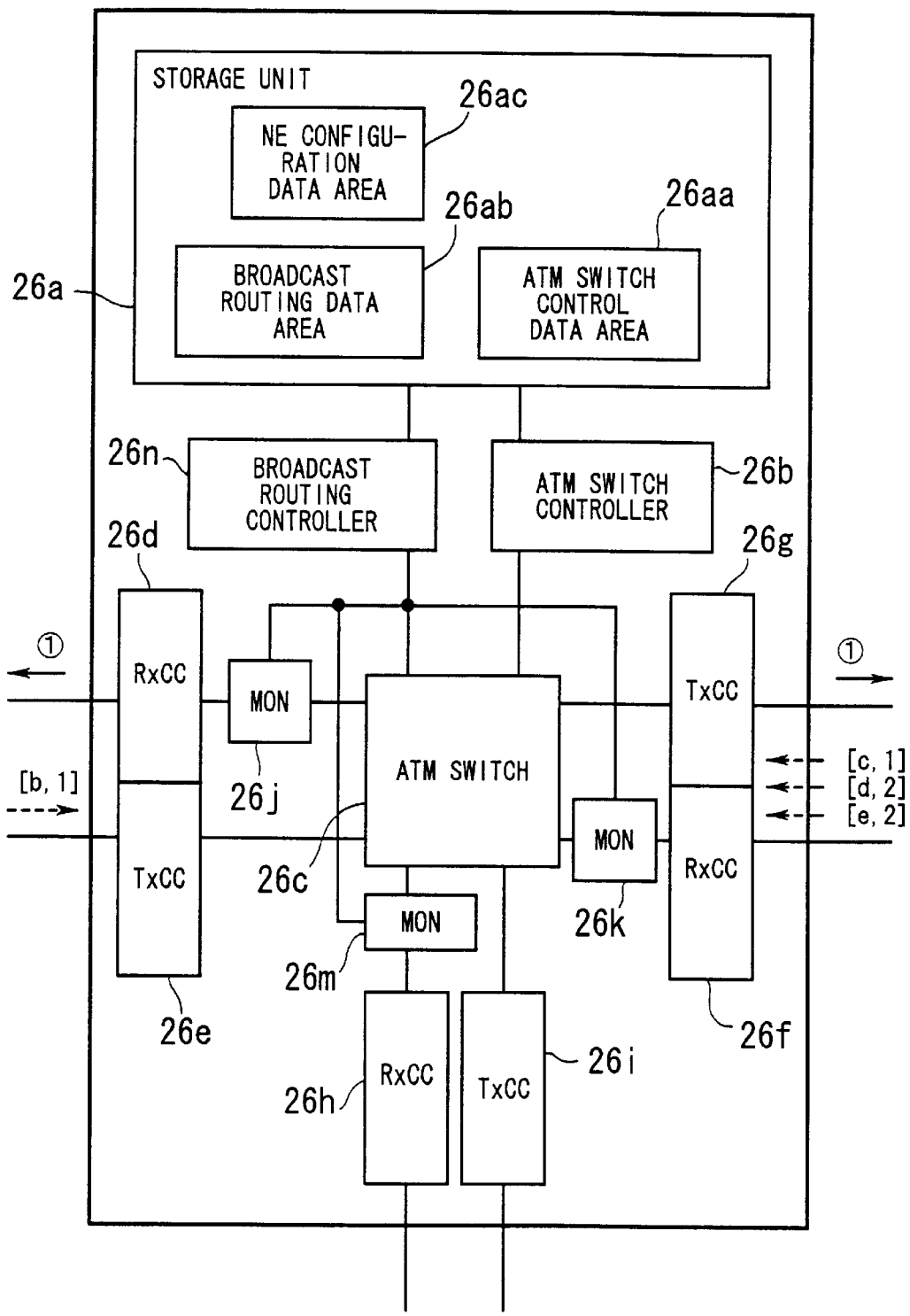
FIG. 17 is a block diagram which shows the internal structure of an ATM network element of the second embodiment with a service provider terminal connected.

FIG. 17 is a block diagram which shows the internal structure of the ATM network element 26, to which the service provider terminal 25 is connected. The configuration of this ATM network element 26 is basically the same as that of the ATM network element 13 of FIG. 4 explained in the first embodiment. Although the body of reference numerals has been changed from "13" to "26," like elements have like suffixes to indicate their functional equivalence. Accordingly, the present description does not repeat the same explanation for those like elements, but focuses on some distinctive points of the second embodiment. Also, note that FIG. 17 does not show all response cells that can be seen in FIG. 16.

The second embodiment is distinguishable from the first embodiment in that an NE configuration data area 26*ac* is newly disposed in a storage unit 26*a*. This NE configuration data area 26*ac* stores information specific to each ATM network element (NE) in the ATM network which has been learned from the broadcast routing control response cells. It also holds the number of network elements on the way to the furthest ATM network element. As will be described later on, the above NE-specific information includes the identifier of a network element (NE ID) and the minimum number of network elements. Note that the NE configuration data area 26*ac* is disposed only in the ATM network elements with some service provider terminals being directly connected thereto. The operation of a broadcast routing controller 26*n* will be described later in detail, referring to flowcharts of FIGS. 22 to 24.

Figure 18:
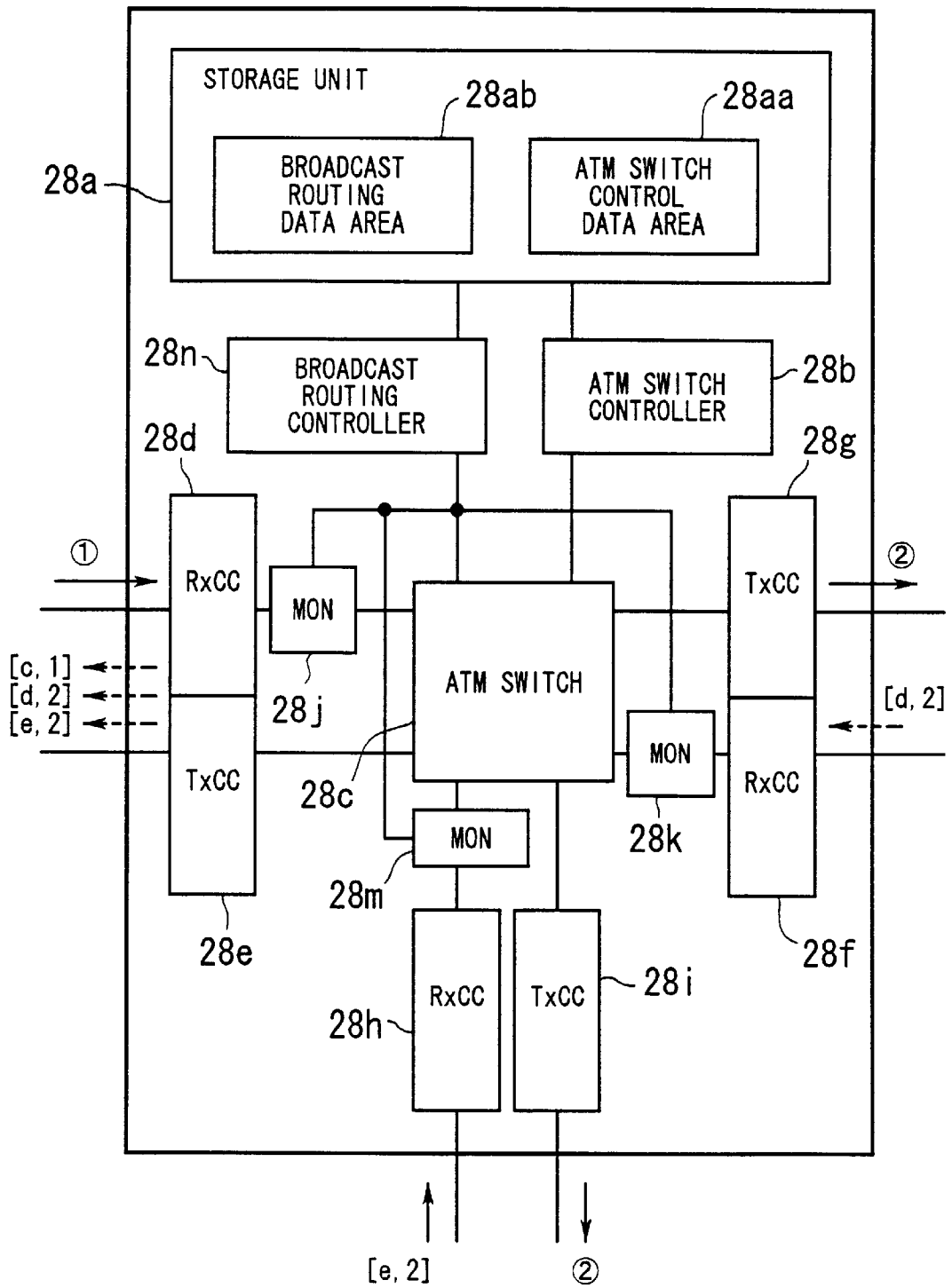
FIG. 18 is a block diagram which shows the internal structure of an ATM network element of the second embodiment with no service provider terminal connected.
Figure 19:
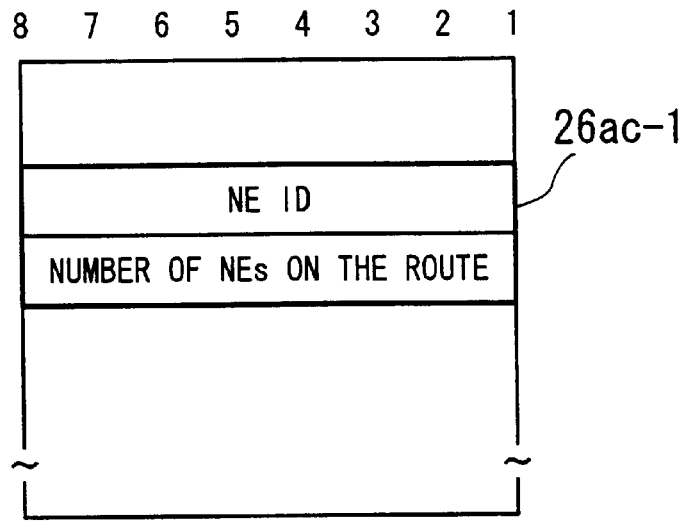
FIG. 19(A) is a diagram which shows first NE configuration data stored in an NE configuration data area according to the second embodiment.
FIG. 19(B) is a diagram which shows second NE configuration data stored in the NE configuration data area in the second embodiment, which indicates maximum number of NEs.
Figure 19:
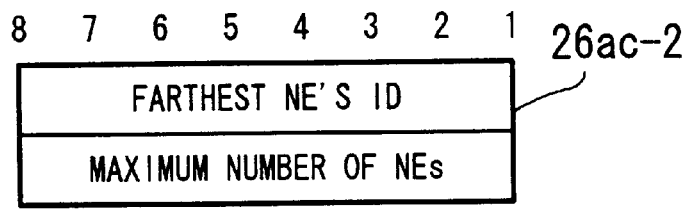

FIG. 18 is a block diagram showing the internal structure of the ATM network element 28 with no local service provider terminal. The configuration of this ATM network element 28 is basically the same as that of the ATM network element 13 of FIG. 4 explained in the first embodiment. Although the body of reference numerals has been changed from "13" to "28," like elements have like suffixes, implying their functional equivalence. Accordingly, the following will not repeat the former explanation for those like elements, but focuses on some distinctive points of the second embodiment. Note that FIG. 18 does not show all response cells that can be seen in FIG. 16.

When a broadcast routing control cell is received, a broadcast routing controller 28*n* replies to it by transmitting a broadcast routing control response cell via its reception link. This response cell contains the identifier of the ATM network element 28 itself and the value of the "NUMBER OF PASSED NEs" copied from the broadcast routing control cell. The operation of a broadcast routing controller 28*n* will be described later in detail, referring to a flowchart of FIG. 22.

FIGS. 19(A) and 19(B) show two kinds of data stored in the NE configuration data area 26*ac*. More specifically, FIG. 19(A) shows data about the configuration of each ATM network element (NE configuration data), which is referred to as a first NE configuration data 26*ac*-1. On the other hand, FIG. 19(B) shows data about the maximum number of NEs between a source network element and the present network element, which is referred to as a second NE configuration data 26ac-2.

Referring now to the first NE configuration data 26ac-1 of FIG. 19(A), the "NE ID" field stores the identifier of a specific ATM network element where response cells originated. The "NUMBER OF NEs ON THE ROUTE" field stores the minimum value of the "NUMBER OF PASSED NEs" field among those observed in a plurality of response cells which have been sent from the source ATM network element to the present ATM network element. Those two data fields, "NE ID" and "NUMBER OF NEs ON THE ROUTE," are defined on an individual network element basis.

Referring next to the second NE configuration data 26ac-2 of FIG. 19(B), the "FARTHEST NE's ID" field stores the identifier of an ATM network element that is located farthest from the present ATM network element. This parameter can be obtained by searching the first NE configuration data 26ac-1 for a particular record that exhibits the largest value of "NUMBER OF NEs ON THE ROUTE" field. When such a record is found, the values of its "NE ID" and "NUMBER OF NEs ON THE ROUTE" fields are copied to the "FARTHEST NE's ID" and "MAXIMUM NUMBER of NEs," respectively.

Figure 20:
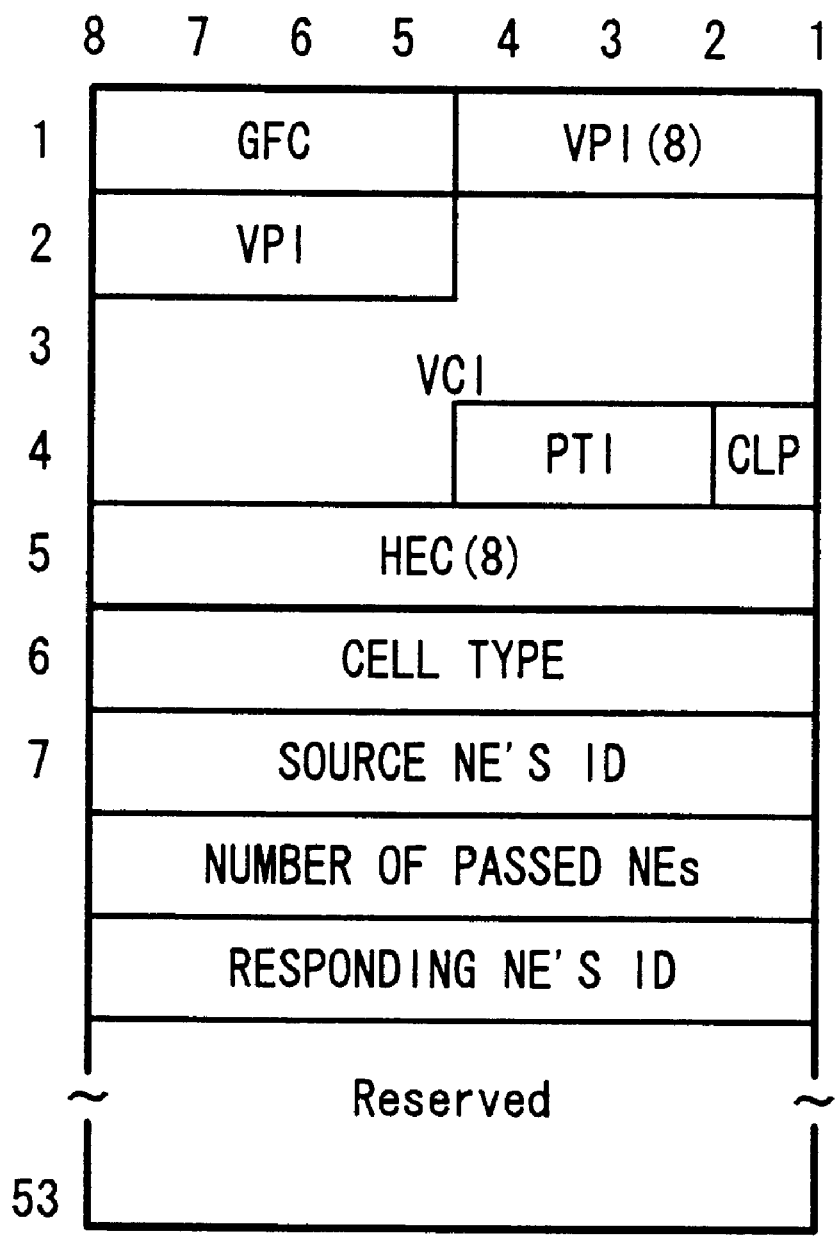
FIG. 20 is a diagram which shows a format of broadcast routing control response cells generated by a broadcast routing controller shown in FIG. 18.

FIG. 20 is a diagram which shows a format of broadcast routing control response cells generated by the broadcast routing controller 28n shown in FIG. 18. The first to fifth octets of a cell in FIG. 20 are a header section, while the sixth to fifty-third octets are a payload section. In this format, "CELL TYPE," "SOURCE NE's ID," "NUMBER OF PASSED NEs," and "RESPONDING NE'S ID" fields are disposed as part of the payload section. More specifically, the "CELL TYPE" field stores a code that shows its identity as a broadcast routing control response cell. The "SOURCE NE's ID" is an identifier indicating which network element is the source of the broadcast routing control cell that has triggered this response cell. The "NUMBER OF PASSED NEs" field is a copy of the "PASSED NE COUNTER" field of the broadcast routing control cell that has been received. The "RESPONDING NE'S ID" is an identifier indicating the sender of this response cell.

Figure 21:
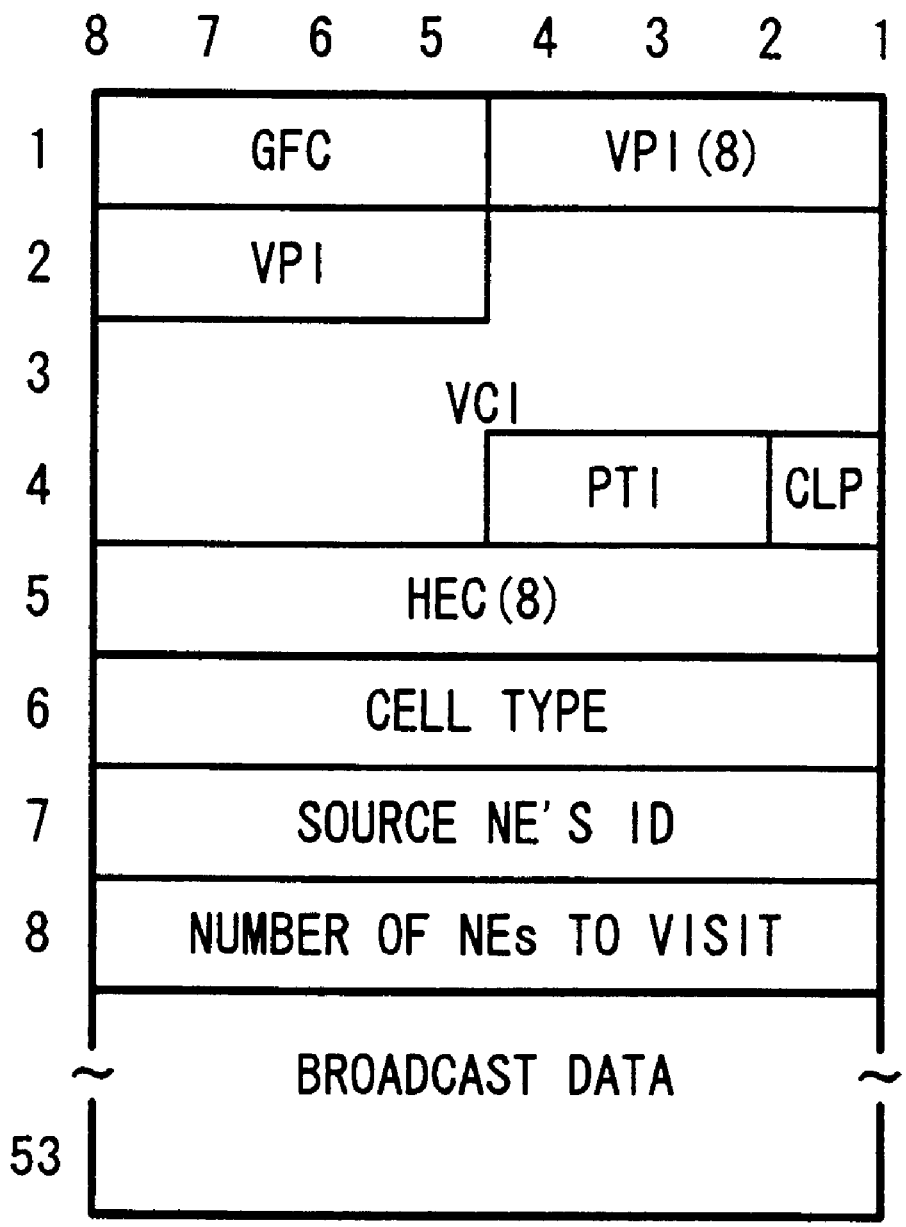
FIG. 21 is a diagram which shows a format of broadcast cells in the second embodiment.

FIG. 21 shows the format of broadcast cells in the second embodiment. The first to fifth octets of a broadcast cell in FIG. 21 serve as a header section, while the sixth to fifty-third octets are a payload section. In this format, "CELL TYPE," "SOURCE NE's ID," and "NUMBER OF NEs TO VISIT" fields are defined as part of the payload section. The "CELL TYPE" field stores a code indicative of the identity as a broadcast cell. The "SOURCE NE's ID" field holds the identifier of an ATM network element to which the service provider terminal sending this broadcast cell is connected. The "NUMBER OF NEs TO VISIT" field is given an initial value from the "MAXIMUM NUMBER OF NEs" field of the second NE configuration data 26ac-2 of FIG. 19(B), which is decreased by one each time the response cell passes an ATM network element.

The next paragraphs will explain the operation of the second embodiment. Although the process actually starts with the transmission of a broadcast routing control cell, the next explanation skips that procedure because it has been discussed in the first embodiment of the present invention referring to FIG. 10.

Figure 22:
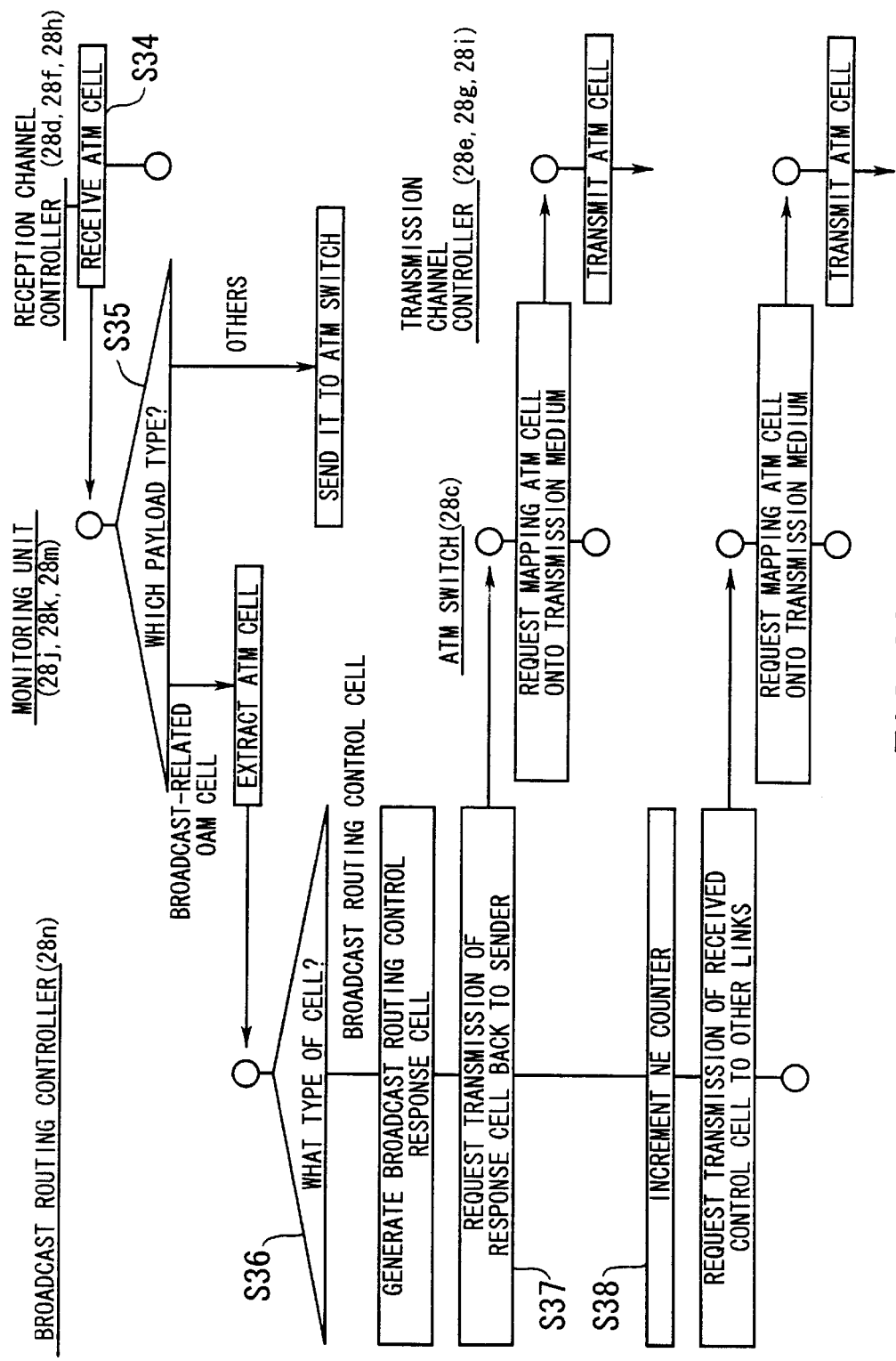
FIG. 22 is a flowchart which shows a process executed by each ATM network element to receive and relay a broadcast routing control cell in the second embodiment.

FIG. 22 is a flowchart which shows a process executed by the ATM network element 28 to receive and relay the broadcast routing control cells. Basically, the same sequence is applicable to other ATM network elements 26, 27, 29, and 30. The explanation will follow the steps shown in FIG. 22.

[S34] The ATM network element 28 may receive a plurality of broadcast routing control cells from different links. Reception channel controllers (RxCC) 28d, 28f, and 28h receive such broadcast routing control cells and sends them to their respective monitoring units (MON) 28j, 28k, and 28m.

[S35] The monitoring units 28j, 28k, and 28m are designed to examine the payload type of each ATM cell received from the reception channel controllers 28d, 28f, and 28h, respectively. If the received ATM cell is a broadcast-related OAM cell, they subject it to the broadcast routing controller 28n, and if not, they forward it to the ATM switch 28c.

[S36] Upon receipt of a broadcast-related OAM cell, the broadcast routing controller 28n checks its cell type field, and if the received OAM cell has turned out to be a broadcast routing control cell, it will generate a broadcast routing control response cell. (In the case that the received OAM cell is a broadcast cell, FIG. 22 is not appropriate, but FIG. 24 will separately show the process to handle it.)

More specifically, the broadcast routing controller 28n extracts the "SOURCE NE's ID" field of the received broadcast routing control cell, and copies the extracted identifier to the "SOURCE NE's ID" field of the response cell. Likewise, it copies the "PASSED NE COUNTER" field of the broadcast routing control cell to the "NUMBER OF PASSED NEs" field of the response cell. The broadcast routing controller 28n then enters its own identifier (NE ID) into the "RESPONDING NE'S ID" field of the response cell.

[S37] The response cell obtained in step S36 is returned to the ATM network element 26, the sender of the broadcast routing control cell, by using the same link that conveyed the broadcast routing control cell. FIG. 16 shows this response cell transmission, where the dotted arrows with notes [c,1] and [c,3] represent response cells generated by the ATM network element 28.

[S38] The broadcast routing controller 28n increments the "PASSED NE COUNTER" field of the broadcast routing control cell by one, and relays it to other network element through all links except for its reception link.

In this way, the response cells are transmitted from each ATM network element that has received a broadcast routing control cell. The following paragraphs describe how those response cells are processed in the receiving ends, say the ATM network element 26.

Figure 23:
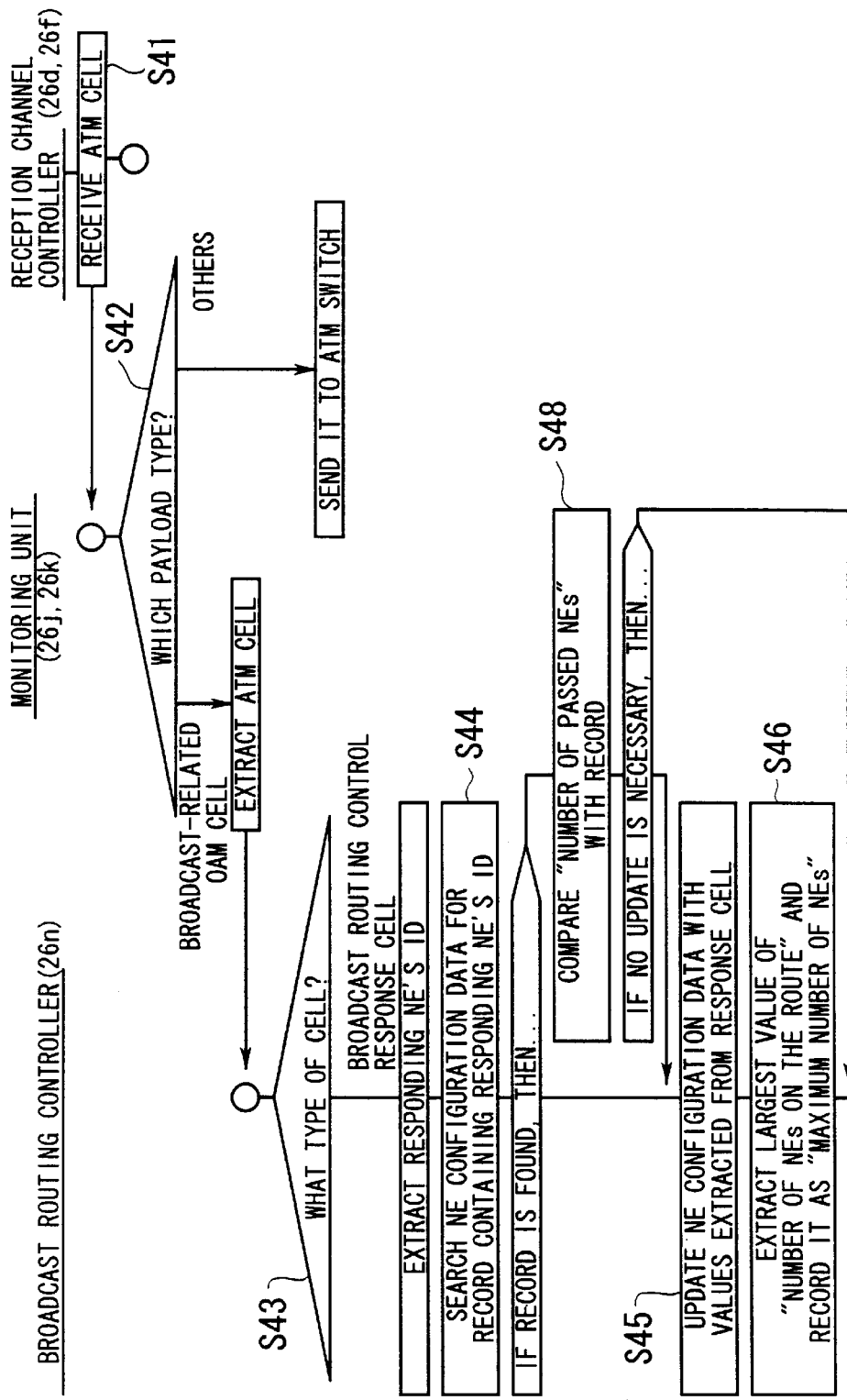
FIG. 23 is a flowchart which shows a process executed by each ATM network element to receive broadcast routing control response cells in the second embodiment.

FIG. 23 is a flowchart which shows a process executed by the ATM network element 26 to receive the broadcast routing control response cells in the second embodiment. This sequence, however, is not restricted to the ATM network element 26, but also applicable to any other ATM network elements with local service provider terminals. The explanation will follow the steps shown in FIG. 23.

[S41] Reception channel controllers (RxCC in FIG. 17) 26d and 26f receive response cells returned from other ATM network elements, and supply them to monitoring units (MON) 26j and 26k, respectively.

[S42] The monitoring units 26j and 26k examine the payload type of each ATM cell received. If it is a broadcast-related OAM cell, they subject it to the broadcast routing controller 26n, and if not, they forward it to the ATM switch 26c. The response cells are sent to the broadcast routing controller 26n, since they fall into the category of broadcast-related OAM cells.

[S43] Upon receipt of a broadcast-related OAM cell, the broadcast routing controller 26n checks its cell type field to determined whether it is a broadcast routing control response cell or not. If it is, the broadcast routing controller 26n extracts from the response cell an identifier (NE ID) contained in its "RESPONDING NE's ID" field and a value of its "NUMBER OF PASSED NEs" field.

[S44] The broadcast routing controller 26n searches the first NE configuration data 26ac-1 to find a record that contains the extracted NE ID. If such a record is found, the broadcast routing controller 26n reads the "NUMBER OF NEs ON THE ROUTE" field value of the record, and then advances the process to step S48. Otherwise, it proceeds to step S45.

[S45] The broadcast routing controller 26n updates the first NE configuration data 26ac-1 by transferring the values of "RESPONDING NE's ID" and "NUMBER OF PASSED NEs," which have been extracted from the response cell in step S43, to the "NE ID" and "NUMBER OF NEs ON THE ROUTE" fields, respectively.

[S46] The broadcast routing controller 26n detects the largest value of the "NUMBER OF NEs ON THE ROUTE" field by comparing the individual records in the first NE configuration data 26ac-1 with one another.

Subsequently, it transfers the largest "NUMBER OF NEs ON THE ROUTE" and corresponding "RESPONDING NE's ID" field values to the "MAXIMUM NUMBER OF NEs" and "FARTHEST NE's ID" fields of the second NE configuration data 26ac-2.

[S47] The broadcast routing controller 26n discards the received response cell. This concludes the reception process of broadcast routing control response cells.

[S48] The broadcast routing controller 26n compares the "NUMBER OF PASSED NEs" field of the response cell with the value of "NUMBER OF NEs ON THE ROUTE" registered in the first NE configuration data area 26ac-1 concerning the responding ATM network element. When the former is smaller than the latter, the broadcast routing controller 26n determines that the latter should be updated, and advances the process to step S45. If the former is equal to or larger than the latter, it recognizes that no update is necessary, and advances the process to step S47.

In this way, the "MAXIMUM NUMBER OF NEs" field of the NE configuration data 26ac-2 is filled in with the number of ATM network elements on a path to reach an ATM network element that is located the farthest from the present ATM network element 26.

The next section explains a process of routing the broadcast cells on the basis of the records formulated in the NE configuration data area 26ac. About the procedure of transmitting a broadcast cell, the service provider terminal 25 performs it basically in the same way as the service provider terminal 16 does in the first embodiment, which has been explained earlier with reference to FIG. 12. However, it should be noted that the broadcast cells in the second embodiment differ from those in the first embodiment in that they have a "NUMBER OF NEs TO VISIT" field (FIG. 21) with an initial value being derived from the "MAXIMUM NUMBER OF NEs" field of the second NE configuration data 26ac-2.

Figure 24:
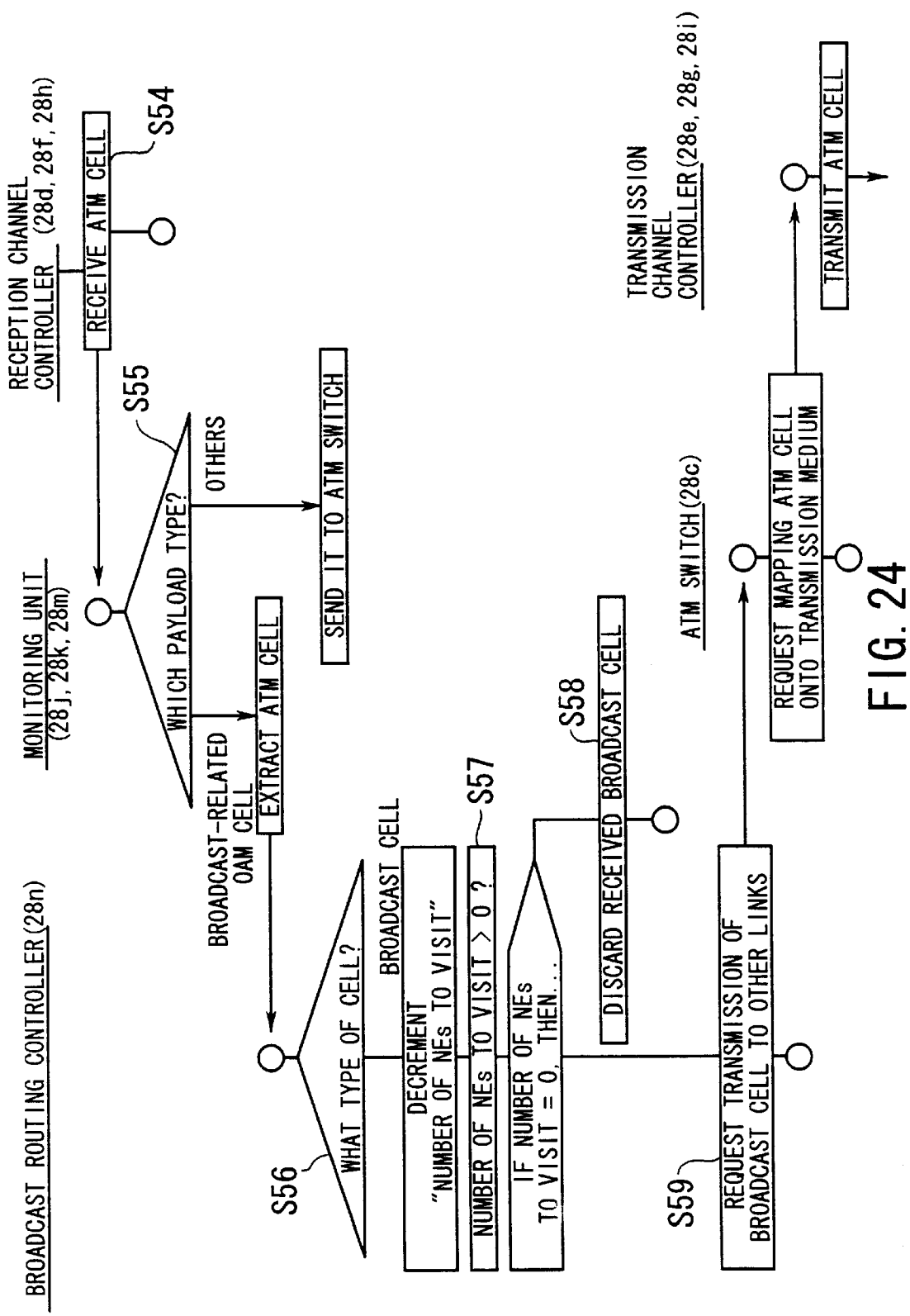
FIG. 24 is a flowchart which shows a process executed by each ATM network element to receive and relay a broadcast cell in the second embodiment.

FIG. 24 is a flowchart which shows a process executed by the ATM network element 28 to receive and relay the broadcast cells. Basically, the same sequence is applicable to other ATM network elements 26, 27, 29, and 30. The next explanation will follow the steps shown in FIG. 24.

[S54] The reception channel controller 28d, 28f, and 28h receive a plurality of broadcast cells and forward the cells to their respective monitoring units 28j, 28k, and 28m.

[S55] The monitoring units 28j, 28k, and 28m examine the payload type of each received ATM cell. If it has turned out to be a broadcast-related OAM cell, they subject it to a broadcast routing controller 28n, and if not, they forward it to the ATM switch 28c.

[S56] Upon receipt of a broadcast-related OAM cell, the broadcast routing controller 28n checks its cell type field to determine whether the received OAM cell is a broadcast cell or not. If it is, the broadcast routing controller 28n terminates the broadcast cell and delivers it to its local client terminals, as well as decrementing the value of the "NUMBER OF NEs TO VISIT" field of the broadcast cell by one.

[S57] The process advances to step S58 if the "NUMBER OF NES TO VISIT" field has reached zero as a result of step S56. Otherwise, the process proceeds to step S59.

[S58] Now that no further data relay is necessary, the broadcast routing controller 28n discards the broadcast cell.

[S59] Now that there are ATM network elements to visit, the broadcast routing controller 28n sends some predetermined commands to the ATM switch 28c and transmission channel controller 28e, 28g, and 28i in order to transfer the broadcast cell to other network elements through all links except for the reception link where the cell was received.

Figure 25:
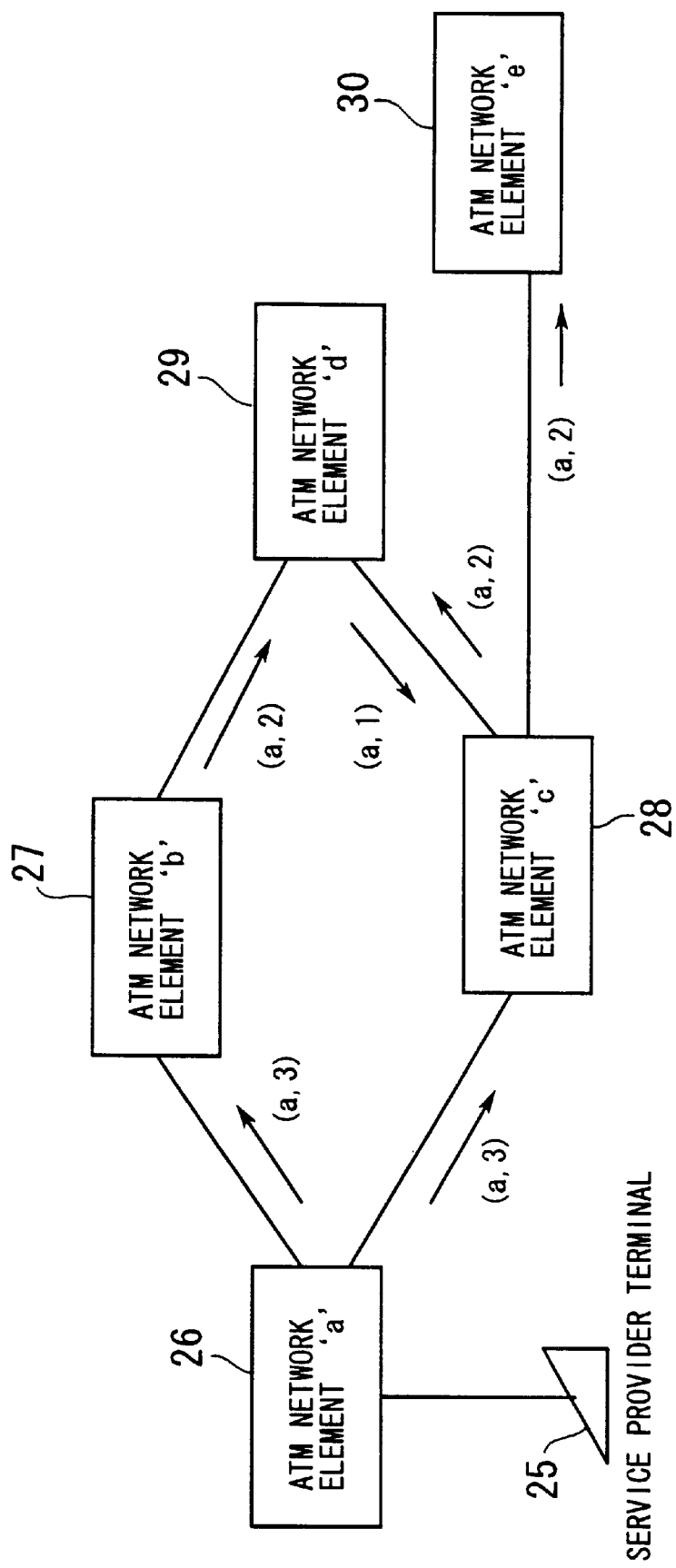
FIG. 25 is a diagram which shows how broadcast cells are delivered in the ATM network of FIG. 16.
Figure 26:
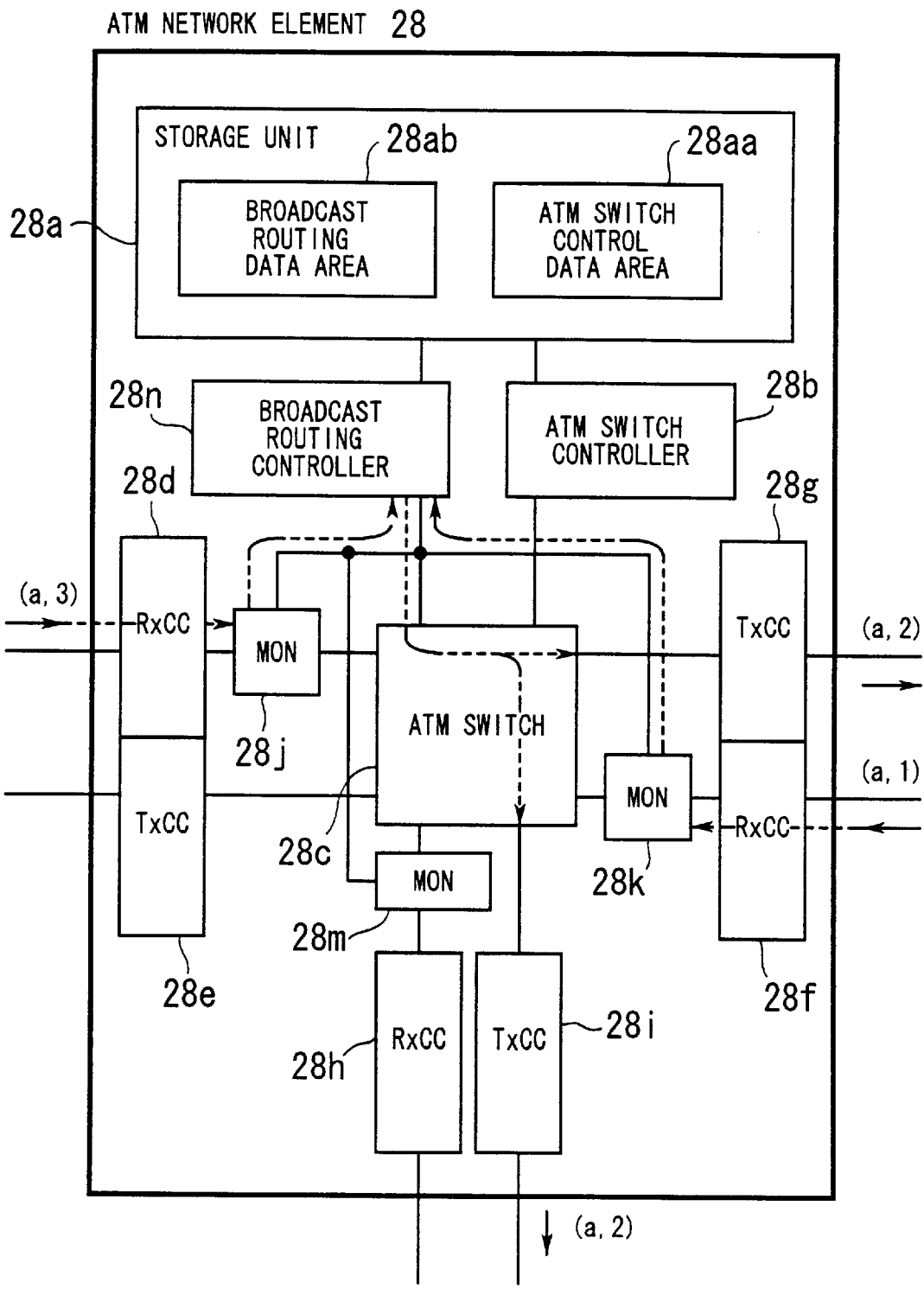
FIG. 26 is a diagram which shows the flow of broadcast cells within an ATM network element shown in FIG. 25.

FIG. 25 shows the resultant flow of broadcast cells in the ATM network of FIG. 16, in which the solid arrows represent broadcast cells. The parenthesized notes accompanying the arrows contain two parameters. The first parameter, an alphabetical character, shows the "SOURCE NE'S ID" of a broadcast cell, while the second parameter, a numeral, indicates the "NUMBER OF NEs TO VISIT" field as part of the broadcast cell. FIG. 26 shows the internal flow of broadcast cells in the ATM network element 28 in FIG. 25.

As described above, every broadcast cell gains an initial value of its "NUMBER OF NEs TO VISIT" field when it is broadcasted, which value is the number of network elements on a route from the source ATM network element to the farthest ATM network element. Each relaying ATM network element on the route decreases that value by one before repeating the cell. Such decrement and repeat operations are iterated until the "NUMBER OF NEs TO VISIT" field becomes zero. Besides ensuring the cell delivery to the farthest ATM network element, this structural arrangement prevents the broadcast cells from unnecessary repetition, thus avoiding traffic congestion in the ATM network.

Now, the next section describes a third embodiment of the present invention, with reference to FIGS. 27 to 31. Since this third embodiment has basically the same configuration as that of the first embodiment, the following will focus on its distinctive points, while affixing like reference numerals to like elements.

Figure 27:
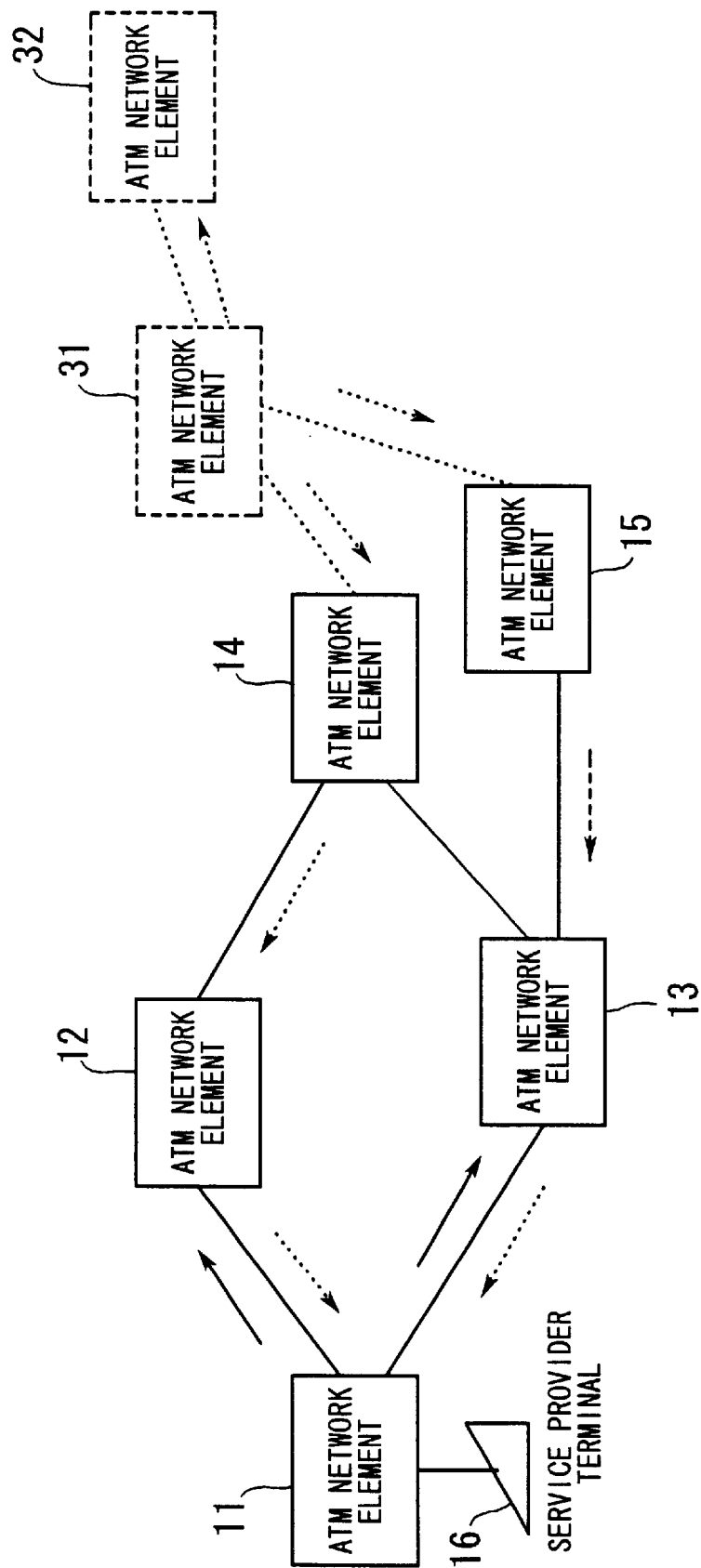
FIG. 27 is a diagram which shows an ATM network and its constituents in a third embodiment of the present invention.

FIG. 27 is a diagram which shows an ATM network and its constituents in the third embodiment. Compared with the former two embodiments, the third embodiment assumes two newcomers, ATM network elements 31 and 32, that have joined the ATM network. The dotted arrows in FIG. 27 represent the flow of broadcast routing control request cells (or "request cell" for short) issued by the ATM network element 31, which will be described later on. In contrast, the solid arrows are broadcast routing control cells produced in response to the broadcast routing control request cells.

Figure 28:
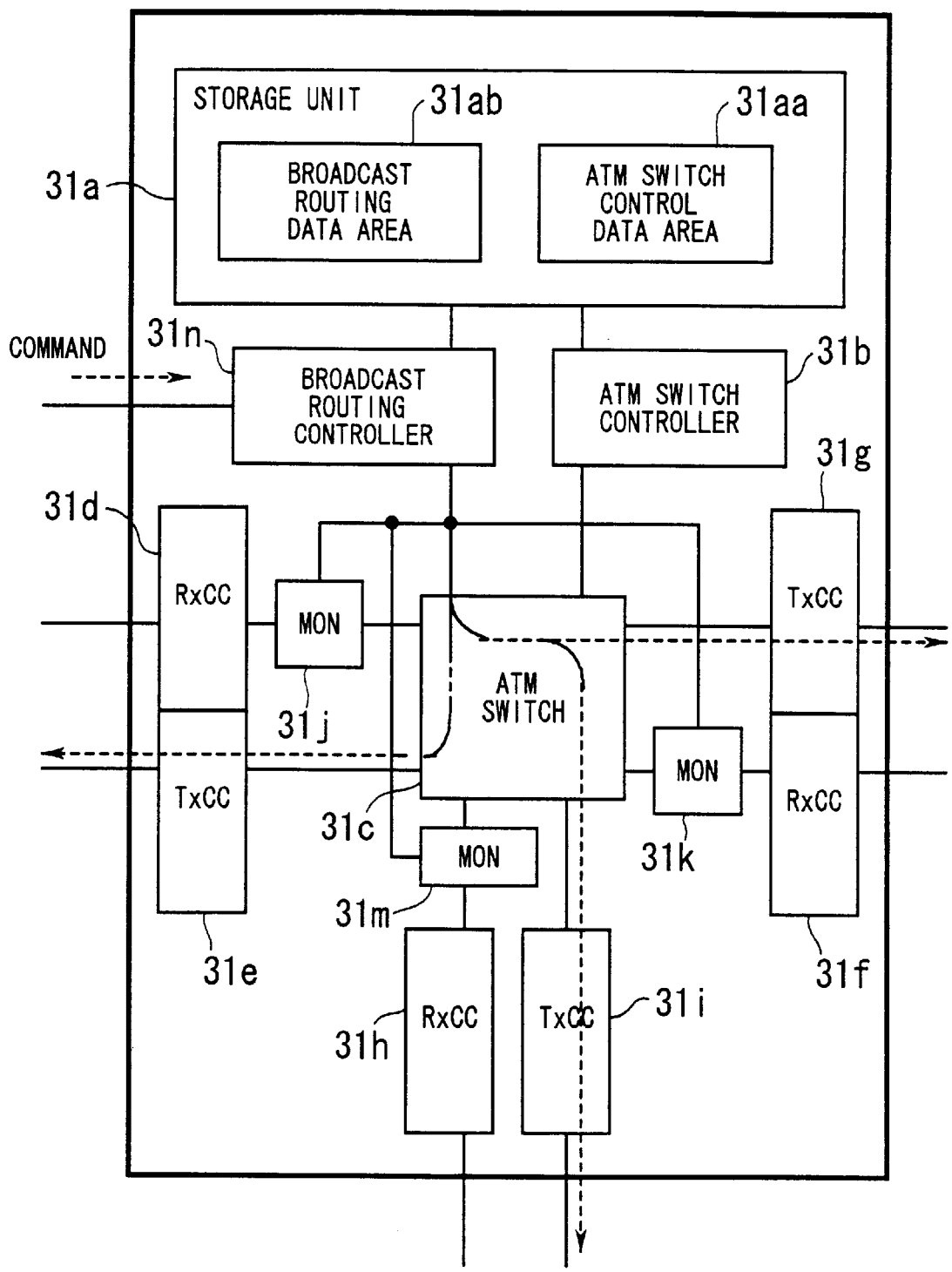
FIG. 28 is a diagram which shows the internal structure of an ATM network element that has been added to the network in the third embodiment.

FIG. 28 is a block diagram which shows the internal structure of the ATM network element 31 added to the network in the third embodiment, which is common to the ATM network element 32.

This ATM network element 31 has basically the same structure as that of the ATM network element 13 of FIG. 4 in the first embodiment. Although the body of reference numerals has been changed from "13" to "31," like elements have like suffixes, implying their functional equivalence.

Accordingly, the next section does not repeat the same explanation for those similar elements, but concentrates on some distinctive points of the third embodiment.

In the third embodiment, a broadcast routing controller 31n is configured to accept an operator's command entered through an external operating console. This command is intended to initiate reconstruction of routing data when the ATM network element 31 is added to the network by requesting relevant ATM network elements to transmit a broadcast routing control cell again. Upon receipt of the above command, the broadcast routing controller 31n produces a broadcast routing control request cell and transmits it along some paths as indicated by the dotted arrows in FIG. 28.

Figure 29:
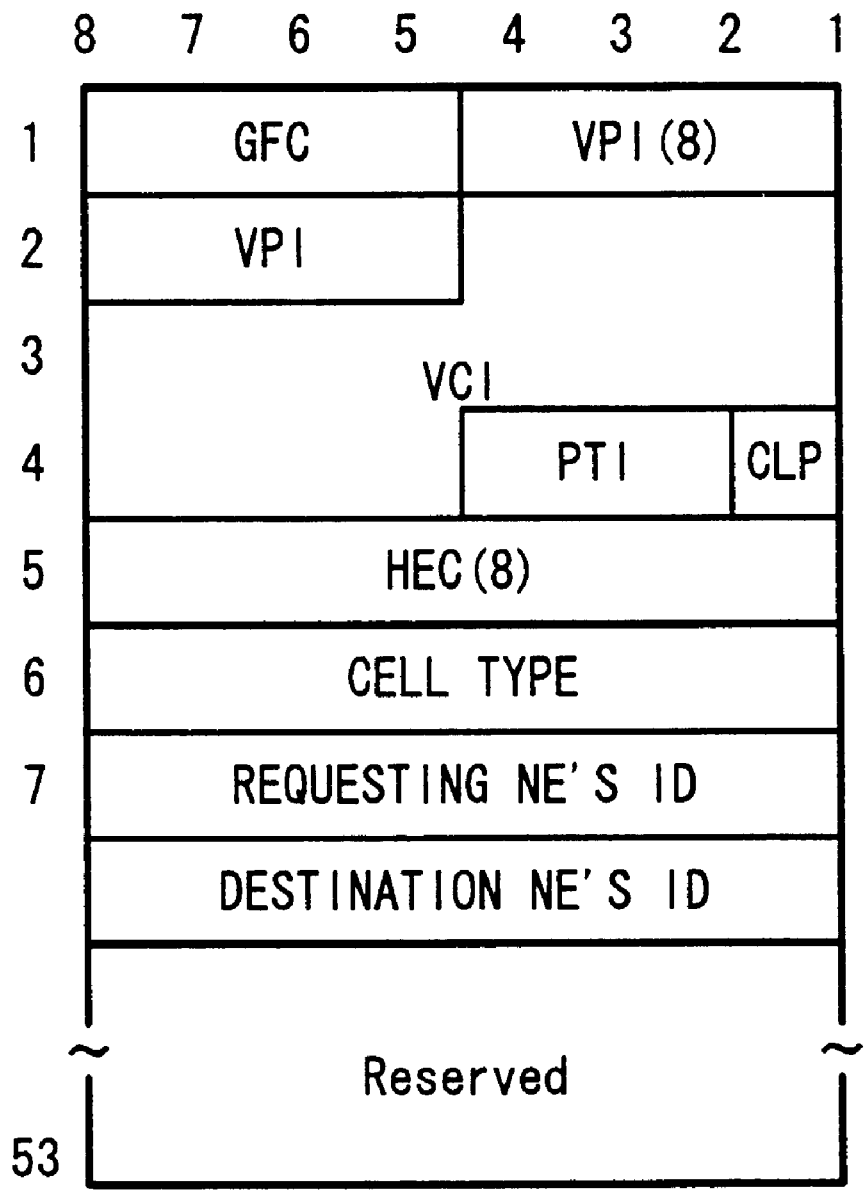
FIG. 29 is a diagram which shows a format of broadcast routing control request cells in the third embodiment.

FIG. 29 shows a format of broadcast routing control request cells. The first to fifth octets of a cell in FIG. 29 are a header section, while the sixth to fifty-third octets are a payload section. In this format, three fields of "CELL TYPE," "REQUESTING NE's ID," and "DESTINATION NE's ID" occupy a part of the payload section. The "CELL TYPE" field stores a specific identifier to indicate that the cell is a broadcast control request cell. The "REQUESTING NE's ID" field holds an identifier indicating a specific ATM network element that has sent this request cell. The "DESTINATION NE's ID" field stores an identifier indicating another specific ATM network element that is expected to receive this request cell and return a broadcast routing control cell.

Figure 30:
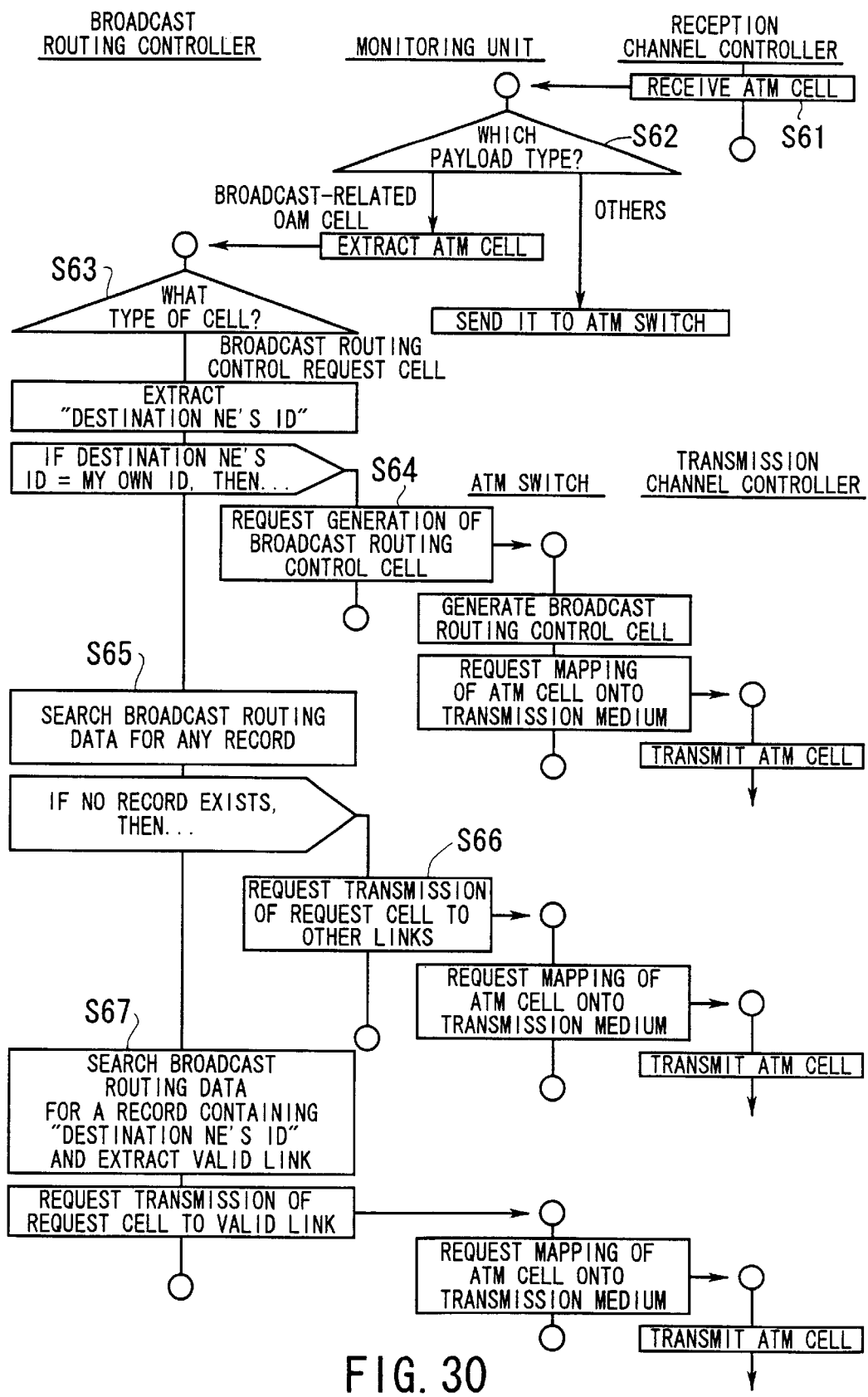
FIG. 30 is a flowchart which shows a request cell reception process executed by each ATM network element upon arrival of a broadcast routing control request cell in the third embodiment.

While the operation of the third embodiment is basically the same as that of the first embodiment explained earlier, it involves a new function depicted in FIG. 30. FIG. 30 is a flowchart which shows a request cell reception process executed by each ATM network element upon arrival of a broadcast routing control request cell. This flowchart is not dedicated to any particular network element, but applicable to all network elements 11 to 15, 31, and 32, in such a situation where the network element 31 has transmitted a request cell to the ATM network element 11. The next explanation will follow the steps shown in FIG. 30.

[S61] A reception channel controller receives a request cell sent from the ATM network element 31, and sends it to a corresponding monitoring unit.

[S62] The monitoring unit is designed to examine the payload type of each received ATM cell. If it is a broadcast-related OAM cell, the monitoring unit subjects it to the broadcast routing controller, and if not, it forwards the cell to the ATM switch. Here, the request cell is supplied to the broadcast routing controller, since it is a broadcast-related OAM cell.

[S63] Upon receipt of a broadcast-related OAM cell, the broadcast routing controller checks its cell type field. If the received OAM cell is a broadcast routing request cell, the broadcast routing controller extracts the "DESTINATION NE's ID" field of the cell so as to compare with its own identifier. If the "DESTINATION NE's ID" coincides with its own NE ID, the broadcast routing controller branches to step S64. Otherwise, the process advances to step S65. In the present case, branching to step S64 occurs only in the ATM network element 11, which is specified as the destination of the request cell.

[S64] The broadcast routing controller controls the ATM switch so as to transmit a broadcast routing control cell at once. See the first embodiment for the rest of the process.

[S65] The broadcast routing controller determines whether the broadcast routing data area in its own storage unit has any registered data. If there exists some data, the process proceeds to step S67. If not, it proceeds to step S66.

In the present case, branching to step S66 occurs in the ATM network element 32 which has just joined the ATM network.

[S66] The broadcast routing controller controls the ATM switch to repeat the received request cell to all links except for its reception link.

[S67] The broadcast routing controller searches the broadcast routing data area in its local storage unit for a relevant record containing the "DESTINATION NE ID" field value of the request cell in its "SOURCE NE's ID" field. The ATM switch is then controlled to relay the request cell only to the link specified by the "MINIMUM-NE RECEPTION LINK" field of the record. In the present case, this step S67 is executed by the ATM network elements 12, 13, 14, and 15.

Figure 31:
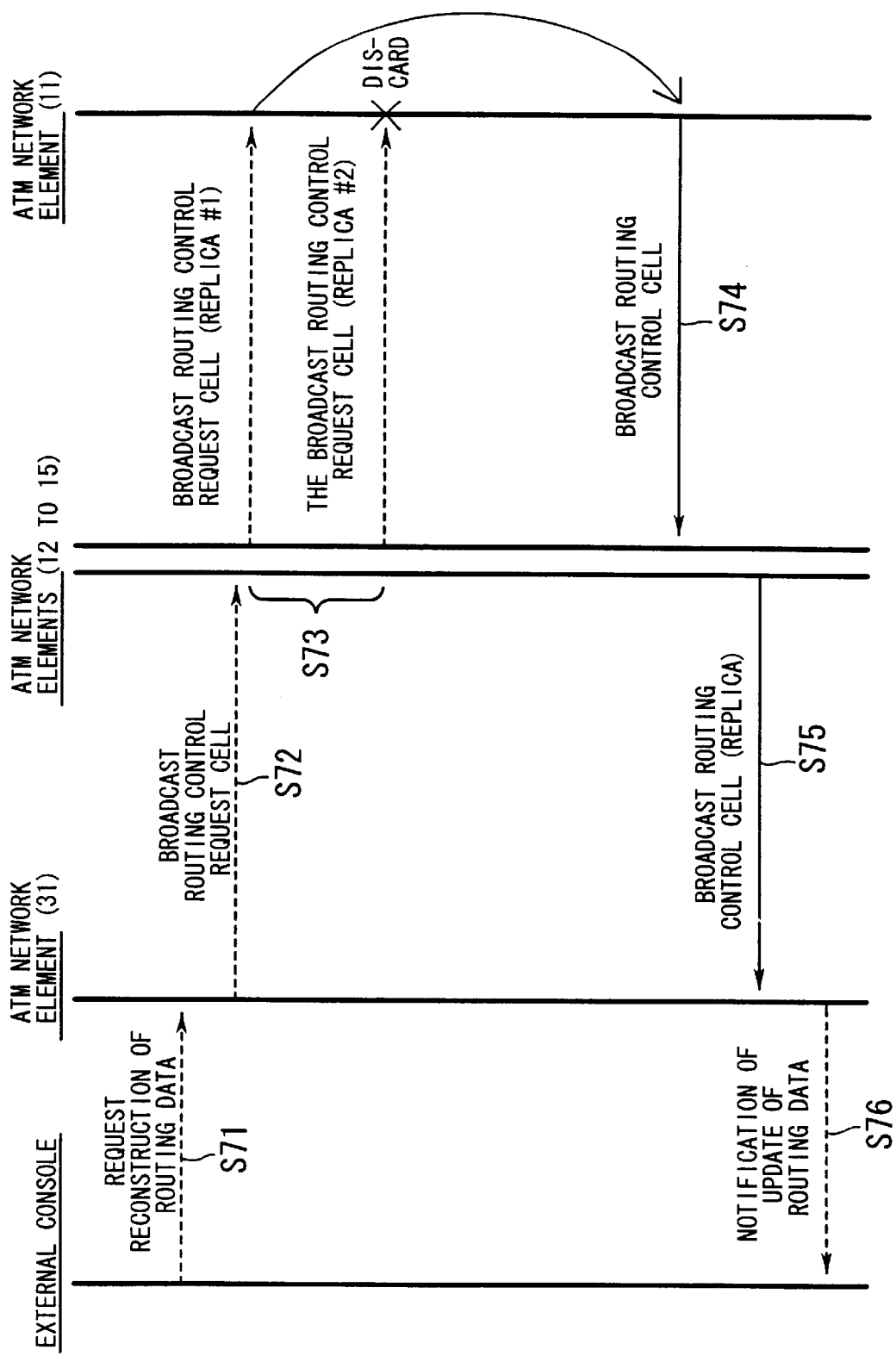
FIG. 31 is a sequence diagram which shows a process of reconstructing routing data in the third embodiment.

FIG. 31 is a sequence diagram which shows the process of reconstructing routing data in the third embodiment, in which process the network elements interact with each other as follows.

[S71] The newly added ATM network element 31 accepts a command from an external console that requests reconstruction of routing data.

[S72] In response to the command, the ATM network element 31 sends a broadcast routing control request cell destined for the ATM network element 11.

[S73] This request cell is relayed by the ATM network elements 12 to 15, and its two replicas arrive at the ATM network element 11 via different paths.

[S74] The ATM network element 11 transmits a broadcast routing control cell, responding only to the very first request cell among those which have arrived there.

[S75] This broadcast routing control cell is relayed by the ATM network elements 12 to 15, and its replicas arrive at the ATM network element 31 via different routes. The ATM network element 31 extracts necessary data from those cells, and saves it into the broadcast routing data area 31ab in its local storage unit 31a.

[S76] The ATM network element 31 notifies the external console that the routing data has been updated, thus concluding the reconstruction process.

As described above, the third embodiment of the present invention reestablish the broadcast routes when a new network element is added to the ATM network, thereby optimizing the routes for the new configuration. The transmission of broadcast routing control request cells discussed in the third embodiment can be applied to other situations, such as the case that an existing ATM network element is removed from the network.

Figure 32:
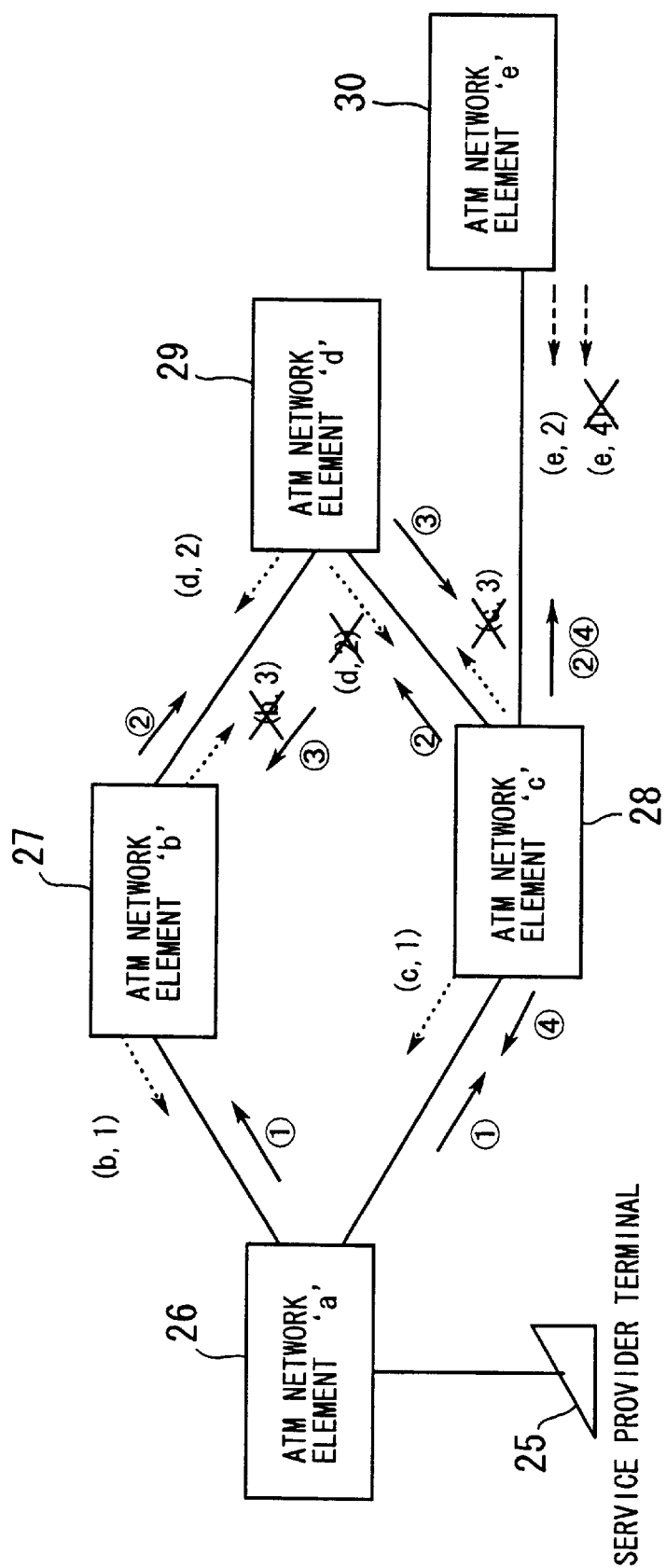
FIG. 32 is a diagram which shows an ATM network and its constituents in a fourth embodiment of the present invention.

Referring next to FIGS. 32 to 38, the following paragraphs will describe a fourth embodiment of the present invention. FIG. 32 shows an ATM network and its constituents in the fourth embodiment. Since the fourth embodiment has basically the same structure as that of the second embodiment explained earlier, the following description does not repeat the same explanation for like elements, but focuses on some distinctive points of the fourth embodiment.

Recall that, in the second embodiment (FIG. 16), each ATM network element sends a response cell in reply to every broadcast routing control cell that has been received. As opposed to this, the ATM network elements in the fourth embodiment are configured to return a response cell only to a single route that is recognized as the shortest path from the source network element, or the sender of the broadcast routing control cells.

To discriminate the shortest route, it is necessary to collect all broadcast routing control cells coming from different directions at different times and compare them with each other in terms of the number of passed network elements on each route. To this end, the broadcast routing controller of the fourth embodiment is equipped with a timer that restricts the reception of broadcast routing control cells within a finite time period.

Referring to FIG. 32, the solid arrows show the flow of broadcast routing control cells that have been initiated by the service provider terminal 25 and distributed by the ATM network element 26. Numerals (1) to (4), which are actually circled in FIG. 32, are affixed to those solid arrows to indicate the "PASSED NE COUNTER" field value of each broadcast routing control cell. In contrast to the solid arrows, the dotted arrows represent the flow of broadcast routing control response cells, which will be described later on. Each dotted arrow is accompanied by a note in parentheses, e.g., (c,1), composed of two parameters. The first parameter, an alphabetical character, represents a response source ID, or the identifier of an ATM network element that has sent that response cell. As FIG. 32 shows, all ATM network elements 26 to 30 have their own identifiers "a" to "e," respectively. The second parameter, a numeral, shows the "PASSED NE COUNTER" field value of a broadcast routing control cell that caused the present response cell. The symbol "×" indicates such a response cell that would be generated in the second embodiment, but is eliminated in the fourth embodiment.

Figure 33:
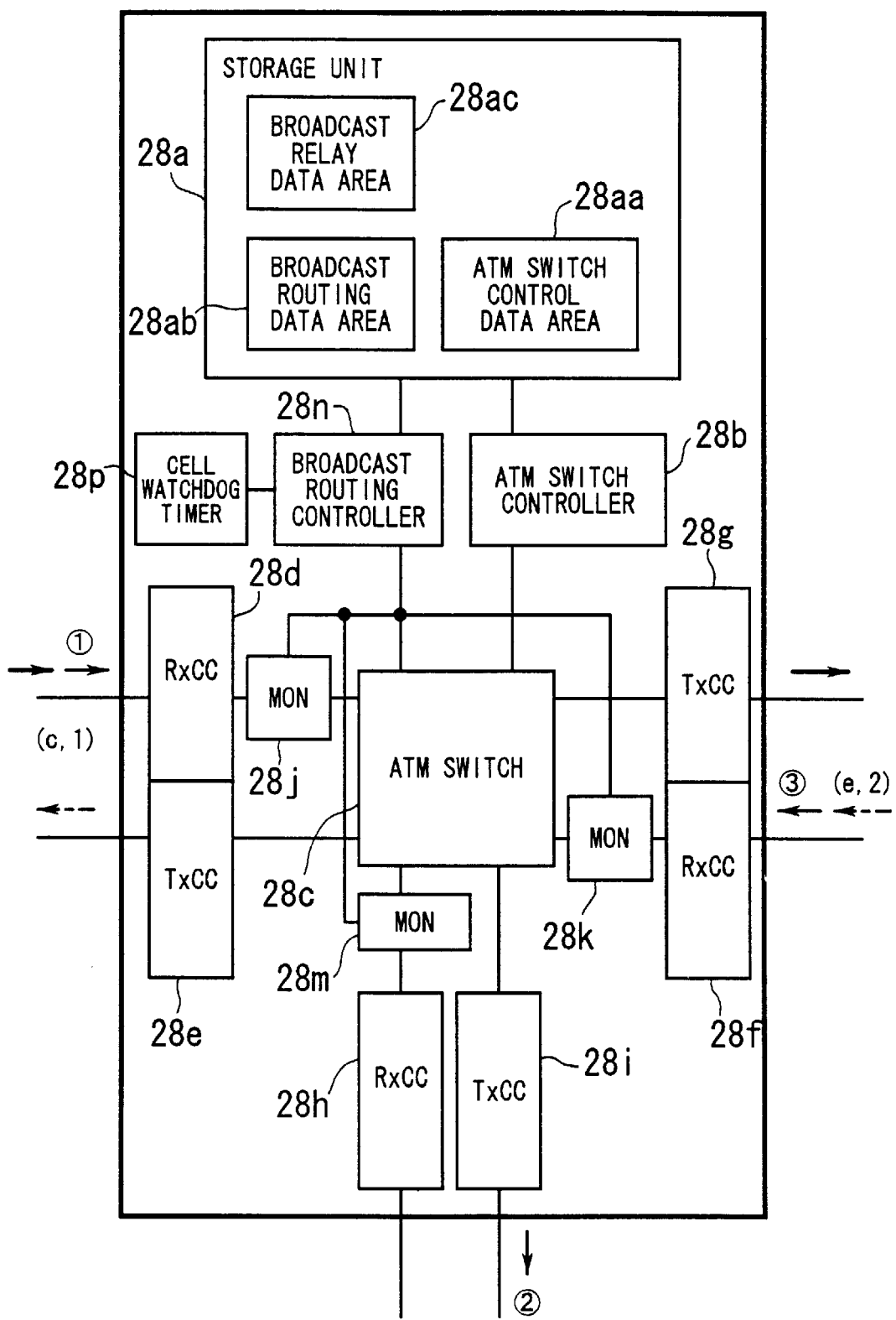
FIG. 33 is a block diagram which shows the internal structure of an ATM network element of the fourth embodiment with no service provider terminal connected.

FIG. 33 is a block diagram which shows the internal structure of the ATM network element 28 where no service provider terminal is connected. Compare this configuration with that in FIG. 18. In the fourth embodiment, a cell watchdog timer 28p is newly introduced to assist the operation of the broadcast routing controller 28n. The cell watchdog timer 28p is actually a collection of timer units dedicated to different SOURCE NE's IDs. Each timer unit is triggered (i.e., starts countdown from a predetermined initial time value) when a new entry of "SOURCE NE's ID" is registered in the broadcast routing data area 28ab of the storage unit 28a as will be described later on. Further, the fourth embodiment differs from the second embodiment in that the storage unit 28a has a broadcast relay data area 28ac to store the information about which links to use for transmission of broadcast cells.

Upon receipt of each broadcast routing control response cell, the broadcast routing controller 28n registers the link that was used to receive the cell to the broadcast relay data area 28ac. The detailed operation of this broadcast routing controller 28n will be described later, referring to the flowchart of FIG. 37.

Figure 34:
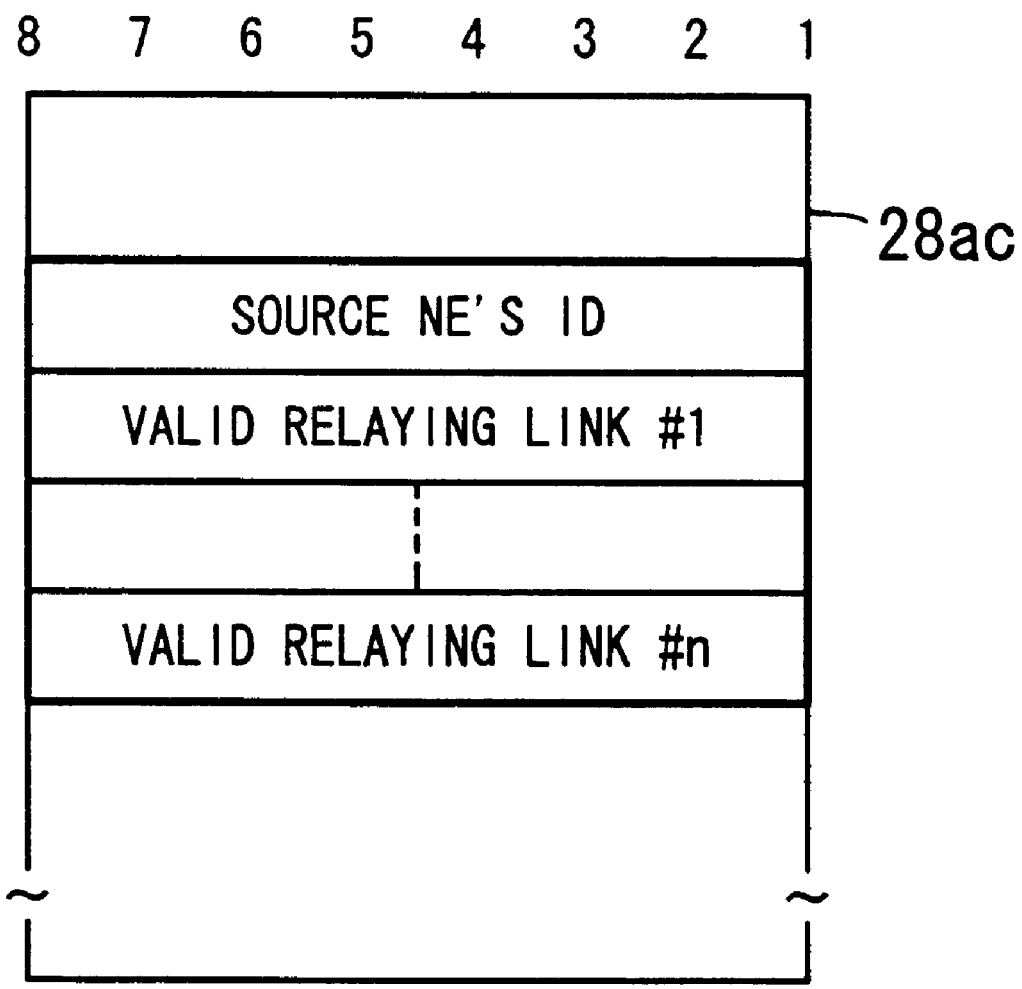
FIG. 34 is a diagram which shows data stored in a broadcast & relay data area in the fourth embodiment.

FIG. 34 shows the structure of data stored in the broadcast relay data area 28ac, which shows the history of response cells relayed by the ATM network element 28. More specifically, the "SOURCE NE's ID" field stores the identifier of the source ATM network element that has transmitted the broadcast routing control cell. The fields titled "VALID RELAYING LINK #1" to "VALID RELAYING LINK #n" store the names of the reception links through which the plurality of response cells have been received. As such, those data fields are specific to the source ATM network element, and therefore, the broadcast relay data area 28ac contains separate sets, or records, of those data fields for individual ATM network elements.

The next paragraphs will explain the operation of the fourth embodiment of the present invention. Although the process actually starts with the transmission of a broadcast routing control cell, the following explanation skips that procedure because it is the same as what has been discussed in the first embodiment of the present invention referring to FIG. 10.

Figure 35:
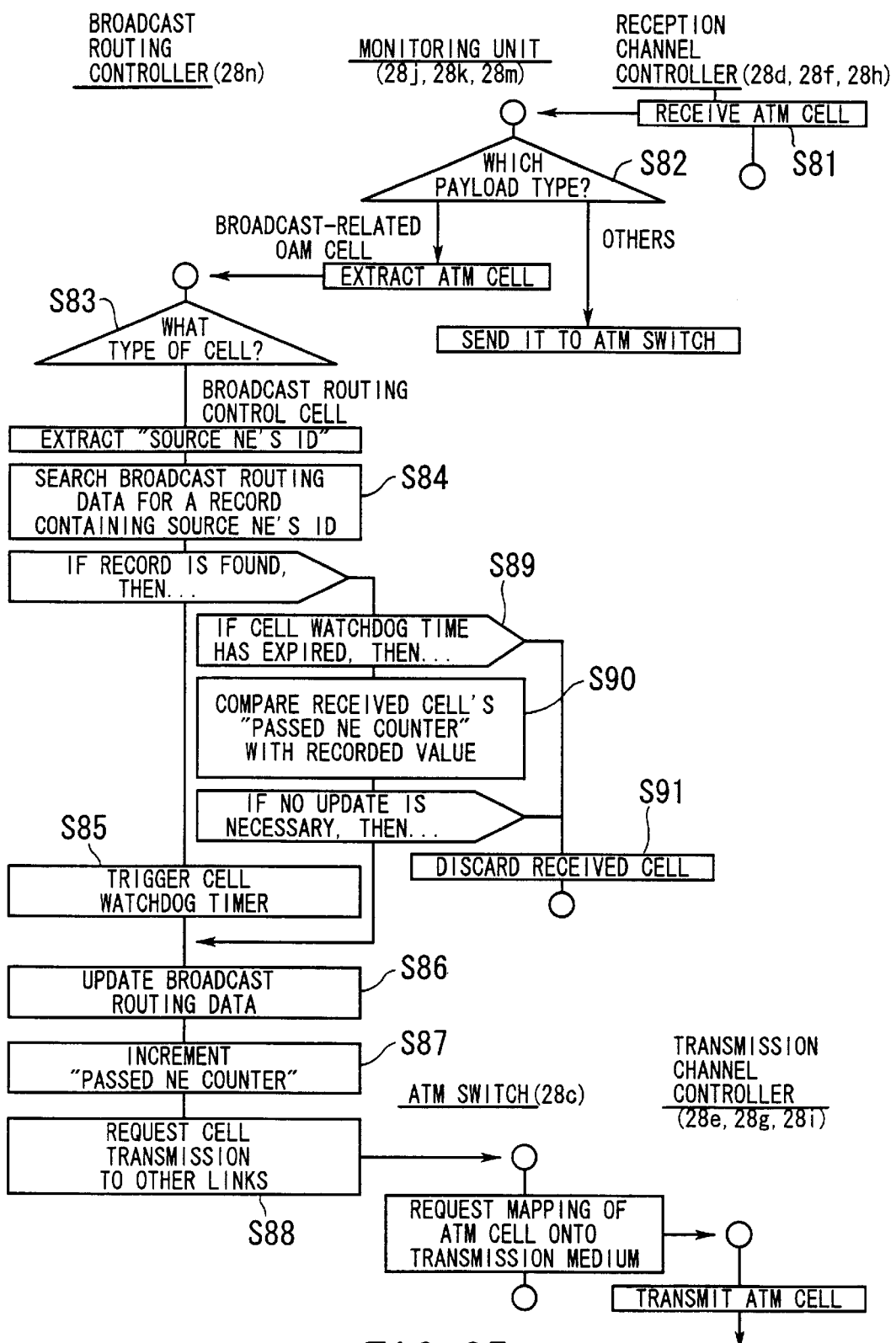
FIG. 35 is a flowchart which shows a process executed by each ATM network element to receive and relay a broadcast routing control cell in the fourth embodiment.

FIG. 35 is a flowchart which shows a process executed by the ATM network element 28 to receive and relay the broadcast routing control cells. This sequence is also applicable to other ATM network elements 26, 27, 29, and 30, basically. The explanation will follow the steps shown in FIG. 35.

[S81] The ATM network element 28 receives a plurality of broadcast routing control cells coming from different links. Reception channel controllers 28d, 28f, and 28h receive those cells and supply them to their respective monitoring units 28j, 28k, and 28m.

[S82] The monitoring units 28j, 28k, and 28m examine the payload type of each ATM cell sent from the reception channel controllers 28d, 28f, and 28h, respectively. If the received ATM cell is a broadcast-related OAM cell, they subject it to the broadcast routing controller 28n. Otherwise, they forward it to the ATM switch 28c.

[S83] Upon receipt of a broadcast-related OAM cell, the broadcast routing controller 28n checks its cell type field. If the received OAM cell is a broadcast routing control cell, the broadcast routing controller extracts its "SOURCE NE's ID" field.

[S84] The broadcast routing controller 28n searches the broadcast routing data area 28ab for a record containing the extracted "SOURCE NE's ID" field value. If such a record is found, the process branches to step S89, and if not, it proceeds to step S85.

[S85] The broadcast routing controller 28n triggers the cell watchdog timer 28p that corresponds to the "SOURCE NE's ID" field value of the broadcast routing control cell in process.

[S86] The broadcast routing data area 28ab is updated with the data regarding the broadcast routing control cell in process. Suppose here that the first broadcast routing control cell has reached the ATM network element 28 via the ATM network element 29 as indicated by the solid arrow (3) in FIG. 32. Then the identifier "a" of the source ATM network element 26 is registered to the broadcast routing data area 28ab as a "SOURCE NE's ID" field value. Further, the name of the link that extends to the ATM network element 29 is entered to the "MINIMUM-NE RECEPTION LINK," and the counter value "3" is stored into the "NUMBER OF PASSED NEs" field.

[S87] The broadcast routing controller 28n modifies the broadcast routing control cell by incrementing its "PASSED NE COUNTER" field value by one. In the present case, the field value changes from "3" to "4."

[S88] The broadcast routing controller 28n sends some predetermined commands to the ATM switch 28c and transmission channel controller 28e, 28g, and 28i in order to transfer the broadcast routing control cell through all links except for the reception link where the cell was received. In the present context, the broadcast routing control cell is transmitted from the ATM network element 28 to the neighboring ATM network elements 26 and 30.

Figure 36:
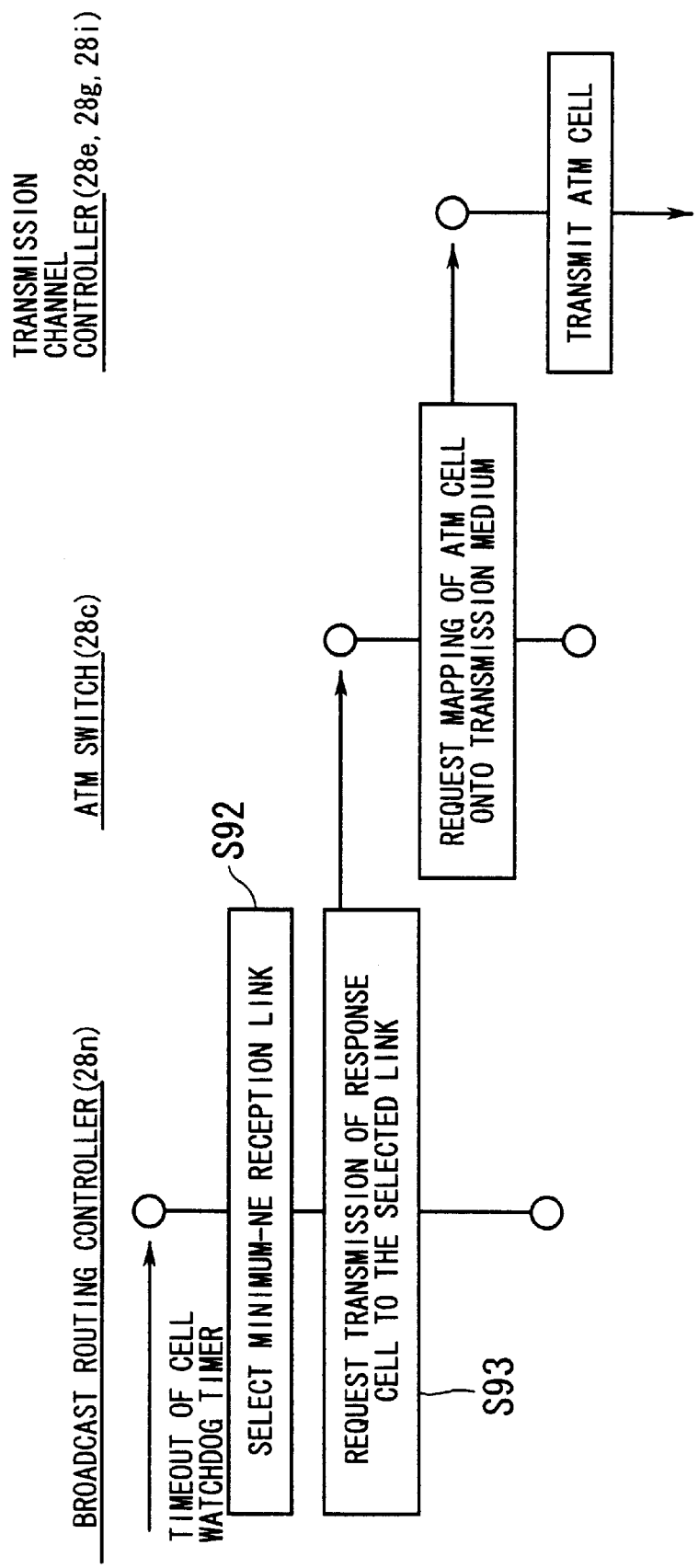
FIG. 36 is a flowchart which shows a process of transmitting a broadcast routing control response cell after timeout of a cell watchdog timer in the fourth embodiment.

[S89] If the cell watchdog timer 28p triggered in step S85 (in some past execution of this process) has expired, the process proceeds to step S91 and then executes further tasks described in FIG. 36. Otherwise, the process advances to the next step S90.

[S90] The broadcast routing controller 28n searches the broadcast routing data area 28ab for a record that contains the identifier extracted from the "SOURCE NE's ID" field of the broadcast routing control cell being processed. Upon retrieval of such a record, the broadcast routing controller 28n reads the "NUMBER OF PASSED NEs" field value out of the record, and compares it with the "PASSED NE COUNTER" field value of the broadcast routing control cell in process. If this comparison indicates that the "PASSED NE COUNTER" is smaller than the "NUMBER OF PASSED NEs," it is now necessary to update the record in the broadcast routing data area 28*ab*. If this is the case, the present process branches to step S86. It proceeds to step S91, if the value of "PASSED NE COUNTER" is equal to or greater than the value of "NUMBER OF PASSED NEs."

Suppose here that the ATM network element 28 received a first broadcast routing control cell with "SOURCE NE's ID"="a" (i.e., the NE ID of the ATM network element 26) and "PASSED NE COUNTER"=3, and after that, a second broadcast routing control cell with the "SOURCE NE's ID"="a" and "PASSED NE COUNTER"=1. The cell watchdog timer 28*p* was triggered by the first broadcast routing control cell, but timeout has not yet occurred. In this situation, step S90 of FIG. 35 has to be executed.

More specifically, the second broadcast routing control cell exhibits a smaller value of "1" in its "PASSED NE COUNTER" field, compared with the recorded value "3" of "NUMBER OF PASSED NEs" that has been given formerly by the first broadcast routing control cell. Accordingly, the process proceeds to step S86. In step S86, the broadcast routing controller 28*n* updates the "NUMBER OF PASSED NEs" field from "3" to "1," as well as replacing the current value of the "MINIMUM-NE RECEPTION LINK" field with the name of another link that extends to the ATM network element 26. The broadcast routing controller 28*n* then changes the "PASSED NE COUNTER" field of the broadcast routing control cell from "1" to "2" (step S87), and transmits it from the ATM network element 28 to the ATM network elements 29 and 30 (step S88).

[S91] The ATM network element 28 discards the received broadcast routing control cell, since the cell watchdog timer 28*p* has expired, or the cell has turned out to be worthless.

FIG. 36 is a flowchart which shows a procedure of transmitting a broadcast routing control response cell after the cell watchdog timer 28*p* has expired. This sequence is also applicable to other ATM network elements 26, 27, 29, and 30, basically. The following paragraphs will explain each step of FIG. 36.

[S92] Upon timeout of the cell watchdog timer 28*p*, the broadcast routing controller 28*n* retrieves the "MINIMUM-NE RECEPTION LINK" field from the broadcast routing data area 28*ab*.

[S93] The broadcast routing controller 28*n* controls the ATM switch 28*c* so as to transmit a response cell through the link specified in the field retrieved in step S92.

In the fourth embodiment, the routing data is established from a limited number of broadcast routing control cells which arrived within a predetermined time period, under the control of the cell watchdog timer 28*p*. By rejecting any further broadcast routing control cells, this mechanism enables faster formulation of routing data and thus allows the response cells to be transported via the established paths without generating unnecessary duplications.

Figure 37:
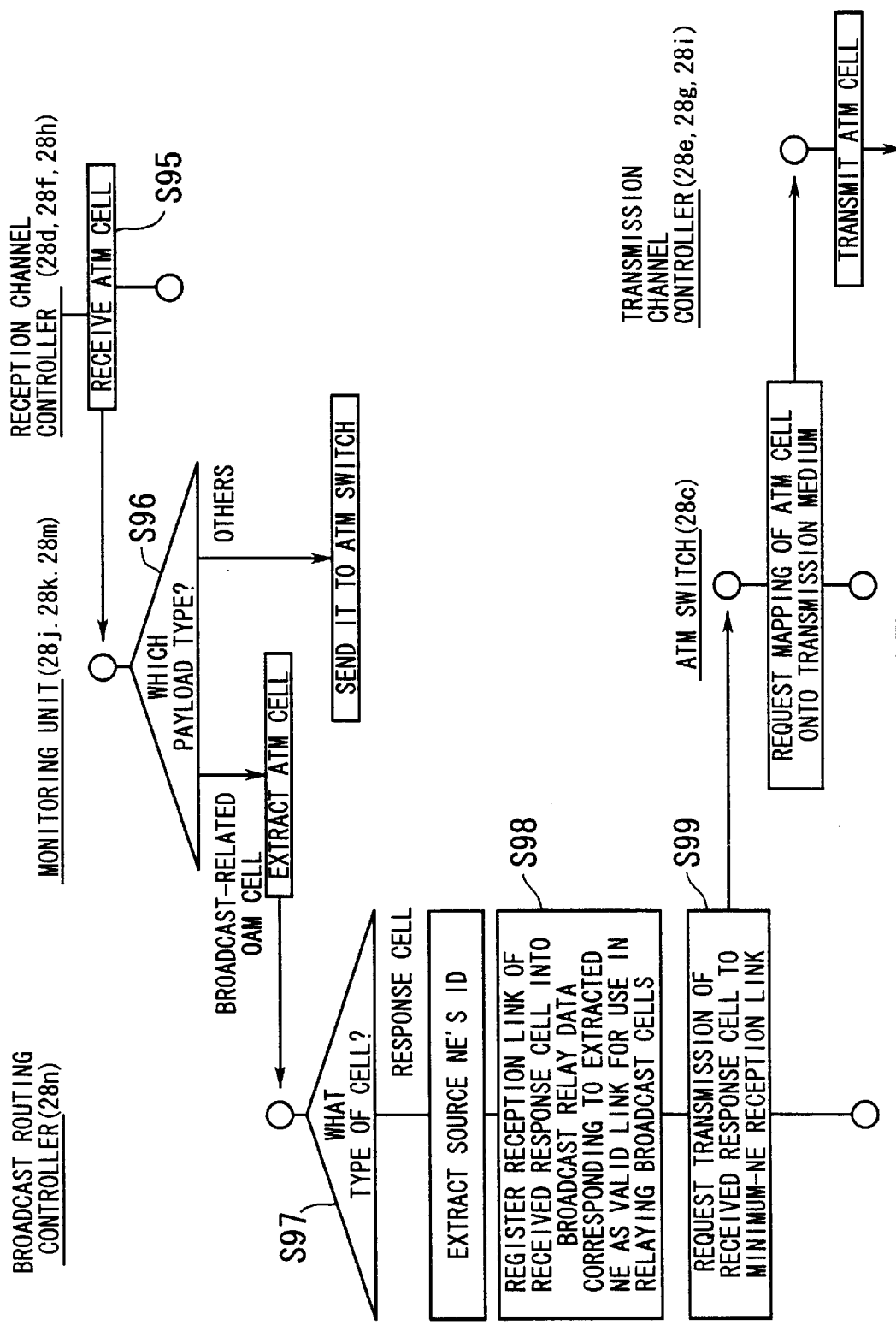
FIG. 37 is a flowchart which shows a process executed by each ATM network element to receive and relay a broadcast routing control response cell in the fourth embodiment.

FIG. 37 is a flowchart which shows a process executed by each ATM network element in the fourth embodiment to receive and relay broadcast routing control response cells. This sequence is also applicable to other ATM network elements 26, 27, 29, and 30, basically. The following paragraphs will explain each step of FIG. 37.

[S95] The reception channel controllers 28*d*, 28*f*, and 28*h* receive broadcast routing control cells and supply them to their respective monitoring units 28*j*, 28*k*, and 28*m*.

[S96] The monitoring units 28*j*, 28*k*, and 28*m* are designed to examine the payload type of each ATM cell sent from the reception channel controllers 28*d*, 28*f*, and 28*h*, respectively. If the received ATM cell is a broadcast-related OAM cell, they subject it to the broadcast routing controller 28*n*, and if not, they forward it to the ATM switch 28*c*.

[S97] Upon receipt of a broadcast-related OAM cell, the broadcast routing controller 28*n* checks its cell type field. If the received OAM cell is a broadcast routing control response cell, the broadcast routing controller 28*n* extracts its "SOURCE NE's ID" field value. This field indicates the sender of the broadcast routing control cell that caused the response cell being processed.

[S98] The broadcast routing controller 28*n* creates a record indicating the link that was used to receive the response cell, in association with the identifier of the ATM network element extracted in step S97. This record is stored into the broadcast relay data area 28*ac* as part of the storage unit 28*a*.

[S99] The broadcast routing controller 28*n* retransmits the response cell to the neighboring network element via the link specified by the "MINIMUM-NE RECEPTION LINK" field of the broadcast routing data area 28*ab*. This mechanism allows response cells to be relayed from one network element to another without generating useless cells.

Figure 38:
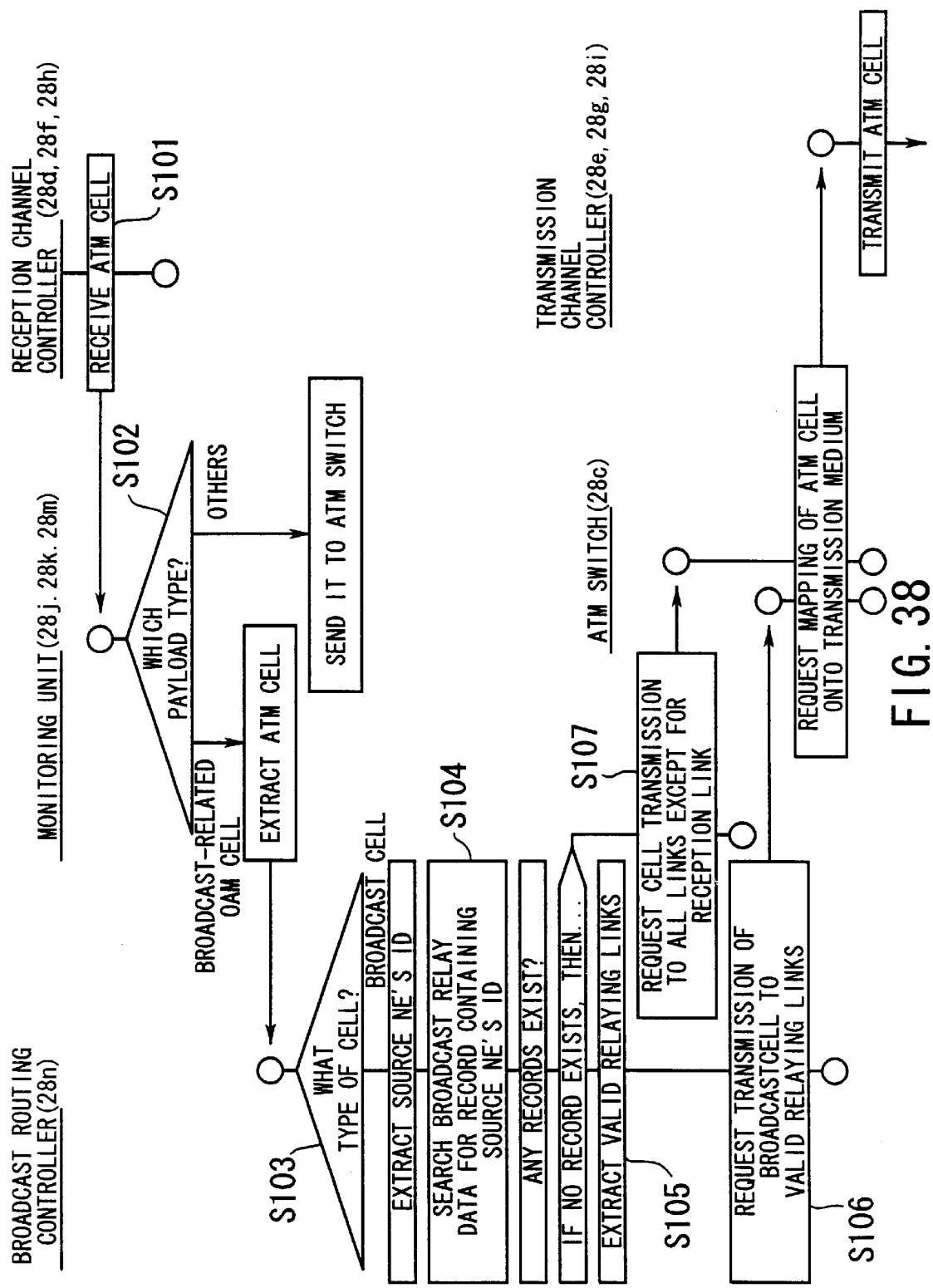
FIG. 38 is a flowchart which shows a process executed by each ATM network element to receive and relay a broadcast cell in the fourth embodiment.
Figure 39:
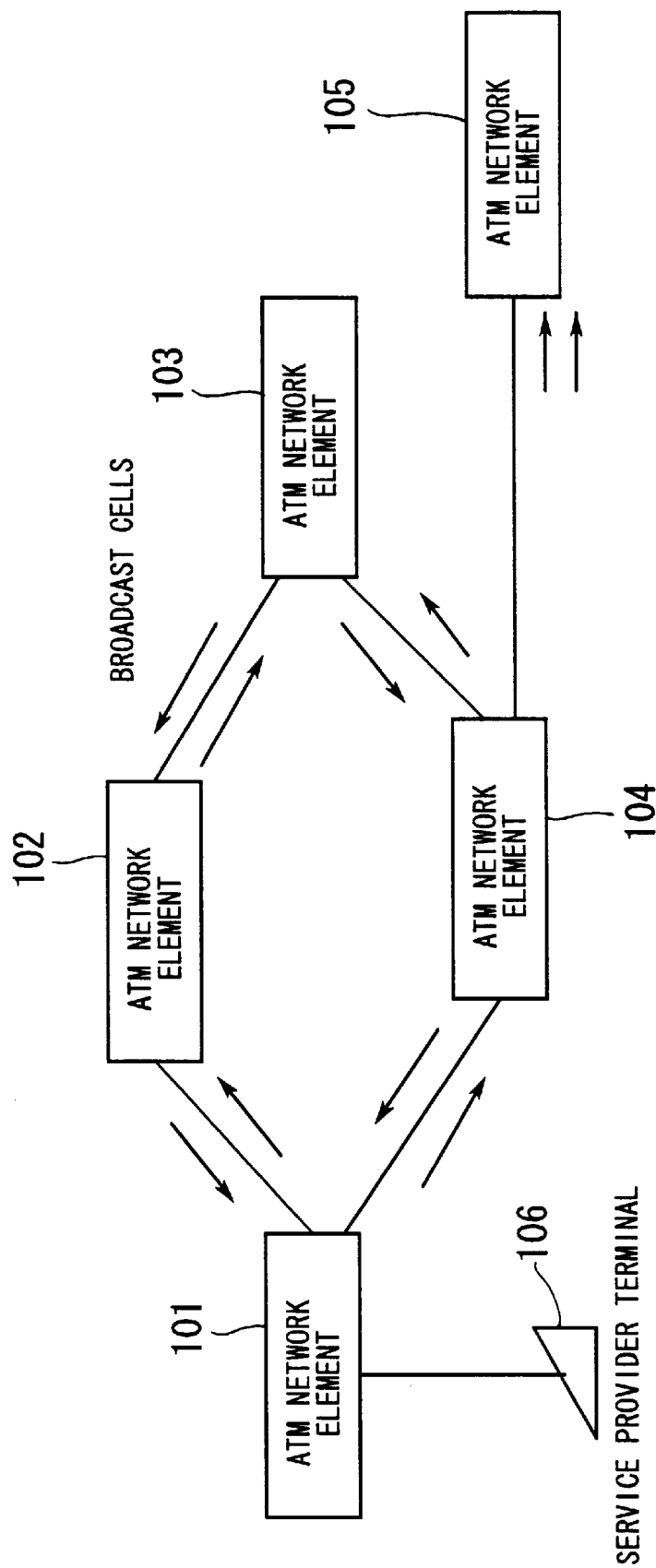
FIG. 39 is a diagram which shows an example of a conventional ATM network which provides broadcast messaging services.

The next section explains a routing process to distribute broadcast cells on the basis of the routing data formulated as above in the broadcast relay data area 28*ac*. The procedure of transmission of a broadcast cell performed by the service provider terminal 25 is basically the same as that of the service provider terminal 16 in the first embodiment explained earlier with reference to FIG. 12. FIG. 38 is a flowchart which shows a process executed by the ATM network element 28 to receive and relay the broadcast cells. This sequence is also applicable to other ATM network elements 26, 27, 29, and 30, basically. The following paragraphs will explain each step of FIG. 38.

[S101] The reception channel controller 28*d*, 28*f*, and 28*h* receive a plurality of broadcast cells and forwards the cells to their respective monitoring units 28*j*, 28*k*, and 28*m*.

[S102] The monitoring units 28*j*, 28*k*, and 28*m* are designed to examine the payload type of each ATM cell sent from the reception channel controllers 28*d*, 28*f*, and 28*h*, respectively. If the received ATM cell is a broadcast-related OAM cell, they subject it to the broadcast routing controller 28*n*, and if not, they forward it to the ATM switch 28*c*.

[S103] Upon receipt of a broadcast-related OAM cell, the broadcast routing controller 28*n* checks its cell type field to determine whether the received OAM cell is a broadcast cell or not. If it is found to be a broadcast cell, the broadcast routing controller 28*n* terminates the broadcast cell and delivers it to its local client terminals, as well as extracting its "SOURCE NE's ID" field.

[S104] The broadcast routing controller 28*n* determines whether this extracted value can be found in the registered "SOURCE NE's ID" fields in the broadcast relay data area 28*ac*. If there exists a relevant data entry, the process proceeds to step S105. If not, it proceeds to step S107.

[S105] Since the extracted NE ID is found in the broadcast relay data area 28*ac* (FIG. 34), the broadcast routing controller 28*n* retrieves all relevant records of the links registered in the "VALID RELAYING LINK" fields.

[S106] The broadcast cell in process is transmitted to all the links retrieved in step S105.

[S107] Since no relevant record is found in the broadcast relay data area 28*ac*, the broadcast routing controller 28*n* transmits the broadcast cell to all links other than the one where the cell was received.

In this way, the fourth embodiment minimizes the data flow on the ATM network, concerning both broadcast routing control response cells and broadcast cells, thereby avoiding cell traffic congestion.

The above discussion is summarized as follows. According to the present invention, a source network element distributes a broadcast routing control cell over the ATM network in response to a request from a service provider terminal. Each network element on the ATM network receives this broadcast routing control cell and/or its replicas delivered through different paths, and on the basis of the information contained in those control cells, it establishes routing data in its local storage, which indicates a particular link connecting with the shortest path from the source network element to the present network element. When relaying broadcast cells, each network element selectively accepts incoming broadcast cells conveyed by the link registered in the routing data and retransmits them to adjacent network elements, while discarding broadcast cells coming from other links. As a result, the broadcast cells are distributed to every network element through optimized paths that interconnects the network elements in an efficient way. That is, the broadcast control system according to the present invention has successfully determined unique distribution routes for the broadcast cells.

In another configuration proposed in the present invention, each network element that has received a broadcast routing control cell will return a response cell to the source network element. Based on the response cells, the source network element obtains the number of network elements on a route to the farthest network element, and makes each outgoing broadcast cell carry that number as the initial value of a down-counter named "NUMBER OF NEs TO VISIT." This down-counter is decremented each time the broadcast cell passes through a network element, and the cell is repeated until the down-counter value reaches zero. This mechanism prevents the broadcast cells from unnecessary repetition, thus avoiding traffic congestion in the ATM network.

In still another configuration of the present invention, the routing data can be formulated on the basis of a limited number of broadcast routing control cells that have arrived within a prescribed time period. The use of timers enables a faster set-up of routing data, and thus allows the response cells to be transported via the resultant paths without generating unnecessary traffic.

In addition, the present invention provides a way to reestablish the cell delivery routes when a network element has been added to or removed from the ATM network. Such a network element submits a broadcast routing control request cell over the network, and in response to this, the network elements having subordinate service provider terminals retransmit broadcast routing control cells. This technique is used to reestablish the broadcast routes when a new network element is added to the ATM network, thereby allowing the routes to be optimized for the new configuration. At an early stage of connection with a service provider terminal, client terminals can initiate a set-up procedure to conduct security check, user authentication, service rank check, from any location in the ATM network. This makes it easy for users to move, transfer, and connect the client terminals within the network.

Also, when using existing upper-layer protocols such as TCP/IP, the present invention allows address resolution mechanisms for IP addresses and ATM addresses to be implemented without imposing excessive loads on the ATM network.

Further, since every network element is designed to automatically establish its own broadcast routing data, the present invention facilitates the maintenance of system configuration data which has to be updated each time a network element is added to or removed from the network.

Furthermore, the present invention enables efficient delivery of messages via broadcast channels with a minimized effect upon network's overall traffic and quality of service, and with no concern about the consumption of ATM virtual channels. This realizes simultaneous distribution of information to all client terminals under the ATM network elements, including delivery of news, weather forecasts, and other regular programs, advanced notice about stop of services, and remote control of endpoint devices.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A broadcast control system for controlling broadcast message distribution in an ATM network which is organized by a plurality of network elements and at least one service provider terminal connected to a source network element among the plurality of network elements, each network element having a plurality of links that extend to other network elements, the service provider terminal being a source of a broadcast cell, the broadcast control system comprising:

broadcast routing control cell transmission means, disposed in the source network element, for distributing a broadcast routing control cell containing reception link decision data to the plurality of network elements;

control cell relaying means, disposed in each of the plurality of network elements and activated when the broadcast routing control cell is received via one of the plurality of links, for modifying the reception link decision data contained in the received broadcast routing control cell, and transmitting the broadcast routing control cell with the modified reception link decision data through the plurality of links except for the one of the plurality of links used to receive the broadcast routing control cell;

link selection & storage means, disposed in each of the plurality of network elements and activated when a plurality of broadcast routing control cells have been received via different routes, for selecting a particular link from among the plurality of links, based on the reception link decision data contained in each broadcast routing control cell received, and storing a record of a combination of the particular link and the source network element which distributed the plurality of broadcast routing control cells; and broadcast cell relaying means, disposed in each of the plurality of network elements, for receiving the broadcast cell through one of the plurality of links, identifying a network element that has distributed the broadcast cell, and transmitting the broadcast cell through the rest of the plurality of links if said link selection & storage means has a record that matches with a combination of the network element identified as the sender of the broadcast cell and the one of the plurality of links that was used to receive the broadcast cell.

2. The broadcast control system according to claim 1, further comprising cell discarding means, disposed in each of the plurality of network elements in connection with said broadcast cell relaying means, for discarding the received broadcast cell if said link selection & storage means has no record that matches with the combination of the sender network element of the broadcast cell and the one of the plurality of links used to receive the broadcast cell.

3. The broadcast control system according to claim 1, wherein the broadcast routing control cell consists of a header section and a payload section, and the payload section carries a cell type that shows identity as a broadcast routing control cell, a source identifier that indicates which network element has originally sent the present broadcast routing control cell, and the number of network elements through which the broadcast routing control cell has passed before reaching the present network element.

4. The broadcast control system according to claim 1, wherein the broadcast routing control cell consists of a header section and a payload section, and the header section carries, using a part of VCI/VPI fields thereof, a cell type that shows identity as a broadcast routing control cell, a source identifier that indicates which network element has originally sent the present broadcast routing control cell, and the number of network elements through which the broadcast routing control cell has passed before reaching the present network element.

5. The broadcast control system according to claim 1, wherein the broadcast cell consists of a header section and a payload section, and the payload section carries a cell type that shows identity as a broadcast cell and a source identifier that indicates which network element has distributed the present broadcast cell that originated at the service provider terminal.

6. The broadcast control system according to claim 1, wherein the broadcast cell consists of a header section and a payload section, and the header section carries, in a part of VCI/VPI fields thereof, a cell type that is used to identify the broadcast cell and an identifier that indicates the sender network element that has distributed the broadcast cell having originated at the service provider terminal.

7. The broadcast control system according to claim 1, wherein the reception link decision data contained in the broadcast routing control cell indicates the number of network elements through which the broadcast routing control cell has passed before reaching the present network element, and said link selection & storage means stores the record containing (a) an identifier of the source network element that distributed the plurality of broadcast routing control cells, (b) an identifier of the particular link that was used to receive a particular broadcast routing control cell exhibiting the smallest value in the reception link decision data, and (c) the smallest value of network elements.

8. The broadcast control system according to claim 1, wherein the reception link decision data contained in the broadcast routing control cell is a counter value that represents the number of network elements through which the broadcast routing control cell has passed before reaching the present network element, the modification performed by said control cell relaying means is an addition of an increment to the counter value, and said control cell relaying means disposed in some of the plurality of network elements adds a larger increment to the counter value than the increment to be given in the rest of the plurality of network elements.

9. The broadcast control system according to claim 1, further comprising:

request cell transmission means, disposed in each of the plurality of network elements, for transmitting a request cell that requests the source network element to transmit the broadcast routing control cell; and control cell retransmission means, disposed in each of the plurality of network elements, for directing said broadcast routing control cell transmission means to retransmit the broadcast routing control cell, upon receipt of the request cell.

10. A network element having a broadcast control function for controlling broadcast message distribution in an ATM network organized by a plurality of network elements and at least one service provider terminal connected to a source network element that is one of the plurality of network elements, each network element having a plurality of links that extend to other network elements, the service provider terminal being a source of a broadcast routing control cell and a broadcast cell, the network element comprising:

control cell relaying means for receiving the broadcast routing control cell through one of the plurality of links, modifying reception link decision data contained in the received broadcast routing control cell, and transmitting the broadcast routing control cell with the modified reception link decision data through the plurality of links except for the one of the plurality of links used to receive the broadcast routing control cell;

link selection & storage means, activated when a plurality of broadcast routing control cells have been received via different routes in the ATM network, for selecting a particular link from among the plurality of links, based on the reception link decision data contained in each broadcast routing control cell received, and storing a record of the particular link selected in association with the service provider terminal that originally generated the broadcast routing control cell or the source network element to which the service provider terminal is connected; and broadcast cell relaying means for receiving the broadcast cell through one of the plurality of links, identifying a service provider terminal that is the source of the broadcast cell or a network element that has originally distributed the broadcast cell, and transmitting the broadcast cell through the rest of the plurality of link if said link selection & storage means has a record that matches with a combination of the identified service provider terminal or network element and the one of the plurality of links that was used to receive the broadcast cell.

11. The network element according to claim 10, further comprising cell discarding means for discarding the received broadcast cell if said link selection & storage means has no record that matches with the combination of the identified service provider terminal or network element and the one of the plurality of links that was used to receive the broadcast cell.

12. A broadcast control system for controlling broadcast message distribution in an ATM network which is organized by a plurality of network elements and at least one service provider terminal connected to a source network element among the plurality of network elements, each network element having a plurality of links that extend to other network elements, the service provider terminal being a source of a broadcast cell, the broadcast control system comprising:

broadcast routing control cell transmission means, disposed in the source network element, for distributing a broadcast routing control cell to the plurality of network elements except for the source network element, the broadcast routing control cell containing a counter value that represents the number of network elements through which the broadcast routing control cell has passed;

control cell relaying means, disposed in each of the plurality of network elements, for receiving the broadcast routing control cell through one of the plurality of links, incrementing the counter value contained in the received broadcast routing control cell, and transmitting the broadcast routing control cell with the incremented counter value through the plurality of links except for the one of the plurality of links used to receive the broadcast routing control cell;

response cell transmission means, disposed in each of the plurality of network elements, for transmitting a response cell through the one of the plurality of links that was used to receive the broadcast routing control cell, the response cell containing a replica of the counter value extracted from the received broadcast routing control cell and an identifier of the present network element responding to the broadcast routing control cell;

first detection & storage means, disposed in the source network element and activated when a plurality of response cells have been received from the same responding network element via different routes in the ATM network, for detecting a particular response cell that exhibits the smallest counter value among those extracted from the plurality of response cells received, and storing a record that contains the identifier of the responding network element and the smallest counter value extracted from the detected particular response cell;

second detection & storage means, disposed in the source network element, for searching said first detection & storage means to detect a particular record that exhibits the largest counter value among all the records stored therein concerning the different responding network elements, and storing the largest counter value in the particular record detected;

broadcast cell transmission means, disposed in the source network element, for receiving the broadcast cell from the service provider terminal and distributing the received broadcast cell to the plurality of network elements after transferring the largest counter value stored in said second detection & storage means to a down-counter field disposed as part of the received broadcast cell; and broadcast cell relaying means, disposed in each of the plurality of network elements, for receiving the broadcast cell through one of the plurality of links, decrementing the down-counter field of the received broadcast cell, and transmitting the broadcast cell through the rest of the plurality of link only when the decremented down-counter field exhibits a non-zero value.

13. A broadcast control system for controlling broadcast message distribution in an ATM network which is organized by a plurality of network elements and at least one service provider terminal connected to a source network element among the plurality of network elements, each network element having a plurality of links that extend to other network elements, the service provider terminal being a source of a broadcast cell, the broadcast control system comprising:

broadcast routing control cell transmission means, disposed in the source network element, for distributing a broadcast routing control cell to the plurality of network elements except for the source network element, the broadcast routing control cell containing a counter value that represents the number of network elements through which the broadcast routing control cell has passed;

control cell relaying means, disposed in each of the plurality of network elements, for receiving the broadcast routing control cell through one of the plurality of links, incrementing the counter value contained in the received broadcast routing control cell, and transmitting the broadcast routing control cell with the incremented counter value through the plurality of links except for the one of the plurality of links used to receive the broadcast routing control cell;

link selection & storage means, disposed in each of the plurality of network elements and activated when a plurality of broadcast routing control cells have been received via different routes within a predetermined time period, for selecting a particular broadcast routing control cell exhibiting the smallest counter value from among the plurality of broadcast routing control cells received, identifying a link that was used to receive the particular broadcast routing control cell, and storing a record of the identified link in combination with the source network element that originally distributed the broadcast routing control cell;

response cell transmission means, disposed in each of the plurality of network elements, for transmitting a response cell through the identified link in response to the particular broadcast routing control cell selected by said link selection & storage means, the response cell carrying an identifier of the source network element that originally distributed the broadcast routing control cell;

relaying link storage means, disposed in each of the plurality of network elements and activated when the response cell is received through one of the plurality of links, for extracting the identifier of the source network element from the received response cell, and storing a record of the one of the plurality of links that was used to receive the response cell, in association with the extracted identifier of the source network element; and broadcast cell relaying means, disposed in each of the plurality of network elements and activated when the broadcast cell is received, for retrieving a record relevant to the source network element from said relaying link storage means and transmitting the broadcast cell through the links described in the retrieve record.

* * * * *